US012774164B2

(12) United States Patent
Cohen et al.

(10) Patent No.: US 12,774,164 B2
(45) Date of Patent: *Oct. 27, 2026

(54) SYSTEMS AND METHODS FOR AUTOMATED PACKAGING AND PROCESSING FOR SHIPPING WITH CONTAINER ALIGNMENT

(71) Applicant: Berkshire Grey Operating Company, Inc., Bedford, MA (US)

(72) Inventors: Benjamin Cohen, Somerville, MA (US); Christopher Geyer, Arlington, MA (US); Thomas Koletschka, Natick, MA (US); Jay Link, Westford, MA (US); Joshua Lurz, Pittsburgh, PA (US); Matthew T. Mason, Pittsburgh, PA (US); Richard Musgrave, Sewickley, PA (US); Ryan O'Hern, Reading, MA (US); Gene Temple Price, Cambridge, MA (US); Joseph Romano, Arlington, MA (US); Prasanna Velagapudi, Pittsburgh, PA (US); Thomas Wagner, Concord, MA (US); Jeremy Saslaw, Cambridge, MA (US)

(73) Assignee: Berkshire Grey Operating Company, Inc., Bedford, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/919,676

(22) Filed: Oct. 18, 2024

(65) Prior Publication Data

US 2025/0153944 A1 May 15, 2025

Related U.S. Application Data

(63) Continuation of application No. 17/514,955, filed on Oct. 29, 2021, now Pat. No. 12,151,889.

(Continued)

(51) Int. Cl.

*B65G 1/00* (2006.01)
*B65G 1/137* (2006.01)
*B65G 47/91* (2006.01)

(52) U.S. Cl.

CPC ......... *B65G 1/1373* (2013.01); *B65G 47/917* (2013.01); *B65G 2203/0225* (2013.01); *B65G 2203/0283* (2013.01); *B65G 2203/041* (2013.01)

(58) Field of Classification Search

None

See application file for complete search history.

(56) References Cited

U.S. PATENT DOCUMENTS 4,542,808 A 9/1985 Lloyd, Jr. et al.
4,622,875 A 11/1986 Emery et al.

(Continued)

FOREIGN PATENT DOCUMENTS

CN 109689535 4/2019
CN 109747887 5/2019

(Continued)

OTHER PUBLICATIONS

Annex to Form PCT/ISA/206, Communication Relating to the Results of the Partial International Search issued by the International Searching Authority, the European Patent Office, in related International Application No. PCT/US2021/057383 on Feb. 7, 2022, 3 pages.

(Continued)

*Primary Examiner* — Truc M Do

(74) *Attorney, Agent, or Firm* — Gesmer Updegrove LLP

(57) ABSTRACT

An automated packing system is disclosed for placing a plurality of objects into a shipping container. The system includes a supply bin receiving conveyor for receiving a supply bin at a supply station, a destination container (Continued)

location assessment system for positioning a destination container, a detection system for detecting a plurality of objects within the supply bin responsive to the position of the supply bin on the receiving conveyor as aligned by the alignment system, an object selection system for selecting a selected object from the plurality of objects to be placed into the shipping container, and a programmable motion device for grasping and acquiring the selected object from the plurality of objects at the supply station, and for placing the selected object into the shipping container in a selected orientation.

20 Claims, 51 Drawing Sheets

Related U.S. Application Data

(60) Provisional application No. 63/172,987, filed on Apr. 9, 2021, provisional application No. 63/107,302, filed on Oct. 29, 2020.

(56) References Cited

U.S. PATENT DOCUMENTS

| | | | |
|---|---|---|---|
| 5,595,263 | A | 1/1997 | Pignataro |
| 5,738,216 | A | 4/1998 | Warner |
| 5,996,316 | A | 12/1999 | Kirschner |
| 6,779,647 | B1 | 8/2004 | Nagler |
| 9,174,758 | B1 | 11/2015 | Rowley et al. |
| 9,227,323 | B1 | 1/2016 | Konolige et al. |
| 9,492,923 | B2 | 11/2016 | Wellman et al. |
| 9,937,532 | B2 | 4/2018 | Wagner et al. |
| 9,981,382 | B1 | 5/2018 | Strauss et al. |
| 10,007,827 | B2 | 6/2018 | Wagner et al. |
| 10,131,051 | B1 | 11/2018 | Goyal et al. |
| 10,456,915 | B1 | 10/2019 | Diankov |
| 10,596,696 | B2 | 3/2020 | Wagner et al. |
| 10,646,991 | B2 | 5/2020 | Wagner et al. |
| 10,807,808 | B1 | 10/2020 | Rodgers et al. |
| 10,809,122 | B1 | 10/2020 | Danenberg et al. |
| 11,319,166 | B2 | 5/2022 | Diankov et al. |
| 11,416,695 | B2 | 8/2022 | Wagner et al. |
| 11,420,329 | B2 | 8/2022 | Wagner et al. |
| 11,681,884 | B2 | 6/2023 | Wagner et al. |
| 11,772,833 | B1 | 10/2023 | Shi et al. |
| 2002/0134056 | A1 | 9/2002 | Dimario et al. |
| 2009/0019818 | A1 | 1/2009 | Gilmore et al. |
| 2009/0139188 | A1 | 6/2009 | Schafer |
| 2011/0154784 | A1 | 6/2011 | Poutot |
| 2011/0243707 | A1 | 10/2011 | Dumas et al. |
| 2012/0118699 | A1 | 5/2012 | Buchmann et al. |
| 2013/0126301 | A1 | 5/2013 | Resca Cacciari et al. |
| 2014/0297023 | A1 | 10/2014 | Benjamin et al. |
| 2015/0352717 | A1 | 12/2015 | Mundt et al. |
| 2016/0176656 | A1 | 6/2016 | Lang |
| 2017/0121113 | A1 | 5/2017 | Wagner et al. |
| 2017/0136632 | A1 | 5/2017 | Wagner et al. |
| 2017/0157648 | A1 | 6/2017 | Wagner et al. |
| 2017/0225330 | A1* | 8/2017 | Wagner .................. B25J 9/1664 |
| 2017/0282634 | A1 | 10/2017 | Jones et al. |
| 2017/0312789 | A1 | 11/2017 | Schroader |
| 2018/0065819 | A1 | 3/2018 | Gondoh et al. |
| 2018/0116478 | A1 | 5/2018 | Lewis et al. |
| 2018/0273296 | A1 | 9/2018 | Wagner et al. |
| 2018/0273298 | A1 | 9/2018 | Wagner et al. |
| 2019/0047838 | A1* | 2/2019 | Mack ..................... A47G 23/08 |
| 2019/0070734 | A1* | 3/2019 | Wertenberger ...... B25J 15/0616 |
| 2019/0099784 | A1 | 4/2019 | Moriyama et al. |
| 2019/0344447 | A1 | 11/2019 | Wicks et al. |
| 2019/0361672 | A1 | 11/2019 | Odhner et al. |
| 2019/0378232 | A1 | 12/2019 | Goren et al. |
| 2020/0016770 | A1* | 1/2020 | Kamranzadeh ............ B25J 9/06 |
| 2020/0017314 | A1 | 1/2020 | Rose et al. |
| 2020/0017315 | A1 | 1/2020 | Yap et al. |
| 2020/0019918 | A1 | 1/2020 | Li |
| 2020/0023410 | A1 | 1/2020 | Tamura et al. |
| 2020/0130935 | A1* | 4/2020 | Wagner ................ B65G 1/1371 |
| 2020/0223058 | A1 | 7/2020 | Wagner et al. |
| 2020/0270071 | A1 | 8/2020 | Chavez et al. |
| 2020/0377312 | A1 | 12/2020 | Diankov et al. |
| 2021/0061576 | A1 | 3/2021 | Stuhlmann et al. |
| 2021/0276797 | A1 | 9/2021 | Velagapudi et al. |
| 2021/0276798 | A1 | 9/2021 | Velagapudi et al. |
| 2021/0276799 | A1 | 9/2021 | Velagapudi et al. |
| 2022/0135329 | A1 | 5/2022 | Cohen et al. |
| 2022/0135330 | A1 | 5/2022 | Cohen et al. |
| 2022/0135347 | A1 | 5/2022 | Cohen et al. |
| 2022/0315330 | A1 | 10/2022 | Kitamura et al. |
| 2023/0139689 | A1 | 5/2023 | Edwards et al. |
| 2023/0196280 | A1 | 6/2023 | Gupta et al. |
| 2025/0153945 | A1 | 5/2025 | Cohen et al. |

FOREIGN PATENT DOCUMENTS

| | | | |
|---|---|---|---|
| CN | 209174399 | U | 7/2019 |
| CN | 116234663 | A | 6/2023 |
| CN | 116583381 | A | 8/2023 |
| CN | 116669911 | A | 8/2023 |
| EP | 4237205 | A1 | 9/2023 |
| EP | 4237206 | A1 | 9/2023 |
| EP | 4237207 | A1 | 9/2023 |
| WO | 2019169418 | A2 | 9/2019 |
| WO | 2022094298 | A1 | 5/2022 |
| WO | 2022094304 | A1 | 5/2022 |
| WO | 2022094307 | A1 | 5/2022 |

OTHER PUBLICATIONS

Notification Concerning Transmittal of International Preliminary Report on Patentability and the International Preliminary Report on Patentability issued by the International Bureau of WIPO in related International Application No. PCT/US2021/057383 on May 11, 2023, 17 pages.

Notification Concerning Transmittal of International Preliminary Report on Patentability and the International Preliminary Report on Patentability issued by the International Bureau of WIPO in related International Application No. PCT/US2021/057392 on May 11, 2023, 11 pages.

Notification Concerning Transmittal of International Preliminary Report on Patentability and the International Preliminary Report on Patentability issued by the International Bureau of WIPO in related International Application No. PCT/US2021/057396 on May 11, 2023, 12 pages.

Notification of Transmittal of the International Search Report and The Written Opinion of the International Searching Authority and the International Search Report and Written Opinion of the International Searching Authority issued by the European Patent Office (as the International Searching Authority) in related International Application No. PCT/US2021/057396 on Feb. 8, 2022, 2022, 18 pages.

Notification of Transmittal of the International Search Report and The Written Opinion of the International Searching Authority and the International Search Report and Written Opinion of the International Searching Authority issued by the European Patent Office (as the International Searching Authority) in related International Application No. PCT/US2021/057392 on Feb. 2, 2022, 17 pages.

Notification of Transmittal of the International Search Report and The Written Opinion of the International Searching Authority and the International Search Report and Written Opinion of the International Searching Authority issued by the European Patent Office (as the International Searching Authority) in related International Application No. PCT/US2021/057383 on Apr. 22, 2022, 25 pages.

Wang et al., "Robot Packing with Known Items and Nondeterministic Arrival Order", IEEE Transactions on Automation Science and Engineering, IEEE Service Center, New York, NY, vol. 18, No. 4, Oct. 2021, pp. 1901-1915, XP011882068, ISSN: 1545-5955, DOI: 10.1109/TASE.2020.3024291, retrieved on Oct. 4, 2021.

(56) References Cited

OTHER PUBLICATIONS

Wang et al., "Stable Bin Packing of Non-convex 3D Objects with a Robot Manipulator", 2019 International Conference on Robotics and Automation (ICRA), IEEE, May 20-24, 2019, pp. 8698-8704, XP033594035, DOI: 10.1109/ICRA.2019.8794049, retrieved on Aug. 9, 2019.

* cited by examiner

SYSTEMS AND METHODS FOR AUTOMATED PACKAGING AND PROCESSING FOR SHIPPING WITH CONTAINER ALIGNMENT

PRIORITY

The present application is a continuation of U.S. patent application Ser. No. 17/514,955, filed Oct. 29, 2021, which claims priority to U.S. Provisional Patent Application No. 63/107,302 filed Oct. 29, 2020 and U.S. Provisional Patent Application No. 63/172,987 filed Apr. 9, 2021, the disclosures of each of which are incorporated by reference in their entireties.

BACKGROUND

The invention generally relates to automated sortation and other processing systems, and relates in particular to automated systems for packaging objects such as parcels, packages, articles, goods etc. for shipment.

Shipment centers for packaging and shipping a limited range of goods, for example, from a source company that manufactures the goods, may require only systems and processes that accommodate the limited range of the same goods repeatedly. Third party shipment centers on the other hand, that receive a wide variety of goods, must utilize systems and processes that may accommodate the wide variety of goods.

In e-commerce order fulfillment centers, for example, human personnel pack units of goods into shipping containers like boxes or polybags. One of the last steps in an order fulfillment center is packing one or more goods into a shipping container. Units of an order destined for a customer are typically packed by hand at pack stations. Order fulfillment centers do this for a number of reasons.

First, units need to be packed in shipping materials. For most items it is insufficient to put a shipping label on the unit and put it in the mail. Units need to be put in boxes or bags to protect the item. Second, units are not generally stored in the materials they are shipped in; they are not typically just ready to go out the dock door. Such units need to be packed on-the-fly after an order for the item has come in, otherwise if they were packed as they are shipped, space utilization in the warehouse would be inefficient.

Third, multiple units destined for the same customer are packed together to reduce shipping costs. The marginal cost of adding a single unit to a box is usually many times lower than creating a new box for the single unit. Fourth, consolidating the pack operation at pack stations improves the efficiency of the warehouse. The human personnel doing the packing do not walk around picking from shelves, they just focus on packing as many units per hour as possible.

Each of these requirements become more challenging as the number of goods and the number of destination locations increase. There is a need therefore, for an automated system for packing objects in preparation for shipping.

SUMMARY

In accordance with an aspect, the invention provides an automated packing system for placing a plurality of objects into a shipping container. The automated packing system includes a supply bin receiving conveyor for receiving a supply bin at a supply station, the supply bin receiving conveyor including sensing means for determining an extent of advancement of the supply bin in a conveyor direction along the supply bin receiving conveyor, a destination container location assessment system for positioning a destination container, a detection system for detecting a plurality of objects within the supply bin responsive to the position of the supply bin on the receiving conveyor as aligned by the alignment system, an object selection system for selecting a selected object from the plurality of objects to be placed into the shipping container, and a programmable motion device for grasping and acquiring the selected object from the plurality of objects at the supply station, and for placing the selected object into the shipping container in a selected orientation.

In accordance with another aspect, the invention provides an automated packing system for placing a plurality of objects into a shipping container. The automated packing system includes an alignment system for aligning the shipping container against a brace in a direction that is substantially transverse to the conveyor direction, an object selection system for selecting a selected object from the plurality of objects to be placed into the shipping container responsive to the pose authority data, and a programmable motion device for grasping and acquiring the selected object from the plurality of objects at the supply station, and for placing the selected object into the shipping container in a selected orientation and pose responsive to the pose authority data.

In accordance with another aspect, the invention provides an automated method of placing a plurality of objects into a destination container. The method includes receiving a supply bin at a supply station, detecting objects within the supply bin, selecting a selected object from the plurality of objects to be placed into the shipping container, grasping and acquiring the selected object from the plurality of objects at the supply station, positioning a container and for determining a location of the destination container, and detecting a volume within the destination container into which the objects is assigned to be placed.

BRIEF DESCRIPTION OF THE DRAWINGS

The following description may be further understood with reference to the accompanying drawings in which.

DETAILED DESCRIPTION

In accordance with various aspects, the invention provides systems and methods for robotically packing shipping containers, whether boxes, or cardboard trays, or some other physical container that holds one or more units of goods in preparation for shipping the objects. Applicant has discovered that there is a need for a robotic system that is able to pick units out of an inventory system, such as inventory tote stored in an AS/RS. There is further a need for a system that is able to place one or more units into a shipping container such as a box, a cardboard sheet (which is later to be shrink-wrapped), or onto a conveyor to be conveyed to a box or bagging machine. There is further a need for a robotic system that is able to pack into the box efficiently, e.g., by specifying ahead of time the best box size, and then packing the one or more units so as to leave as little air still in the box as feasible, leaving no large gaps.

Conversely, systems that robotically assemble pallets are different, at least in that cases are provided as a collection of cardboard boxes that are typically filled with multiple units of some good, wherein the cardboard boxes may readily be stacked upon one another. In accordance with various aspects of the present invention, a system is provided that permits packing individual units instead of multiple units, and importantly, the units may not be boxes; they are not like blocks that can be arbitrarily stacked. Instead they may not be rigid (e.g., they may be in bags), or they may be rigid but not box-shaped. They might be cylindrical and therefore roll, or they may have a shape that makes it inadvisable to stack items on top of them. In accordance with various aspects, the invention involves the ability to pick a unit out of clutter. In accordance with further aspects, the invention involves placing the items in a purposeful manner so as to prepare them for shipping, while reducing the amount of voids inside, and ensuring their integrity during shipping. In accordance with further aspects, systems may employ any of a variety of automatic box systems creation, box finishing systems, and auto-bagging systems to finish such boxes.

Applicants have further discovered that certain challenges exist for automated packaging systems. These challenges include needing to compensate for the pose-in-hand of gripped items, needing to compensate for errors and noise in the placement of things relative to others, and needing to compensate for objects with low pose authority. These challenges further include needing to place items while compensating for the fact that previously placed items may not be where they were originally placed, and needing to pack without requiring a lot of extra space around things, and needing to pack at high throughput.

Figure 1A:
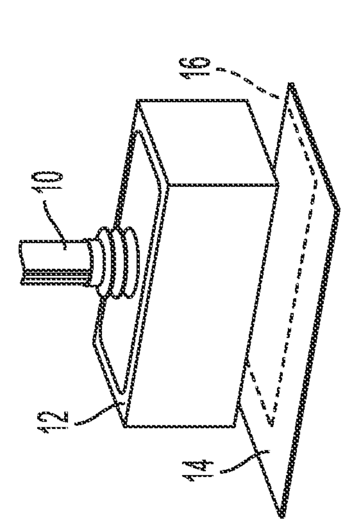
FIGS. 1A-1C show illustrative diagrammatic views of grippers and objects that are not centered on target locations.
Figure 1B:
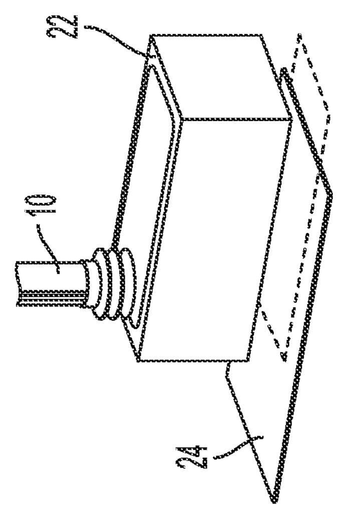
Figure 1C:
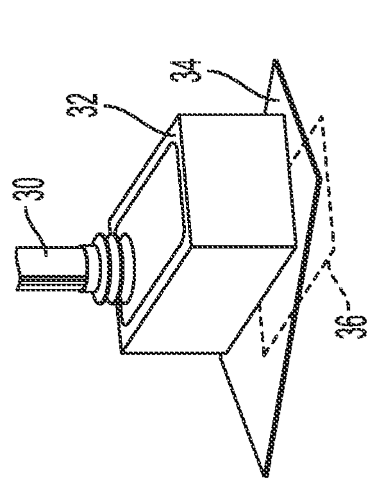
Figure 2A:
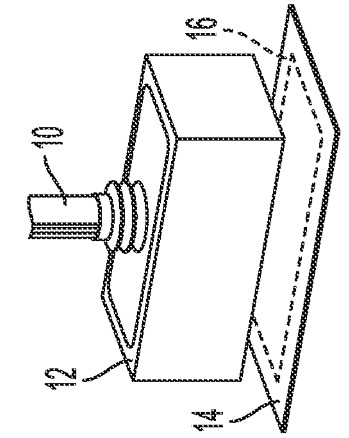
FIGS. 2A-2C show illustrative diagrammatic views of grippers and objects that are centered on target locations in accordance with an aspect of the present invention.
Figure 2B:
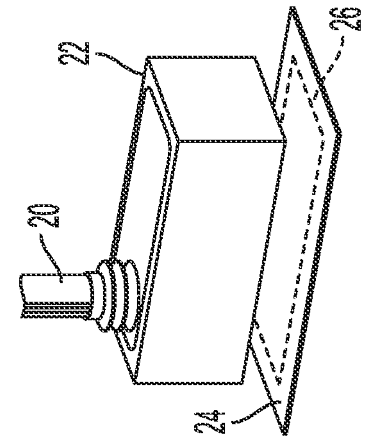
Figure 2C:
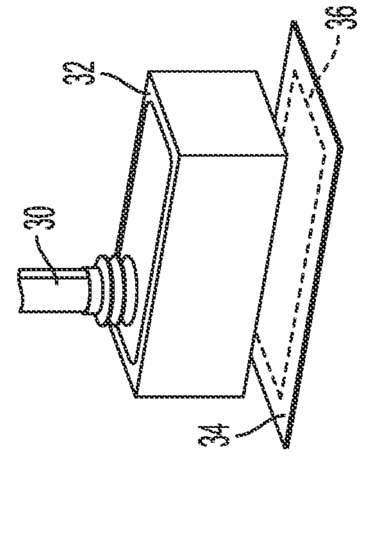

With regard to pose-in-hand, FIG. 1A shows at 10 a gripper that is centered on an object, but the object is not centered on a target location. FIG. 1B shows at 12 a gripper that is not centered on an object and the object is outside of the target location, and FIG. 1C shows at 14 a gripper that is centered on an object but the object is rotationally outside of the target location. If the gripper is centered over a cardboard receiving surface, but the item is not centered over the receiving surface, the object may lie outside of the extents of the presented cardboard receiving surface, which would be problematic for trying to pack the cardboard surface (e.g., of a box) or shrink wrap it (e.g., if a shipping tray). FIGS. 1A and 2A show an end effector 10 gasping an object 12 over a receiving surface 14. With reference to FIG. 2A, the system will adjust the position of the end effector 10 to cause the object to be positioned over the receiving surface 14 such that the object will be placed at a desired location 16. As shown in FIG. 2A, the placement location 16 is then well positioned on the receiving surface 14. As shown in FIG. 1B, if the end effector 20 is grasping an object 22 at a non-center location, even when the end effector is centered over the receiving surface 24, the object 22 will be placed onto a location 26 that is extends beyond the receiving surface 24, which is not desired. With reference to FIG. 2B, the system will adjust the position of the end effector 20 to cause the object to be positioned over the receiving surface 24 such that the object will be placed at a desired location 26. The gripper position and orientation has been chosen to compensate for the pose-in-hand of the held object. Similarly, if the end effector 30 is grasping an object 32 at a rotationally non-aligned position as shown in FIG. 1C, then if the end effector is centered and oriented over the receiving surface 34, the object 32 will be placed onto a location 36 that is rotated beyond the receiving surface 34, which is also not desired. With reference to FIG. 2C, the system will rotate the position of the end effector 30 to cause the object to be positioned over the receiving surface 34 such that the object will be placed at a desired location 36. Again, the gripper position and its orientation have been adjusted to compensate for the pose-in-hand of the held object. Even though the position and/or orientation of the end effector are known to provide a contact surface of the end effector that is parallel with the receiving surface, position and/or orientation of the object may still need to be adjusted prior to placement.

There is further a need to compensate for errors and noise in the placement of things relative to others. These include errors in the known location of the container (e.g., box) into which objects are being placed, errors in the pose-in-hand estimate, errors in the positioning of the robot, and errors due to unobserved, passive degrees of freedom or compliances. For example, a flexible gripper holding the held item might deflect and change the real pose-in-hand. There is also a need to compensate for objects with low pose authority. Pose authority is the ability to place an item into a desired position and orientation. Some items may not be easily oriented, or the resulting pose may be unpredictable. For example, an item loosely packed into a bag could crumple or fold on itself, or it may swing/pendulate uncontrollably before placement, making its resulting size and orientation unpredictable.

There is also a need to place items while compensating for the fact that previously placed items may not be where they were originally placed. The previously placed objects might have toppled or fell or rolled. In other words, some objects may move following placement, and in accordance with an aspect, the invention involves compensating for objects with low placement authority. Placement authority is the ability of an object to remain in a position and orientation at which it is placed.

There is further a need to pack without requiring a lot of extra space around things. So that the held item does not run into other placed items, or the shipping container, the robot could compensate by adding extra spacing around the held item. This extra spacing adds to transportation costs, and it is generally desired to add as little margin as possible around placed items. Additionally, there is a need to pack at high throughput, and to make decisions regarding where to place an object very quickly after having ascertained how it is being held by the gripper.

In accordance with an aspect of the invention, the system involves adding a scanner in the pick cell that recognizes the position and orientation of an item as it is being held by the gripper and is on its way to the place location. The system images the item from multiple directions to identify the principle axes of the item, so that it can be aligned with either the cardboard sheet, or other neighboring items in the order. With this capability the system may start with limited SKU coverage-primarily rigid boxed items, and from there expand to items in clamshells, and then bagged items such as clothing.

Figure 4:
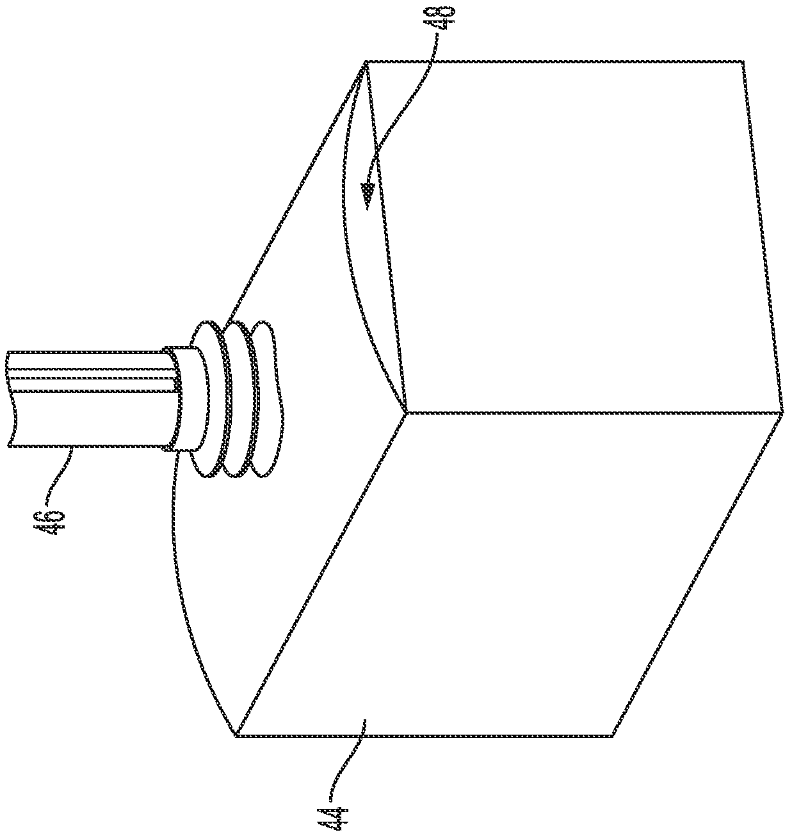
FIG. 4 shows an illustrative diagrammatic view of a gripper and object as processed in accordance with an aspect of the present invention.
Figure 3:
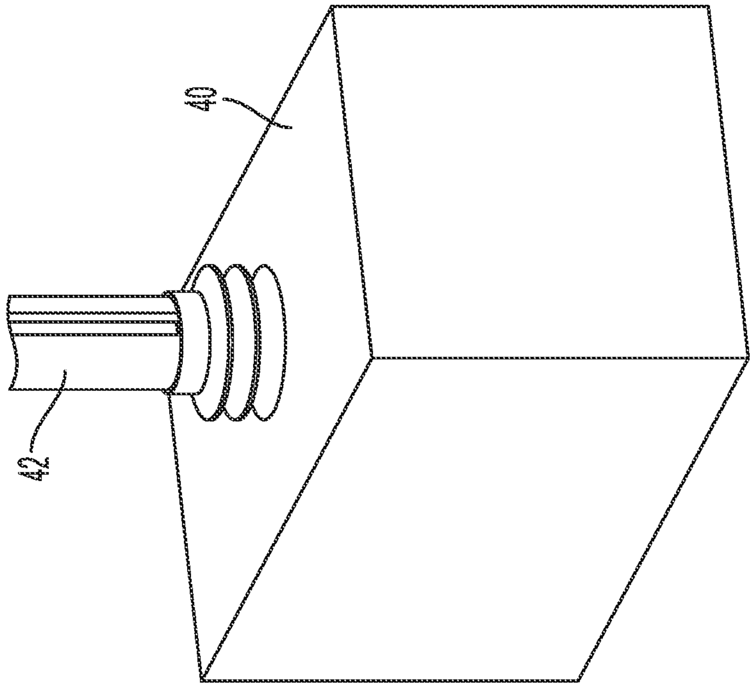
FIG. 3 shows an illustrative diagrammatic view of a gripper and object in accordance with a data model in accordance with an aspect of the present invention.

With reference to FIGS. 3 and 4, one problem that is sometimes encountered is compensating for differences between a model of reality (FIG. 3) and reality itself (FIG. 4), where for example, a product's shape changes slightly due to non-rigid packaging and/or locations of opening portions of the product. In particular, FIG. 3 diagrammatically shows a model of a product 40 being held by a model of an end effector 42. The modeling is computational, and FIG. 3 is intended to pictorially illustrate the computational modeling. Position and orientation can have small errors, and the dimensions of the real item may be different from the dimensions in the database. FIG. 4 shows an actual product 44 held by an actual end effector 46. As indicated at 48, the packaging (e.g., box) may change when lifted by the end effector from the top. Again, the design of some packaging is that the product is intended to be lifted from the bottom. When lifted by the end effector from the top as shown, the top surface (which may form part of the opening flap for the box), may lift away slightly from the remaining portions of the box. This is not only undesired for pose authority and packing, but such a choice of grasp location may also significantly compromise the system's ability to reliably pick and place the item (e.g., if the top surface/flap were to give way/tear from the remaining portions of the box).

Figure 5:
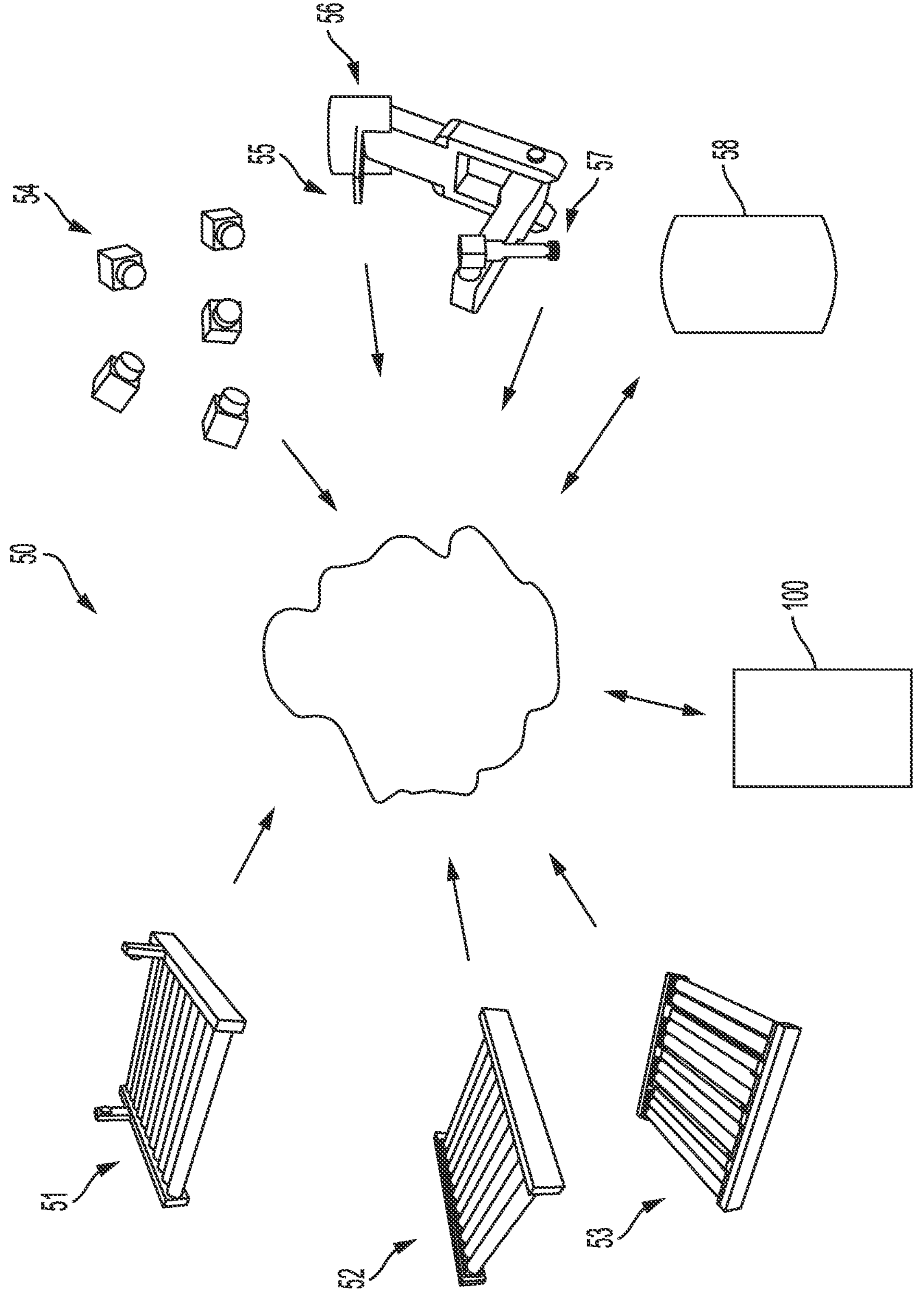
FIG. 5 shows an illustrative diagrammatic view of an analysis and control system in accordance with an aspect of the present invention.

These differences affect how well a system may pack. To drive these differences to be as small as required for certain applications, the system uses benchmark pose-in-hand scanning and modelling, and records how well models reflect reality. For example, FIG. 5 shows at 50 an analysis and control system that includes container detection units 51 on conveyors, weight sensing conveyor sections 52, weight sending bidirectional conveyor sections 53, fixed mounted detection units 54 proximate a programmable motion device 56, as well as grasp planning detection units 55 and grasp analysis detection units 57 associated with each programmable motion device 56. These detection units each provide information (e.g., via an intranet or the Internet) to one or more processing systems 100 that is also in communication with a storage system 58. By accessing stored information regarding each item, and by assessing grasp parameters including grasp location and end effector placement, the system accesses, generates and records data regarding objects' size, weight, packaging, materials, pose authority, position authority, grasp locations, vacuum pressure levels and vacuum duration. For example, the system may determine that one or more particular grasp locations and vacuum parameters are optimal for each object.

Figure 6:
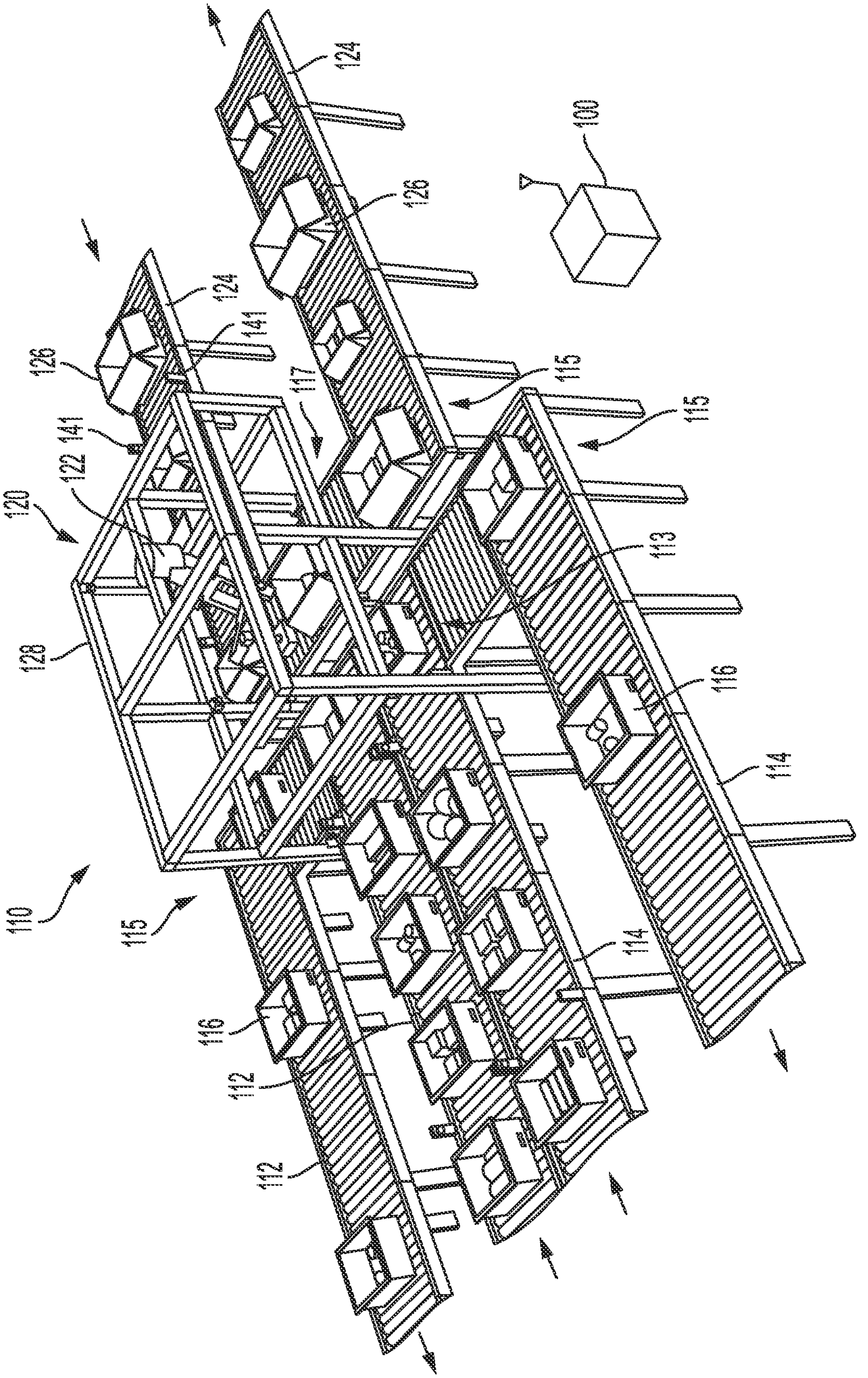
FIG. 6 shows an object processing system in accordance with an aspect of the present invention wherein input totes include single-SKU objects.
Figure 7:
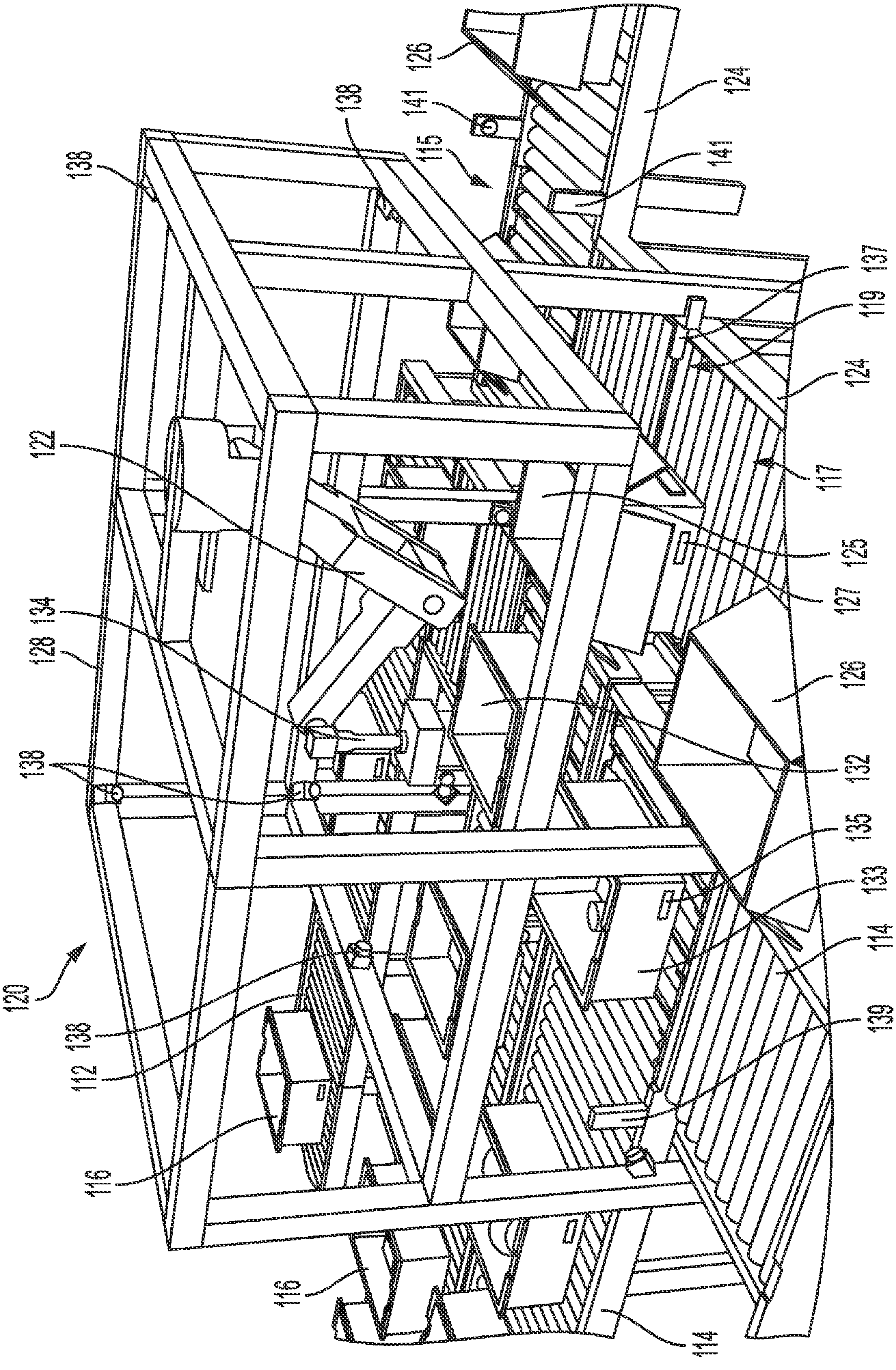
FIG. 7 shows an illustrative diagrammatic view of a single-SKU picking cell of the system of FIG. 6.

FIG. 6 for example, shows a system 110 that includes a pair of in infeed conveyors 112, 114 on which single-SKU inventory containers (e.g., totes) 116 are delivered to a single-SKU packing cell system 120 that includes a programmable motion device such as an articulated arm 122 (as further shown in FIG. 7). The system 110 also includes a shipping container conveyor 124 that provides shipping containers 126 to the single-SKU packing cell system 120. In accordance with an aspect, the single-SKU packing cell system picks single units from the inventory totes and places them into or onto packaging appropriate for shipping. The robot-support structure 128 straddles the two inventory tote loops 112, 114 that feed the cell with inventory totes from a tote storage system such as an AS/RS, and extends over the shipping container conveyor 124.

Detection units 139 (as further shown in FIG. 7) monitor the movement and location of containers 116, 126 on the conveyors 112, 114, 124 by detecting unique indicia 135, 127 on the containers 116, 126 respectively. Detection units 139 on the conveyors 112, 114 detect indicia 135 on the containers 116, and detection units 141 on the conveyor 124 detect indicia 127 on the shipping containers 126. Detection units 138 on the support structure 128 monitor the grasping and movement of objects by the end effector 134 of the programmable motion device 122. Detection unit 160 (shown in FIG. 11) assists the programmable motion device in selecting and grasping objects. The system 110 moves containers 116 on conveyors 112, 114 independently and intermittently to provide objects for processing at the cell system 120, where objects are selectively placed into any of a variety of containers 126 that arrive on the movement controlled conveyor 124. Each conveyor 112, 114, 124 includes one or more sections of bi-direction diverters 113, 115 (as shown in more detail in FIGS. 9 and 26), that divert the movement of containers in an output direction that is orthogonal to an input direction. Certain of the bi-directional diverters 113 and a section 117 of the conveyor 124 (as further shown in FIGS. 10 and 26) include rollers mounted on force torque sensors (e.g., for measuring weight) as further discussed below. Additionally, the conveyor 124 includes a container alignment system 119 (shown further in FIGS. 10 and 16A-16D) for aligning containers when proximate the programmable motion device. Operation and control of the system, including the conveyors, detection units, bi-directional diverters, the container alignment system and the programmable motion device is provided by one or more computer processing systems 100.

With reference to FIG. 7, the system 110 may select one or two containers 132, 133 of the containers 116 on conveyors 112, 114 for providing objects to the programmable motion device 122. The weight of each of the containers 132, 133 may be independently confirmed (using the force torque sensors discussed in more detail below with reference to FIG. 9). A selected shipping container 125 of the containers 126 on conveyor 124 is also provided proximate the programmable motion device, and with reference to FIGS. 16A-16D, is urged into a loading position on the conveyor 124 by the container alignment system 119. A selected object is then moved to the container 125 by the programmable motion device, the position and orientation its placement in the container is determined, and following placement, the weight of the container is detected (as discussed in more detail below) to confirm placement. The detection systems 138 may be positioned around an area at which an object is picked from a tote by the end effector 134 The detection systems 138 are positioned to capture all surfaces of the object including the bottom of the object. That way as soon as the item is picked out of the tote it can be scanned. This allows for enough time to compute the pose-in-hand and then do the motion planning needed to compensate for it.

Figure 8:
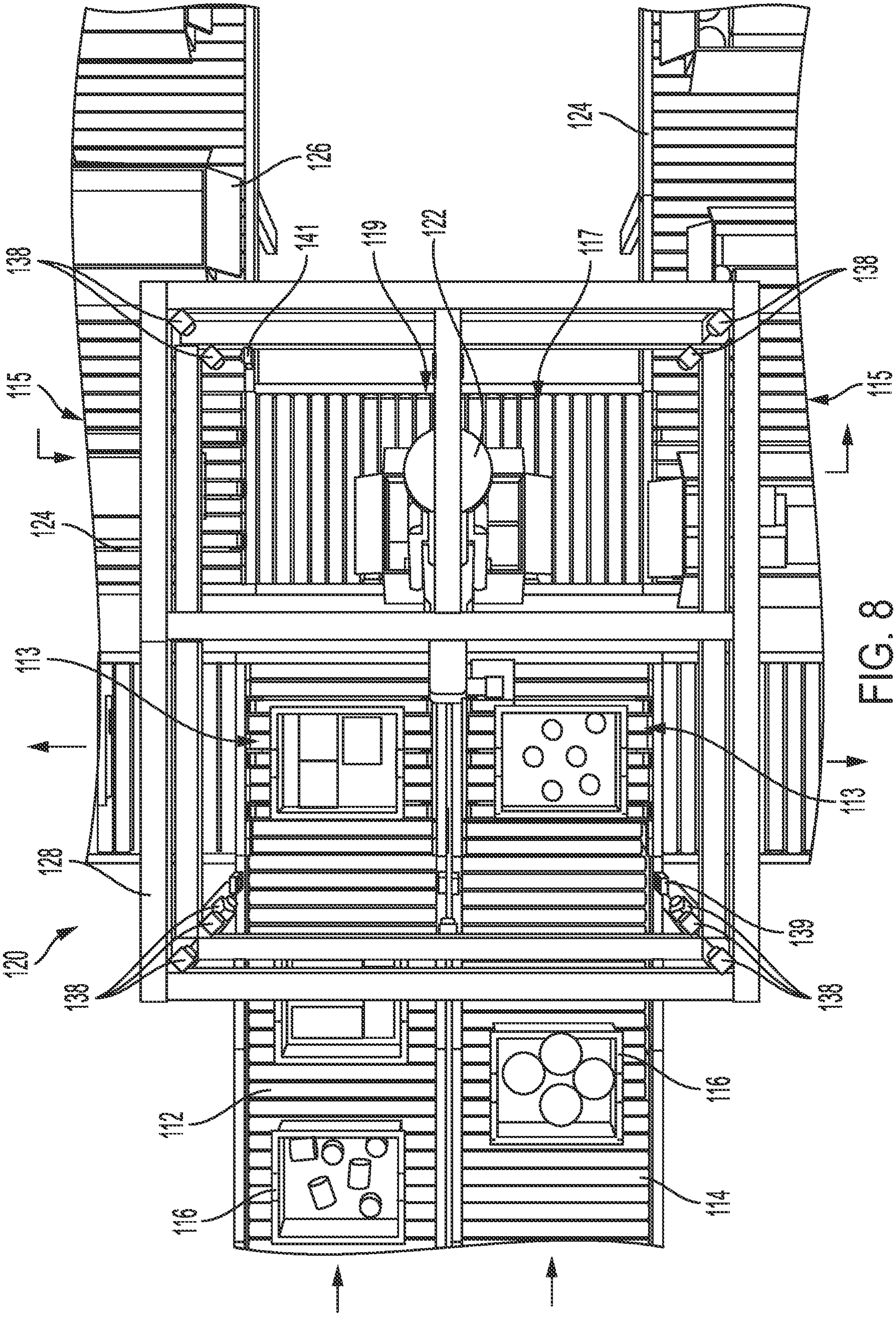
FIG. 8 shows an illustrative diagrammatic plan view of the single-SKU picking cell of FIG. 7.

FIG. 8 shows a top view of the packing cell 120 showing the weight sensing bi-directional diverters 113 of the conveyors 112, 114, and the bi-directional diverters 115 of the conveyor 124. The detection units 138 may include depth sensors such as depth cameras that are positioned around the station from multiple directions in order to estimate an object held as well as pose-in-hand of the object being held. The infeed system may include the plural infeed conveyors 112, 114 to provide multiple objects to the programmable motion device 122. The weight sensing bi-directional diverters 113 may determine not only weight of a container, but also the position of the container on the rollers. The bi-directional diverters 113, 115 may include transverse directional belts 144 (shown in FIG. 9) that may be raised for directing container in a direction orthogonal to the direction of the conveyor approaching the conveyor. Once detected and identified/confirmed, the objects may be moved to a destination container 125 (e.g., a shipping box) on the output conveyor 124 via the programmable motion device 122 such as an articulated arm.

Figure 9:
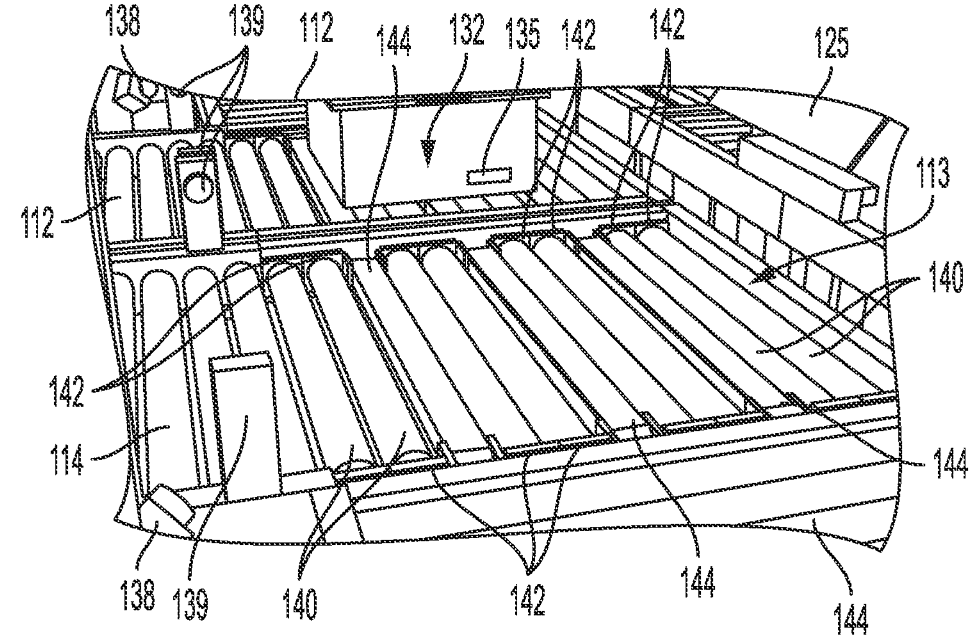
FIG. 9 shows an illustrative diagrammatic view of bi-directional diverters used in the single-SKU picking cell of FIG. 7.
Figure 10:
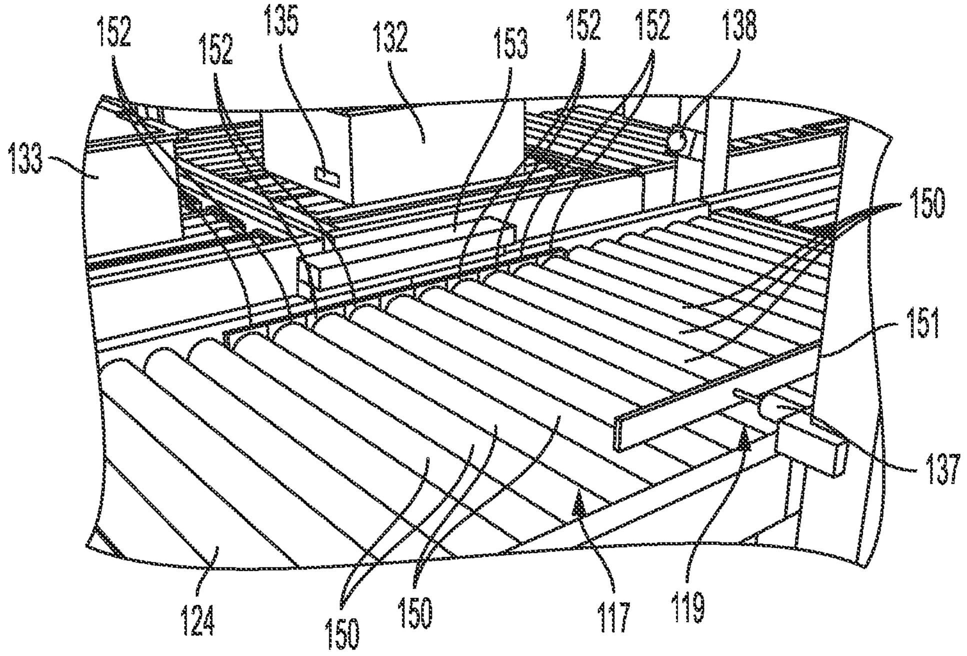
FIG. 10 shows an illustrative diagrammatic view of a weight-sensing conveyor section used in the single-SKU picking cell of FIG. 7.

The weight sensing bi-directional diverter 113 includes rollers 140 mounted on force torque sensors 142 (as shown in FIG. 9) for determining a weight and position of a container on the rollers. As further shown in FIG. 9, the bi-directional diverters 113 (as well as 115) include belts 144 that may be elevated to positions to divert a container when engaged. The belts may further be used to confirm a weight of a container (e.g., before and after removal of an object) by lifting a container off of the weight sensing rollers, and then placing the container back onto the weight sensing rollers.

By monitoring the outputs of each of the load cells or force torque sensors 142, the location of a container on the rollers may be determined, and the rollers may be advanced to bring the container to a specific position on the rollers under the articulated arm 122. The shipping destination conveyor 124 also includes a weight sensing conveyor section 117 including conveyors 150 loaded on load cells or force torque sensors 152 as discussed above and shown in more detail in FIG. 10. The individual load cells or force torque sensors permit the system to determine a location of a container on the rollers 150 mounted on the force torque sensors 152. By monitoring the outputs of each of the load cells or force torque sensors 152, the location of a container on the rollers may therefore be determined, and the rollers may be advanced to bring the box to a specific position on the rollers under the articulated arm 122. The container alignment system 119 may then be engaged to position the container against a brace 153 as discussed in more detail below with reference to FIGS. 16A-16D.

Figure 11:
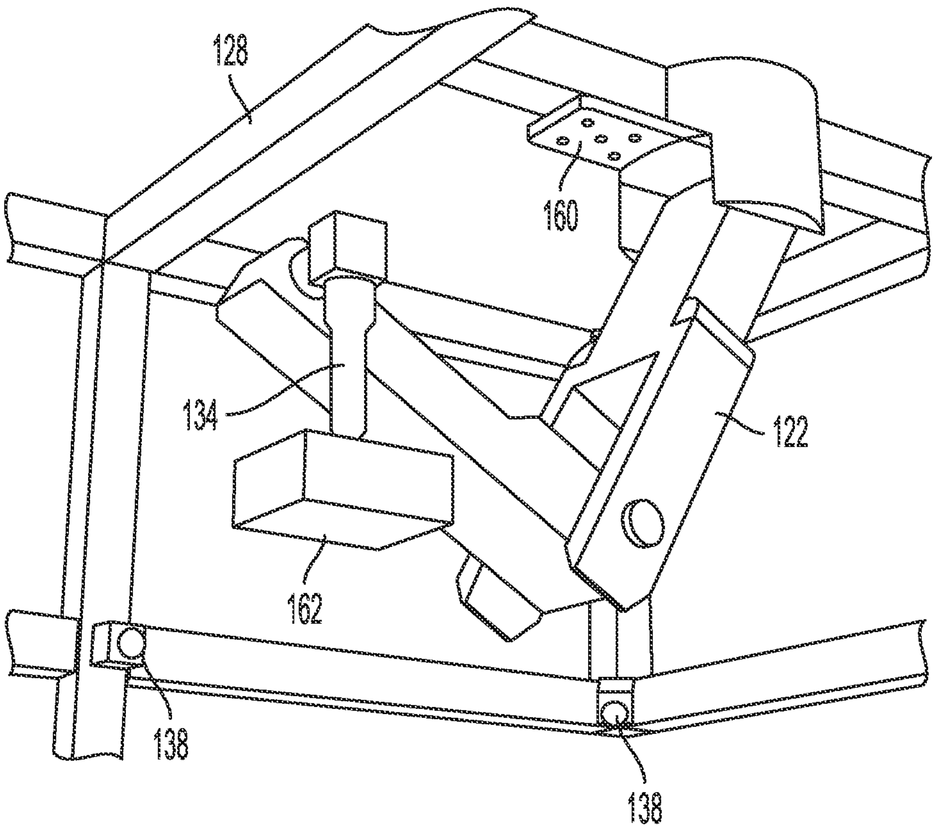
FIG. 11 shows an illustrative diagrammatic view of a programmable motion device used in the single-SKU picking cell of FIG. 7.

The system of various aspects includes a perception system (e.g., 160) that is mounted above a container of objects to be processed next to the base of the articulated arm 122 with an end-effector 134, looking down into a container. With reference to FIG. 11, the perception system 160, for example, may include (on the underside thereof), a camera, a depth sensor and lights. A combination of 2D and 3D (depth) data is acquired. The depth sensor may provide depth information that may be used together with the camera image data to determine depth information regarding the various objects in view. The lights may be used to remove shadows and to facilitate the identification of edges of objects, and may be all on during use, or may be illuminated in accordance with a desired sequence to assist in object identification. The system uses this imagery and a variety of algorithms to generate a set of candidate grasp locations for the objects in the bin as discussed in more detail below.

Figure 12A:
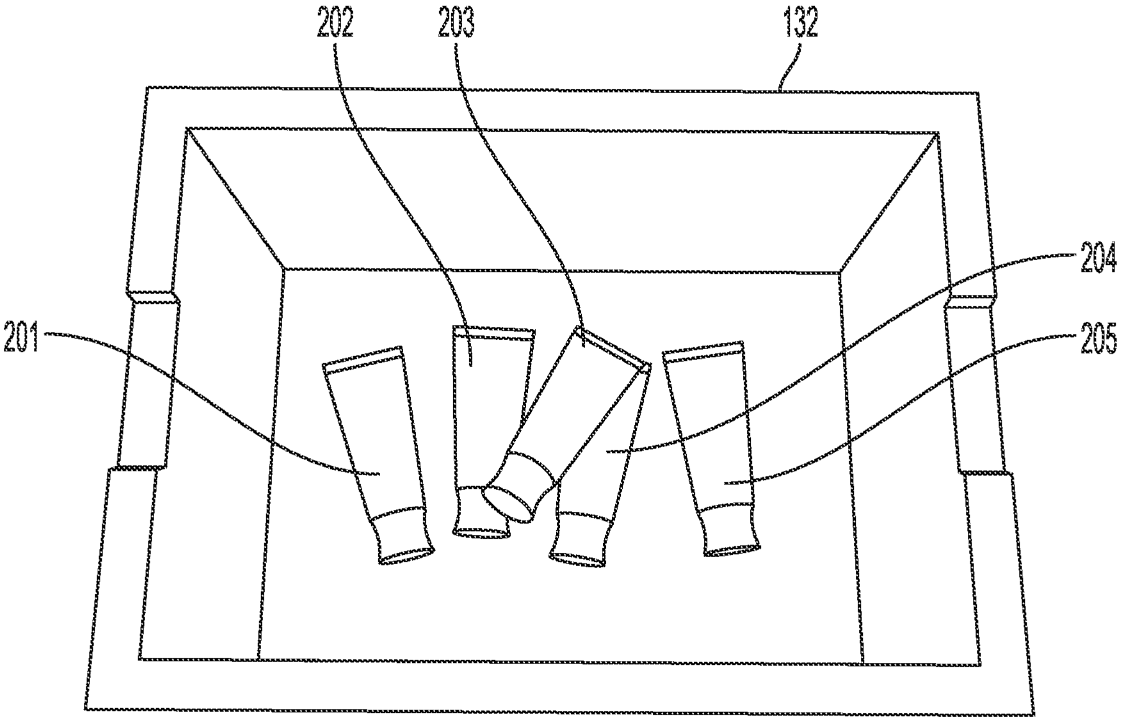
FIGS. 12A-12C show illustrative diagrammatic views of a view of a single-SKU bin in accordance with an aspect of the present invention, showing a camera view (FIG. 12A), a volumetric scan of the bin (FIG. 12B), and a volumetric scan of the bin after picking (FIG. 12C)

FIG. 12A shows a view of the container 132 from the perception system 160. The image view shows the tote 132 (e.g., on the conveyor), and the container 132 contains objects 201, 202, 203, 204, 205. While in certain systems, the objects in each infeed bin may be non-homogenous (multiple SKUs), in other systems, such as shown in FIG. 12A, the objects may be homogenous (single SKU). The system will identify candidate grasp locations on one or more objects, and may not try to yet identify a grasp location for the object that is partially obscured by other objects. Candidate grasp locations may be indicated using a 3D model of the robot end effector placed in the location where the actual end effector would go to use as a grasp location. Grasp locations may be considered good, for example, if they are close to the center of mass of the object to provide greater stability during grasp and transport, and/or if they avoid places on an object such as caps, seams etc. where a good vacuum seal might not be available.

Figure 12B:
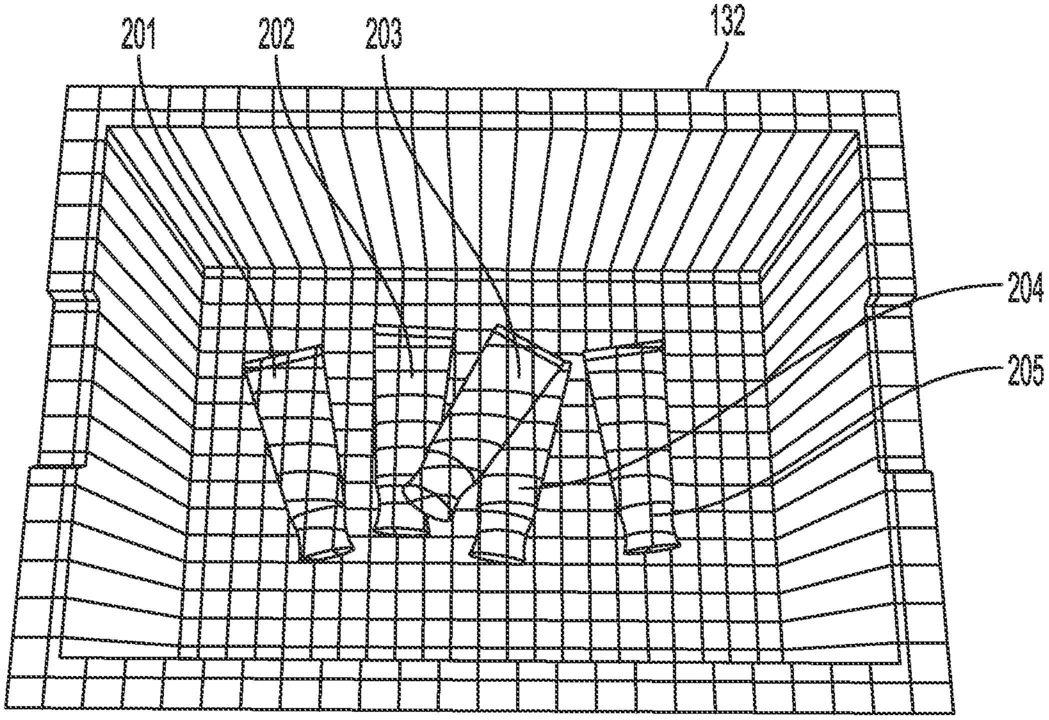
Figure 12C:
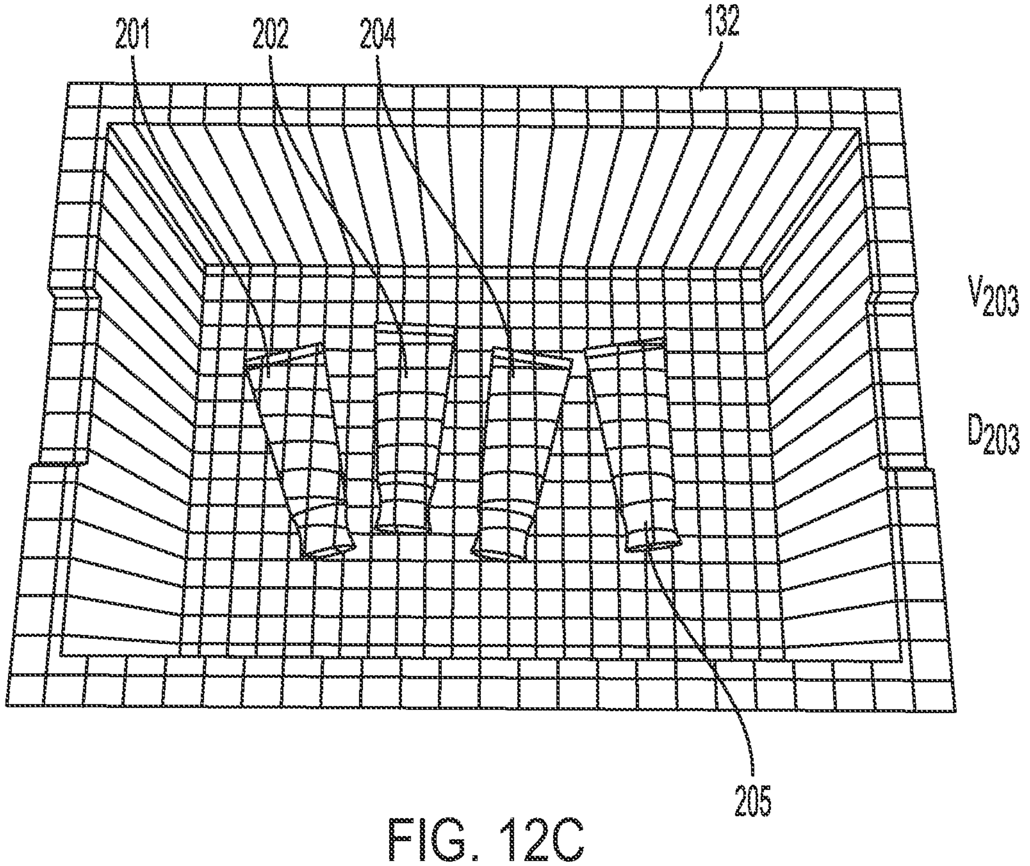

The perception system 160 includes among the perception units, scanning and receiving units as well as edge detection units for capturing a variety of characteristics of a selected object of the whole bin. Again, FIG. 12A shows a view from the capture system, which in accordance with an embodiment, may include a set of similar or similar objects 201, 202, 203, 204, 205. The difference in volume $V_{203}$ or density $D_{203}$ as scanned is shown in FIG. 12B and compared with recorded data regarding the item that is identified by the identifying indicia as provided by the detection system of the SKU induction system or the recorded object data. In particular, the scanned volume is compared with a volume of the identified SKU multiplied by the number of objects known to be in the bin. Following picking, the volume is scanned again (FIG. 12C) to confirm the volume of the picked object.

Figure 13A:
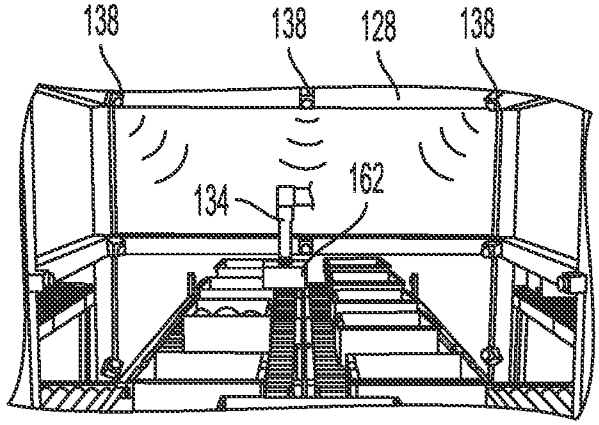
FIGS. 13A-13C show illustrative diagrammatic views of a grasp evaluation detection system for use in a system in accordance with an aspect of the present invention.
Figure 13B:
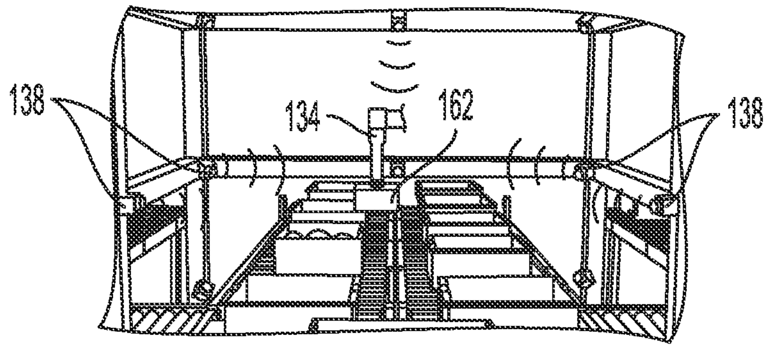
Figure 13C:
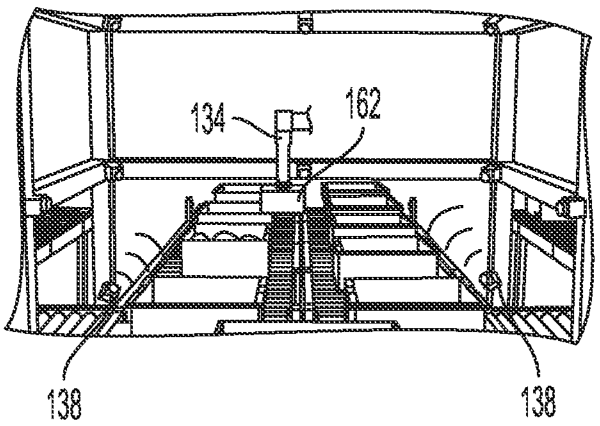

FIGS. 13A-13C show the grasp evaluation detection units 138 in the packing cell 120 (with certain elements removed for clarity). The detection units 138 include upper detection units that are directed downward toward an object 162 being held by the end effector 134 as shown in FIG. 13A. The detection units 138 also include middle detection units that are directed generally horizontally toward an object 162 being held by the end effector 134 as shown in FIG. 13B, and lower detection units that are directed upward toward an object 162 being held by the end effector 134 as shown in FIG. 13C.

Figure 14A:
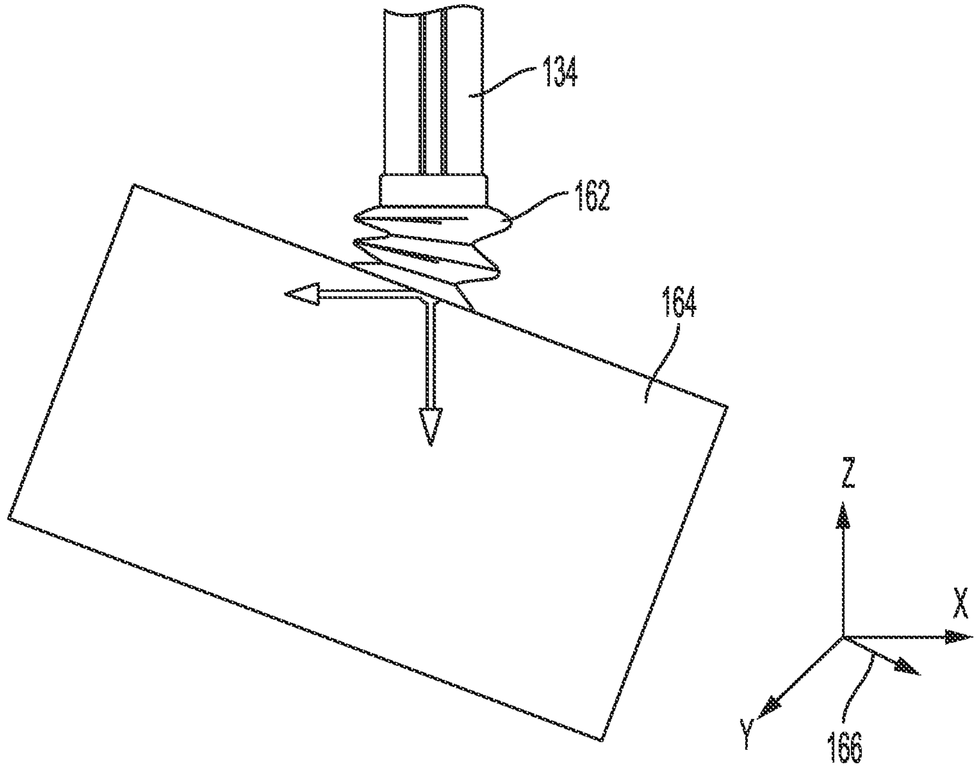
FIGS. 14A and 14B show illustrative diagrammatic views of different poses-in-hand for grasping an object, showing a grasp with additional forces on the object (FIG. 14A), and a compensated grasp (FIG. 14B) in accordance with aspects of the present invention.
Figure 14B:
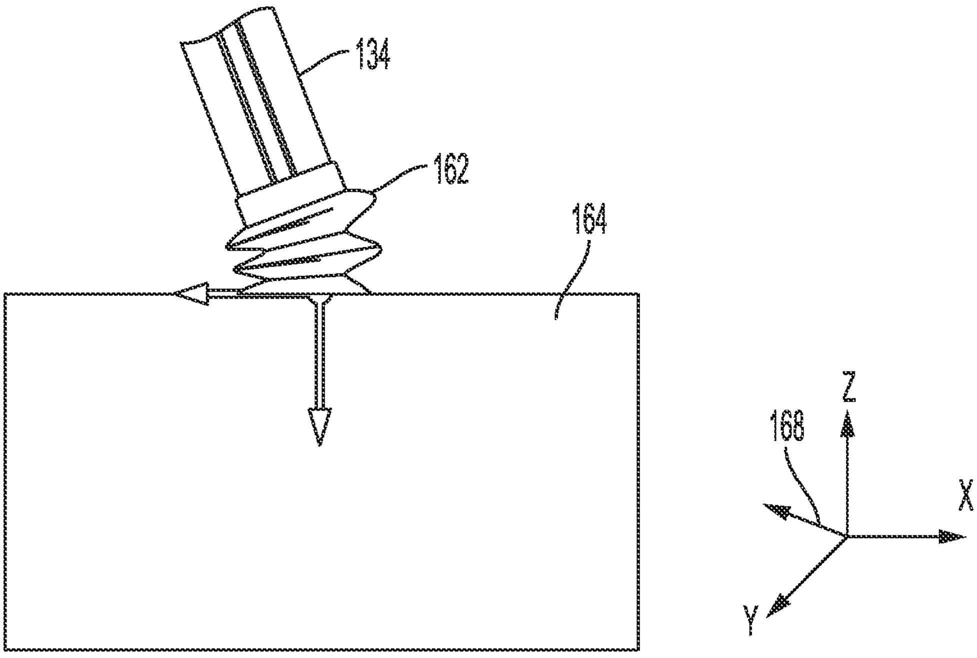

Once the pose-in-hand is thereby captured by the detection units 138 and sent to the robot application, which then needs to send a command to the robot that includes a time-series of joint angles, i.e., an arm trajectory. The arm trajectory needs to be chosen so as to place the item in a desired position and orientation. FIG. 14A, for example, shows at 170, a graphical representation of the end effector 134 that includes a flexible vacuum cup 162 that is deflected by a load (object 164). This load produces an unwanted force shown at 166, which load includes components in potentially x, y and z directions. To compensate for the load (as shown in FIG. 14B), the end effector 134 is moved to provide a counter force as shown at 168 equal and opposite to the force 166, and that again, includes components in the x, y and z directions.

The generation of the arm trajectory should happen in the last 100*s* of milliseconds while the item is en-route to the placement location. If not able to compute the compensating trajectory in real-time, then the system will pre-generate a roadmap of trajectories for candidate poses. It is called a roadmap because it connects multiple trajectories that are all linked by nodes (like intersections on a street map) representing common intermediate positions. The roadmap includes many 100*s* of thousands of trajectories, each of which starts at a common intermediate position and ends at a dense sampling of gripper positions and orientations. The common intermediate position is chosen so that by the time the robot arrives at it, the pose-in-hand estimate is already available. Then the best next trajectory on the roadmap can be chosen before the robot gets to the end of its current trajectory. The robot then smoothly transitions to a trajectory that results in the desired item placement. The placement trajectory may be simplified to being a simple downward motion so as to avoid complicated collision planning with the contents of the shipping container, if the item were to rotate or translate in x-y direction while in hand.

Figure 15A:
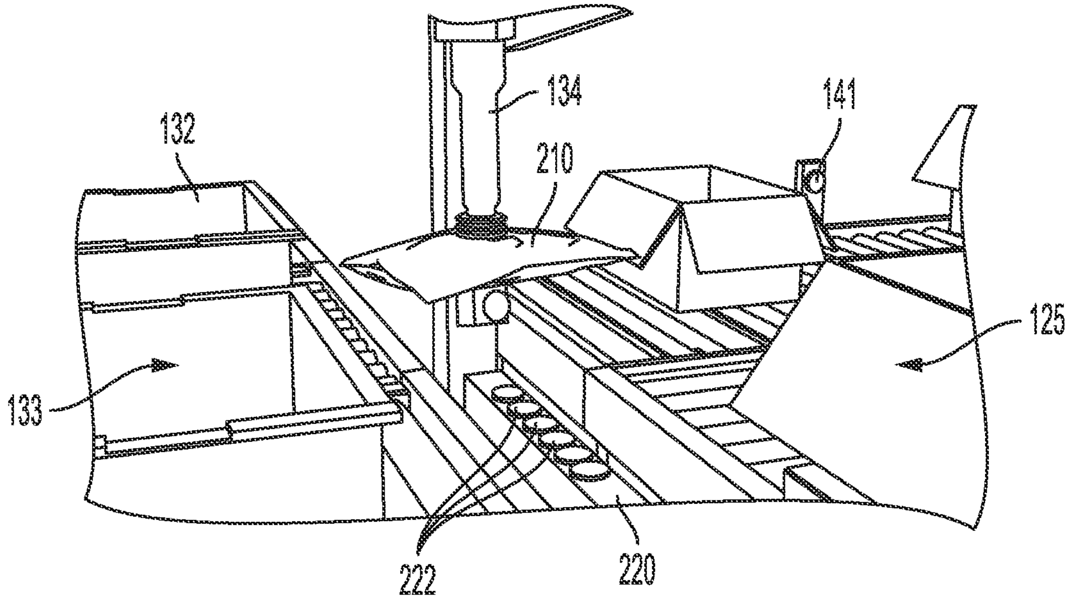
FIGS. 15A-15D show illustrative diagrammatic views of an object moving (swinging) grasp detection system in accordance with an aspect of the present invention.
Figure 15B:
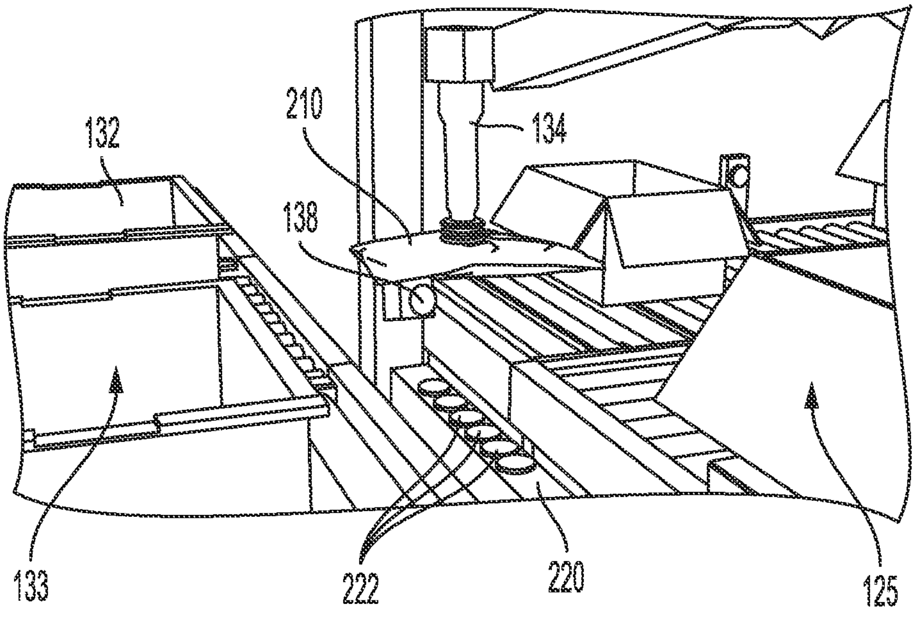
Figure 15C:
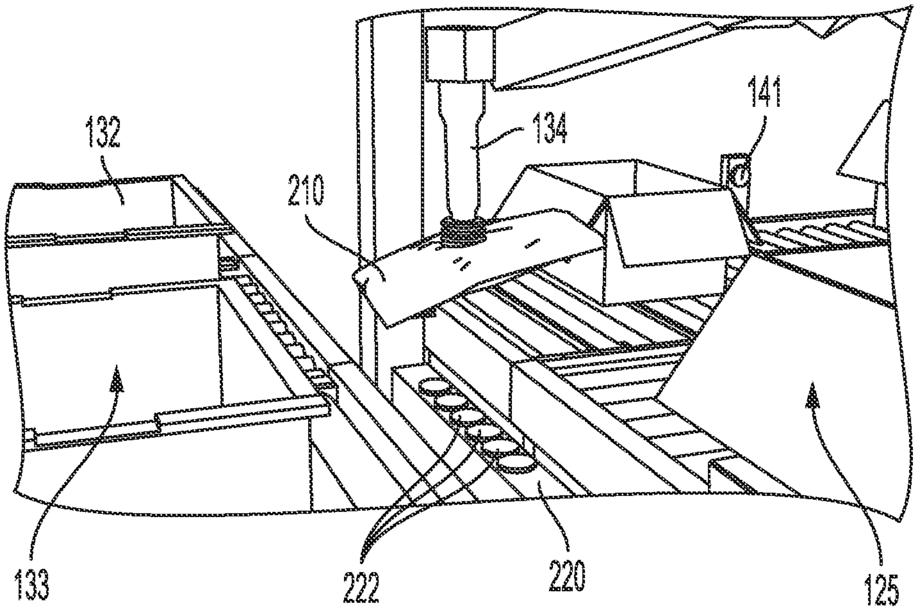
Figure 15D:
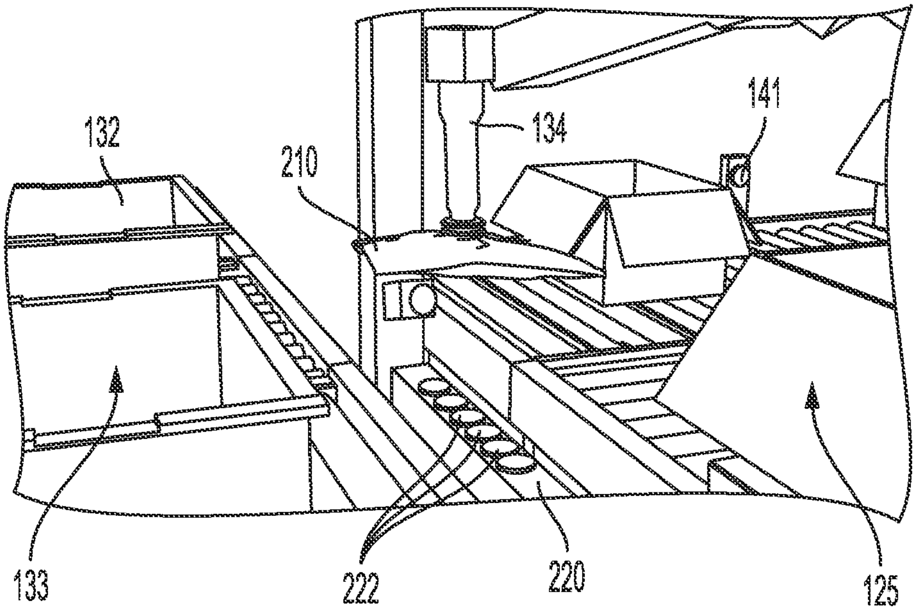

With reference to FIGS. 15A-15D, the picking cell may include a grasp detection system that assess whether an object is moving (e.g., swinging) while being grasped. The detection system may include a swing-detection system 220 that includes a plurality of perception units 222 that are directed toward a detection area intermediate the input totes 132, 133 and destination container 125 (e.g., a shipping box). Additional perception systems (e.g., 138, 141) discussed above may also be used, but the units 222 are directed specifically to an area between the input totes and destination container at which the end-effector 134 is programmed to stop. FIG. 15A shows the object 210 moving while grasped by the vacuum cup 224, and FIG. 15B shows the end-effector 134 stopped at the analysis are. With reference to FIG. 15C, the object 210 may continue to swing in the forward direction, and with reference to FIG. 15D, may even swing back in the reverse direction. While the use of a flexible vacuum cup 224 may result in a small amount of movement, the system will threshold any movement (swing) detection such that movement due to the flexible vacuum cup is excluded from object swinging movement. For example, an object that includes a flexible bag (e.g., a polyethylene bag) will undergo a more pronounced swing than will a rigid object such as a box.

The detection that an object being processed undergoing this swinging movement is recorded and used in the packing process, for example, by having the item not placed in a lower position in a container below other objects. Such objects that swing may be placed on top of other objects in a packing container (rather than below other objects) because objects placed on top of such a flexible object may move when placed, causing disruptions and uncertainties in the packing process. The system may for example, take plural pictures at different times to determine movement, and may therefore use these methods to detect whether an object held by the gripper is swinging. This information also impacts placement in that the system now knows to permit the item to stop swinging prior to placement into a shipping container, and may further adjust to moving the object more slowly. Again, this also impacts packing strategies as discussed herein.

Figure 16A:
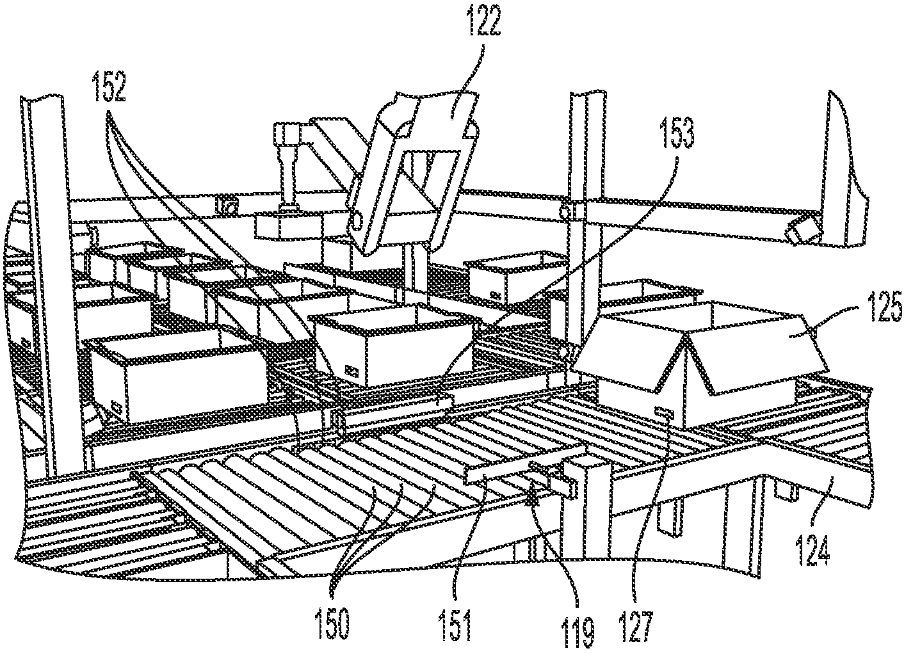
FIG. 16A-16D show illustrative diagrammatic views of a portion of a box alignment system for use in a system in accordance with an aspect of the present invention.
Figure 16B:
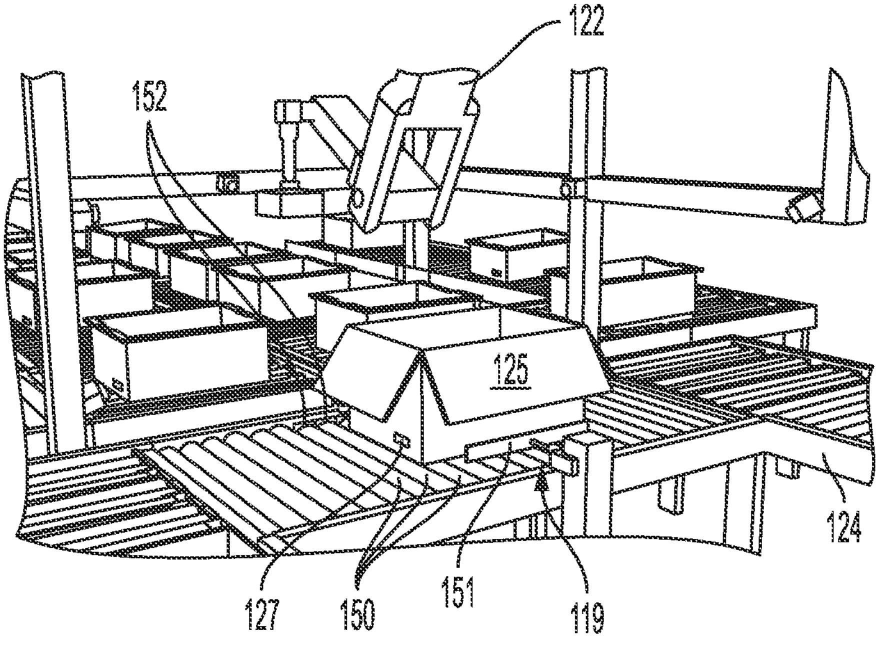
Figure 16C:
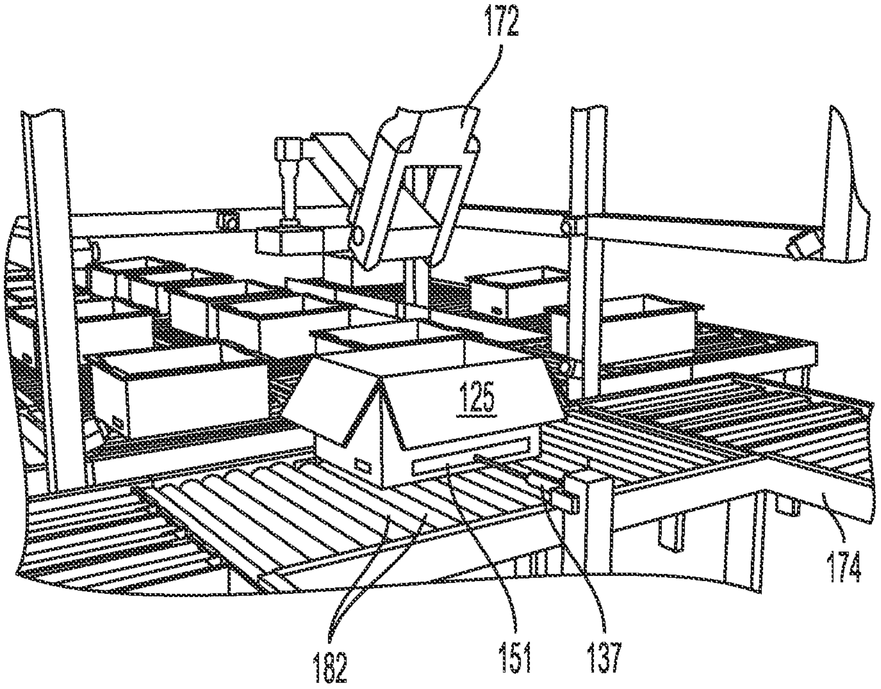
Figure 16D:
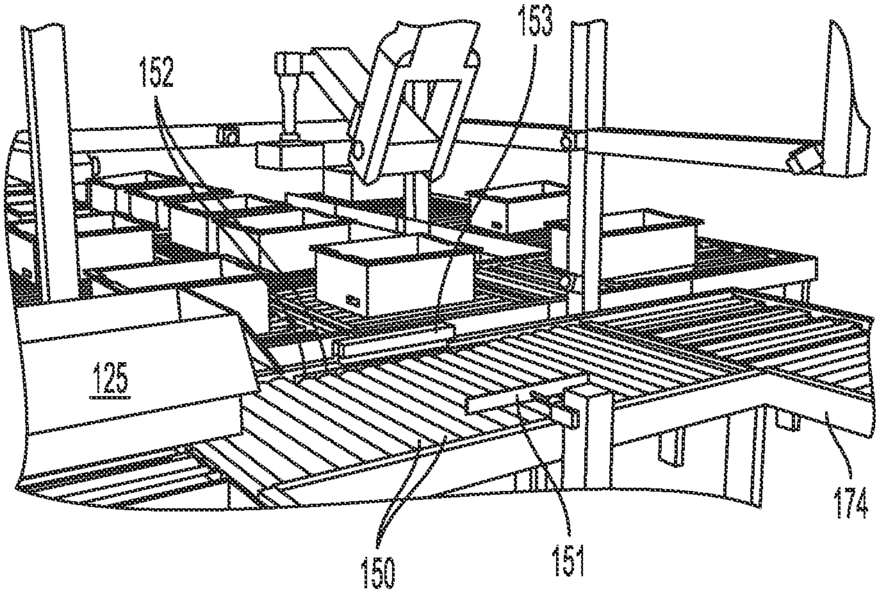

Additionally, and with reference to FIGS. 16A-16D, a destination container 125 on conveyor 124 is moved toward the programmable motion device 122 (as shown in FIG. 16A, and is stopped when the container 125 is positioned on the weight sensing conveyor section 117 (as shown in FIG. 16B). A brace bar 151 of the container alignment system 119 is moved against the container 125 and urges the container to a desired position on the conveyor 124 against a brace bar 153 of the container alignment system 119 (as shown in FIG. 16C). The articulated arm 122 may then process one or more objects to be provided to the container while the container is maintained at a known location and position between brace bar 151 and the brace rail 153. Once finished, the brace bar 151 releases the container, and the rollers are engaged to move the container further along the conveyor 124 (as shown in FIG. 16D) to further processing stations. Similarly, further weight sensing conveyors and the brace bar and rail system may be used with the totes 156 on the infeed conveyors.

Figure 17A:
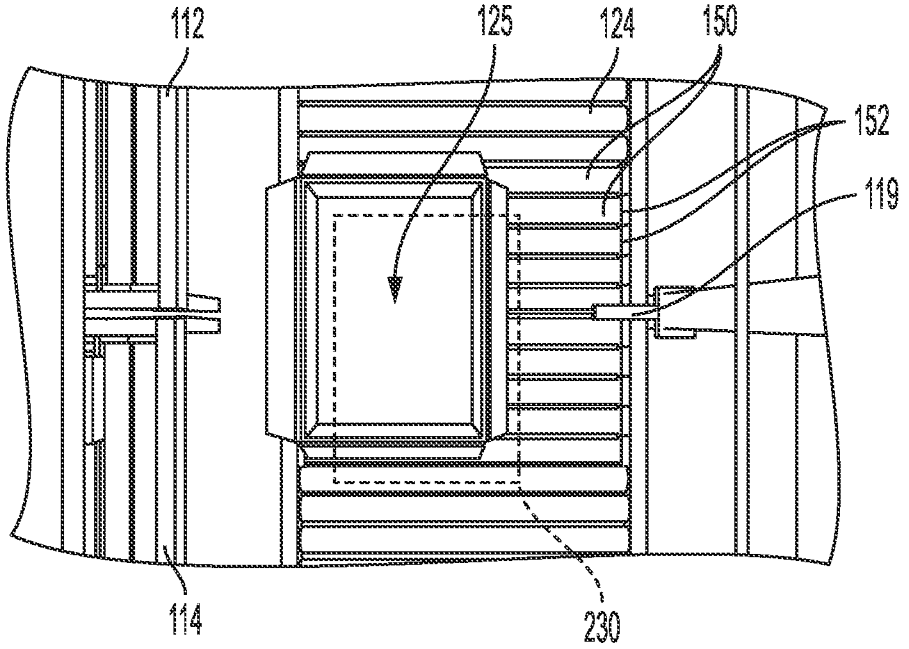
FIGS. 17A and 17B show illustrative diagrammatic views of a portion of a container position detection system for use in a system in accordance with an aspect of the present invention.
Figure 17B:
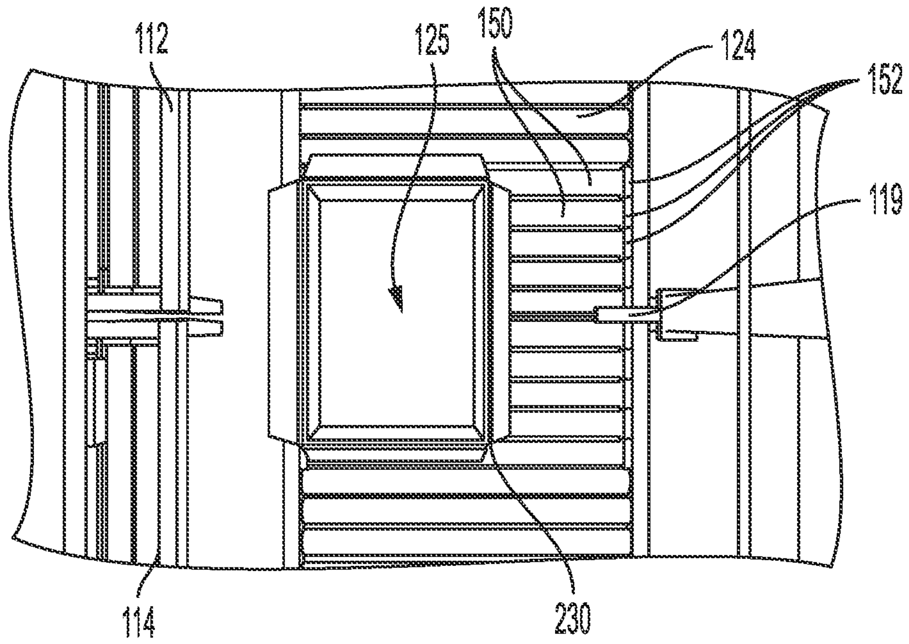

FIGS. 17A and 17B show a view from an above perception system (e.g., 160) that views a shipping container from above the container. In particular, the system will know that a shipping container 125 is positioned in the conveyor 124, and may have information regarding the general location on the conveyor due to the use of the weight-sensing conveyor rollers 150 with sensors 152, and due to the use of the box alignment system 119. Knowing the expected size of the box 125 (from stored modeling information) and taking into account the distance to the perception system (again, e.g., 160), the system will then seek to map a known profile of the top of the container onto the image in order to align the system with the exact location of the container 125. In certain embodiments, the stored modeling information may be used in connection with perception information from 3D depth sensors (again in perception unit 160) to measure features of the container to determine where the container is positioned in 3D. This registration information also facilitates avoiding having the end-effector contact (hit) the container during packing. FIG. 17A shows at 230 the known profile as being not yet aligned, the system will make an internal (software) adjustment to re-align with the actual container 125 as shown in FIG. 17B. Seeking to register the box top opening avoids issues with regard to variable positions of the flaps.

As discussed above, the system includes one or more perception units 139 located on or near the in-feed conveyor for identifying indicia on an exterior of each of the containers 116, providing perception data from which the contents of the bin may be identified, and then knowing its relative position on the conveyor 112, 114, track its location. It is assumed that the bins of objects are marked in one or more places on their exterior with a visually distinctive mark such as a barcode (e.g., providing a UPC code) or radio-frequency identification (RFID) tag or mailing label so that they may be sufficiently identified with a scanner for processing. The type of marking depends on the type of scanning system used, but may include 1D or 2D code symbologies. Multiple symbologies or labeling approaches may be employed. The types of scanners employed are assumed to be compatible with the marking approach. the marking, e.g. by barcode, RFID tag, mailing label or other means, encodes a identifying indicia (e.g., a symbol string), which is typically a string of letters and/or numbers. The symbol string uniquely associates the vendor bin with a specific set of homogenous objects. Each of the single-SKU infeed containers (e.g., bin or totes) may include indicia identifying the bin or tote, and perception units may be positioned along the conveyors that detect the indicia, thereby knowing the identity and location of each single-SKU container (e.g., bin or tote).

The operations of the system described above are coordinated with a central processing system 100 that communicates (e.g., wirelessly) with the articulated arm 122, perception systems 138, 139, 160, as well as conveyors 112, 114, 124 and weight sensing conveyor sections. This system determines from symbol strings the UPC associated with a vendor bin, as well as the outbound destination for each object. The central control system 100 is comprised of one or more workstations or central processing units (CPUs). For example, the correspondence between UPCs or mailing labels, and outbound destinations is maintained by a central control system in a database called a manifest. The central control system maintains the manifest by communicating with a warehouse management system (WMS). The manifest provides the outbound destination for each in-bound object.

The Pack Planner generates a pack plan for orders, and in particular, for a multi-item order. Given the items, with their weights and dimensions, in an order, the planning system will determine a pack plan that satisfies a variety of constraints, such as putting smaller items on top of bigger ones, and packing objects with low pose authority and/or low position authority later or last. The constraints are fed to an optimization program that generates a constraint-satisfying sequence that the items should arrive in, so that they can be automatically packed on a cardboard sheet.

Figure 18A:
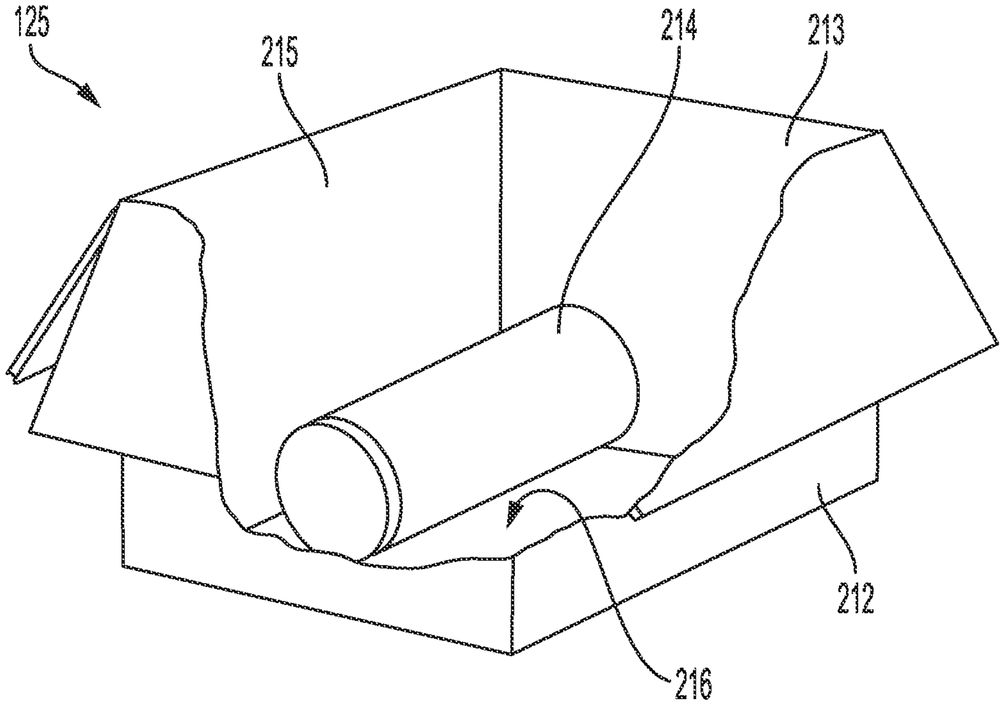
FIGS. 18A and 18B show illustrative diagrammatic views of a container portion of a packing process for use in a system in accordance with an aspect of the present invention.
Figure 18B:
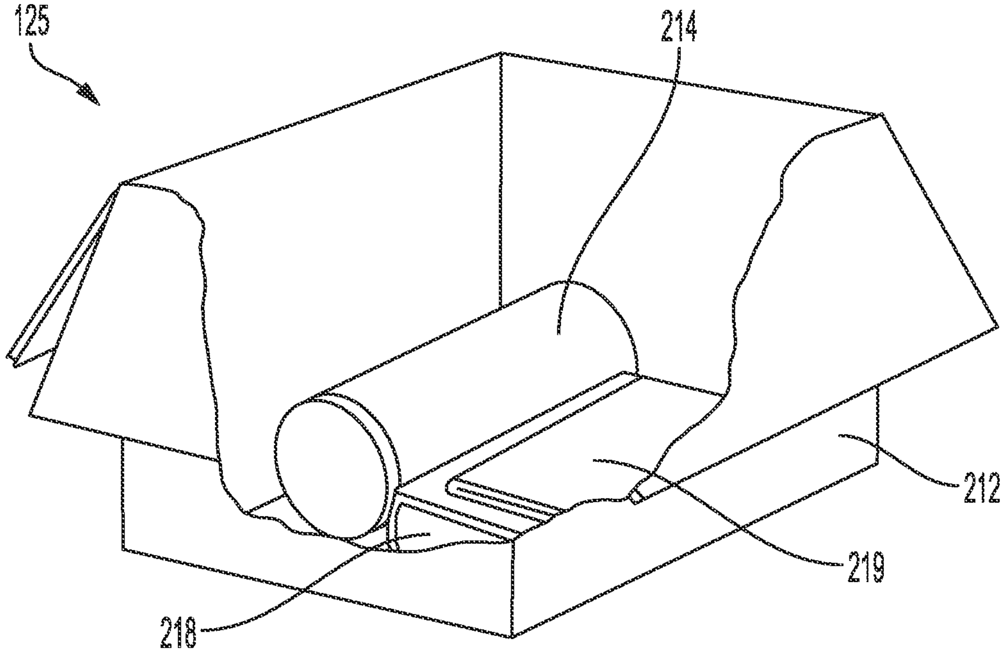

FIG. 18A shows the container 125 (e.g., packing box) into which objects are to be packed, for example, reserving a larger area that is designated for packing a larger object, and a smaller area for packing a smaller object. The system knows the position and orientation of the walls (e.g., 212, 213, 215 as shown) of the box 125. The box 125 may for example, receive an object 214 that the systems knows has (or has determined to have) a low position authority (ability to remain in a position when placed). Such objects may for example, include objects with outer surfaces that are generally cylindrical or spherical. The system may then place the object 214 into the box biased against one or two sides of the box (213, 215), leaving a larger space 216 for further objects. With reference to FIG. 18B, further objects 218, 219, may then be placed into the larger space 216 that was left open in the box, placing the larger of the two new objects (218) on the bottom.

FIGS. 18A and 18B illustrate some potential rules for ordering that will be incorporated into the pack planner. The chosen rule set will depend on characteristics of the shipping container. The rule set may include for example, but is not limited to: place the biggest item first, place items smaller above larger items (to yield the most item stacking), place the heaviest items first (to avoid crushing other items), place known fragile items last (to avoid crushing them), place items with low position authority at risk of rolling last (to avoid having them roll in the way of the next pick), and place non-rigid items with low placement authority last (so that subsequent placements do not topple). Some rules may conflict with one another, to be resolved with context-associated parameters. The system may tune or learn through experiment the relative importance of the rules and determine which ones take priority. The system plan yields the positions and locations of all the items in the order, as well as the sequence in which they should arrive at a cells, and the size of the box into which the objects will fit. These latter requests are routed to the warehouse management system (WMS) via the software interface.

In order to make effective and reliable plans, the Pack Planner will require SKU information including weight, dimensions, and potentially other SKU properties such as pose authority and position authority e.g., whether it rolls or is non-rigid. Other information such as the raw data from a dimensioning device, such as a Cubiscan system sold by Quantronix, Inc. of Hamden, CT, are also expected to improve performance of packing. Part of the work involves developing a mutually acceptable schema, while bearing in mind the cost of obtaining any information.

In accordance with further aspects, the system also provides for shipping container retaining mechanisms. As the robot is placing an item into a box, the item may graze a box wall, for example. There may be a need for a mechanism to retain the shipping container in accordance with certain aspects of the invention. The type and need of retaining mechanism will depend on the shipping container. The system will also provide for analyses of requirements, such as a need to include range of shipping container sizes, or potentially types; the design, implementation and testing of the retaining mechanism; and the electromechanical integration into the Single-Pick and Multi-Pick Cells (as discussed in further detail below).

In accordance with further aspects, the system may provide exception detection and exception handlers. While the combination of picking software and hardware will result in efficient and effective object picking and placement in most instances, real-world conditions at warehouses occasionally require detection and mitigation of exceptions. Mitigations may be automatic, for example, selecting an alternative grasp pose, or may require manual intervention indicated via the User Interface or by routing the exception to a QA/QC station. A user interface provides a detailed exception cause and gives the operator the ability to indicate that the condition has been resolved and the robot can resume picking.

One exception that robotic picking solutions may encounter is a multi-pick, where the robot unintentionally grasps multiple items. This may occur due to non-optimal grasp locations or due to packaging defects that accidentally bind multiple items together. Pick cells address this problem through a high-accuracy scale mounted under the picking and destination location. When the software detects that the mass of held items exceed the expected mass of a single item by a significant margin, the software compensates for the multi-pick by instructing the arm to return the items to the inbound container.

The system analyzes the effectiveness of this detection mechanism, and if necessary, accelerate development of additional detection mechanisms such as volumetric measurements of the picked items by Pose-in-Hand scanning. Another exception that may occur is an object being incorrectly placed into an outgoing box. An example of this would be a large object that is placed such that it does not fit within the outbound container. The system will assess the frequency of this exception, and if necessary, develop sensing mechanisms to detect this condition and mitigations that may include re-grasping and manipulation of the item or marking the outbound container to be sent to a QA/QC station before heat shrinking and shipping.

In accordance with various aspects therefore, the invention provides system and methods that facilitate the automated processing of objects at processing cells, whether from single SKU or multi-SKU supply bins. The system for example, provides pose-in-hand scanning and estimation processes, by which sensors and computer processes estimate how items are held by the gripper. The system also provides pose-in-hand-compensation placement planning systems by which motion planning processes compensate for how items are held by the gripper and do so fast enough to sustain high throughput rates. The system also provides pack planning processes by which a pack planner system prescribes a SKU sequence, determines most appropriate box sizes and specifies positions of orientations of all items in the shipping container, while considering ordering constraints such as placing rigid items first. In accordance with further aspects, the system provides shipping container retention mechanisms by which the system may optionally hold the shipping container in place while items are being placed to mitigate effects of running into shipping container walls. In accordance with further aspects, the system provides exception detectors and handlers such that perception and application processes detect when exceptions occur—such as items being placed in the wrong position or orientation—and take actions to automatically correct, or to signal for a QA/QC check.

During operation, barcode scanners scan an identification marker on inventory containers (e.g., totes) prior to arriving at the cell to lookup the SKU. Then, the cell initiates the construction and/or provision of an appropriately sized shipping container via WCS/WMS, to arrive on time for packing the corresponding SKU. Inventory totes queue up on the inbound inventory conveyor and stop at a right-angle belt-transfer within reach of the robot. The cell is then fed a sequence of appropriately sized empty shipping containers by belt conveyor and done so in an order matching the order of arrival of SKUs. As the item is being lifted out of the inventory tote, it is scanned, and the pose and orientation of the unit are determined to enable placement. The unit is placed onto and within the extents of the shipping container, by compensating for the known position and orientation of the unit relative to the gripper.

A scanner above the packing container monitors for instances where the resulting unit placement is unsuitable for packing—i.e., lies outside of shipping container—in which cases the unit will be re-grasped and re-placed, or directed to quality assurance (QA) stations. A barcode on the shipping container is scanned, or the shipping container is marked with a barcode to associate the unit and shipping container with the corresponding order. During the placement of the unit from one inventory tote, the contents of the second inventory tote are scanned to prepare for the next pick. The belt-transfer conveys the cardboard sheet with a single inventory unit onto a conveyor belt, which feeds the final packaging machines, such as shrink-wrapping and box or box-closing machines. If no more single picks from the inventory tote are needed, then the tote is transferred to the outbound conveyor. Otherwise, the inventory tote is held, and another pick is made. The process repeats as picking starts on the second inventory tote.

Figure 19A:
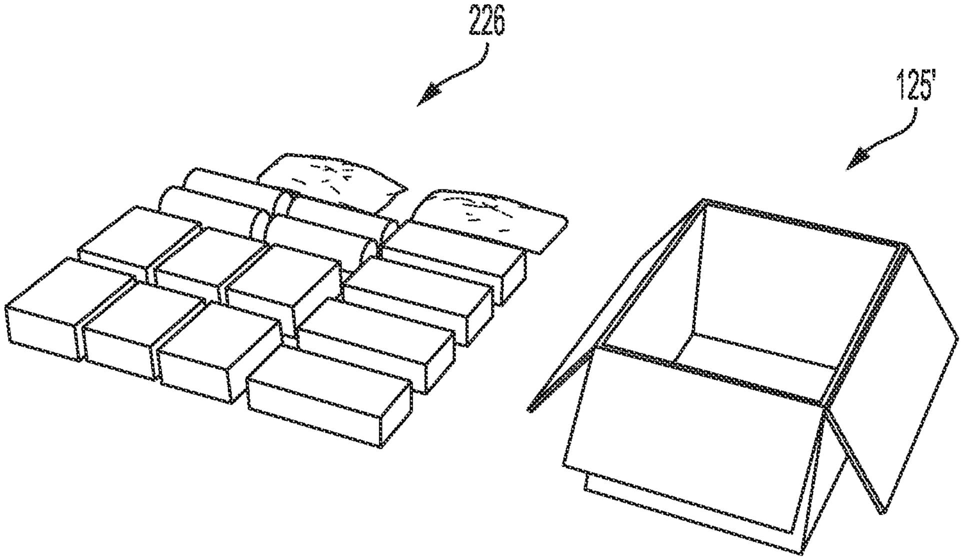
FIGS. 19A and 19B show illustrative diagrammatic views of container packing strategies in a system in accordance with an aspect of the present invention.
Figure 19B:
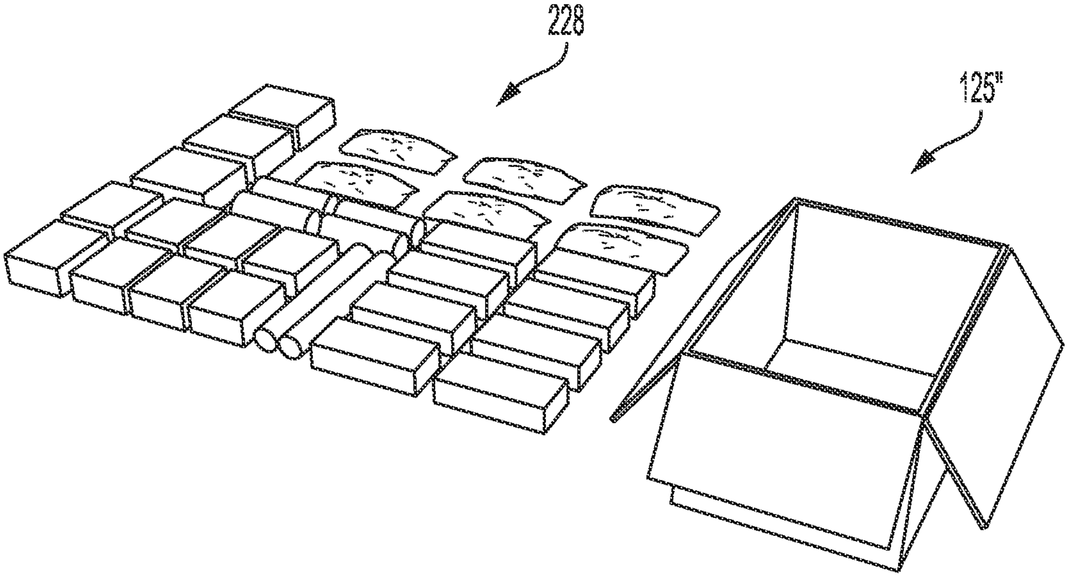

With reference to FIGS. 19A and 19B, the system may assign shipping containers knowing the set of contents and knowing the planned packing plan as discussed below. The system, for example, may assess that a first set of objects 226 as shown in FIG. 19A should be packed into a box 125', while a larger set of objects 228 as shown in FIG. 19B should be packed into a larger box 125". The system, may for example, knowing the volume of the individual objects and the number of different objects, approximate a packing volume by summing the individual object volume and adding 10% or 15% or 20% for packing volume, depending at least in part, on assigned distances (margins) between the objects and between the objects and the container as discussed further below.

Figure 20:
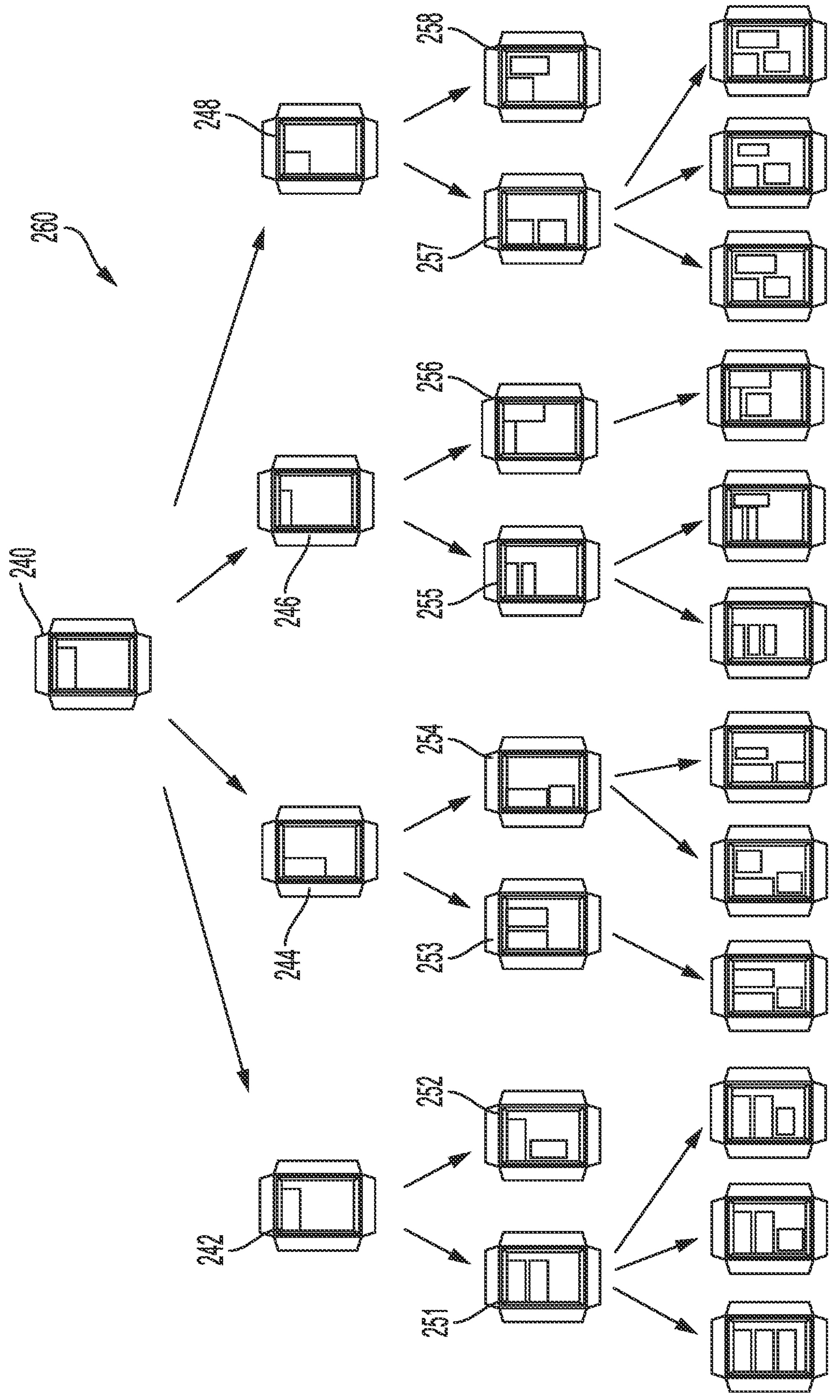
FIG. 20 shows an illustrative diagrammatic view of a portion of a packing planning system for use in a system in accordance with an aspect of the present invention.

With reference to FIG. 20, knowing the set of objects to be packed together, and knowing the intended container, the system will undergo an analysis of different combinations (permutations) of packing sequences, orientations, and locations of the objects in the set. For example, FIG. 20 shows diagrammatically, a container 240, and the system will compute combinations of packing the objects that first start with a first object in a first position and orientation (as shown at 242), as well as the first object in a the first position in a second orientation (as shown at 244). Combinations that begin with a second object in a first position and orientation are shown at 246, and combinations that begin with a third object in a first position and orientation are shown at 248. While the diagram does not show all permutations, the system may compute packing arrangements for all combinations. FIG. 20 shows diagrammatically at 260 that a further level of such combinations is also determined.

An off-line system accepts pack requests and responds with a list of viable pack plans. The system uses simulation to find an ordering of units that produces a feasible pack plan. The on-line system uses the same underlying algorithm with a container heightmap and pose-in-hand data to iteratively determine the best placement for each next object. A place-planner routine determines the path that the articulated arm has to take in order to achieve the desired placement. The pose-in-hand routine determines how the unit is held by the gripper. In order to place objects into boxes and to later pack other objects efficiently, the system knows the pose-in-hand of each object while being grasped as discussed herein. The place planner performs searches in six-dimensional space, and these are done off-line to provide pre-computed paths. In an on-line place planning mode, the system reacts at each step to the preceding placements.

The container heightmap constructs a map of the contents of the box for the purpose of finding a good place to put each next object. The system also has the ability to re-plan dynamically in response to the state of an outbound container as it is packed. The system thereby compensates for inaccuracies in outbound boxes and placement, and mitigates rolling, shifting or toppling of units in the outbound container. All packing is done with one end-effector as there is no second end-effector to hold an item out of the way. All objects are also placed only once, as it is desired to not move objects that have already been placed. To pack an object safely and with efficient use of volume, the system knows how the object is being held by the gripper while it is being held (pose-in-hand as discussed herein). This provides not only information about the orientation of the object and the gripper, but also information regarding the height of the object.

Assumptions that may be used in the system include assumptions that off-line information (or on-line measurements as they may be determined) are as follows: object mass information that is accurate within 5%, object dimensions that are accurate within 5 mm, items shape characteristics (e.g., that an item is not spherical) be accurate, and that objects are placed such that the largest face (surface) of the object is face up.

The pack planning routine executes with an order is received, and each order is evaluated for compatibility with a given box size from smallest to largest. For each box, the system will attempt to create a pack plan for the order and the box. The smallest box used in a successful pack plan is used. If no pack plan could be created for any box, then the order is routed to exceptions as it cannot be packed. As discussed above, the pack planner performs a search of all successive packing steps, considering all or almost all possible ordering of objects, and all possible positions and orientations of the objects in the order. If multiple pack plans exist that fit the objects in a box, the pack plan chooses the plan with the smallest maximum object height. The pack plan may maintain certain constraints, including a minimum distance between objects, a minimum distance between objects and the container wall, a maximum object height, that only stackable objects are stacked, and that constraints on object size and characteristics are respected.

Figure 21:
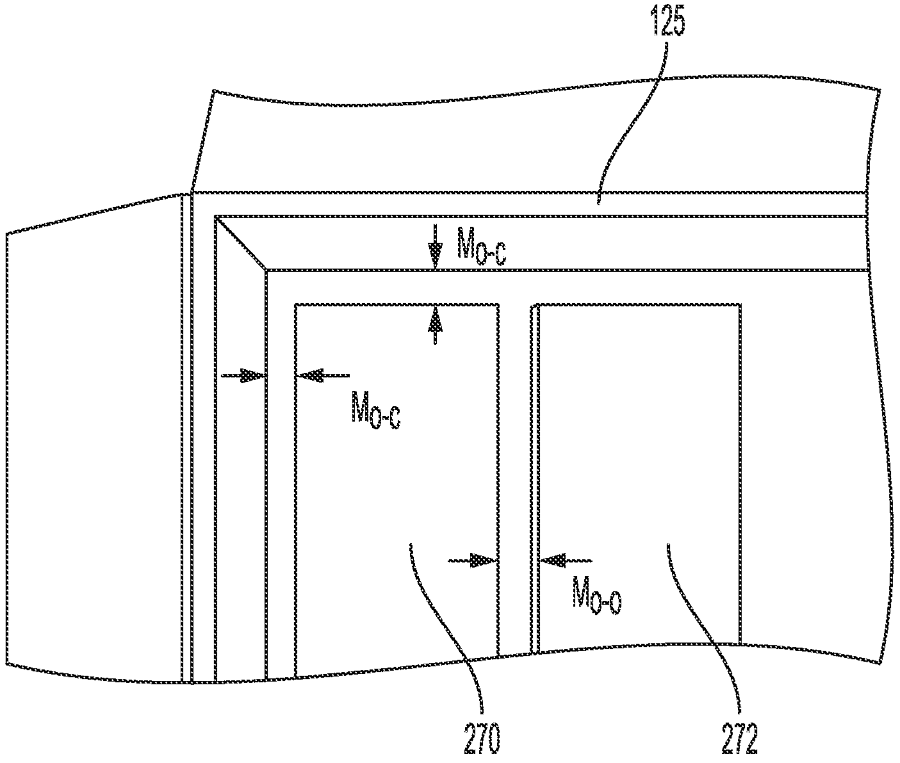
FIG. 21 shows an illustrative diagrammatic view of a portion of a container being packed, showing container-object margins and object-object margins for use in a system in accordance with an aspect of the present invention.
Figure 22:
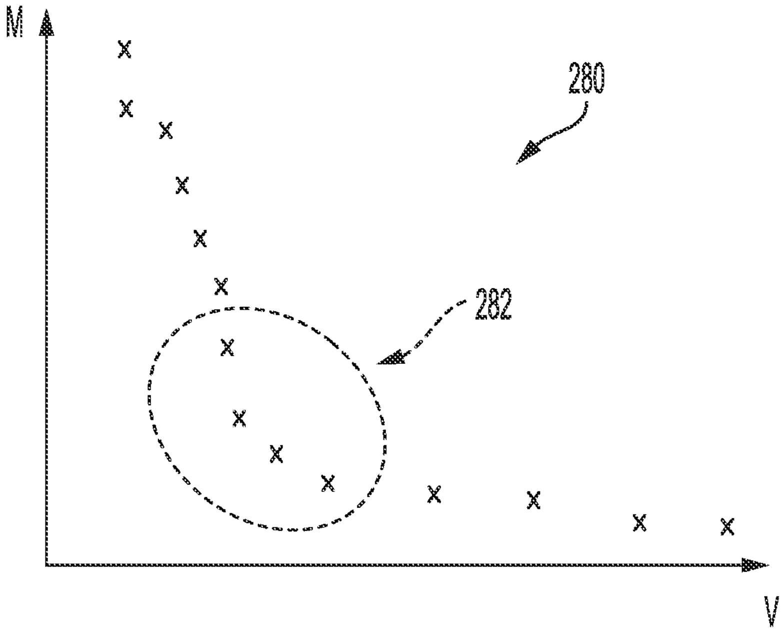
FIG. 22 shows an illustrative graphical representation of a relationship between margins and packing volume in a system in accordance with aspect of the present invention.

FIG. 21 shows the container 125 with objects 270 and 272 packed therein. The distance (herein called margin) between the objects 270 and 272 is shown at $M_{o-o}$, and the distance between the objects and an adjacent container inner wall is shown at $M_{o-c}$. With reference to FIG. 22, the system employs relaxation as a strategy for certain parameters such as margins. This involves adjusting both object-to-object margins as well as object-to-container margins dynamically in combination with the pack plan strategies. FIG. 22 shows at 280 that with large margins, the packed volume is rather low, and with smaller margins, the pack volume increases. The system herein, may begin computations with larger margins (conservative), and iteratively re-compute with smaller margins until an inflection region is entered as shown at 282, when the benefit of increased volume with margin reduction diminishes. Margins in this inflection region are preferred.

In accordance with further aspects, the system provides compensation for deflection by the gripper (e.g., a flexible vacuum cup gripper). Given a point on a rigid object in which a system has detected where on a face the robot is holding the item, it is possible to calculate the angle at which the system needs to hold the object in order to hold it level for placing. Because the torque exerted by the vacuum cup is approximately linear in the amount of its deflection, the required offset angle may be computed by finding the root of a trigonometric equation.

Figure 23A:
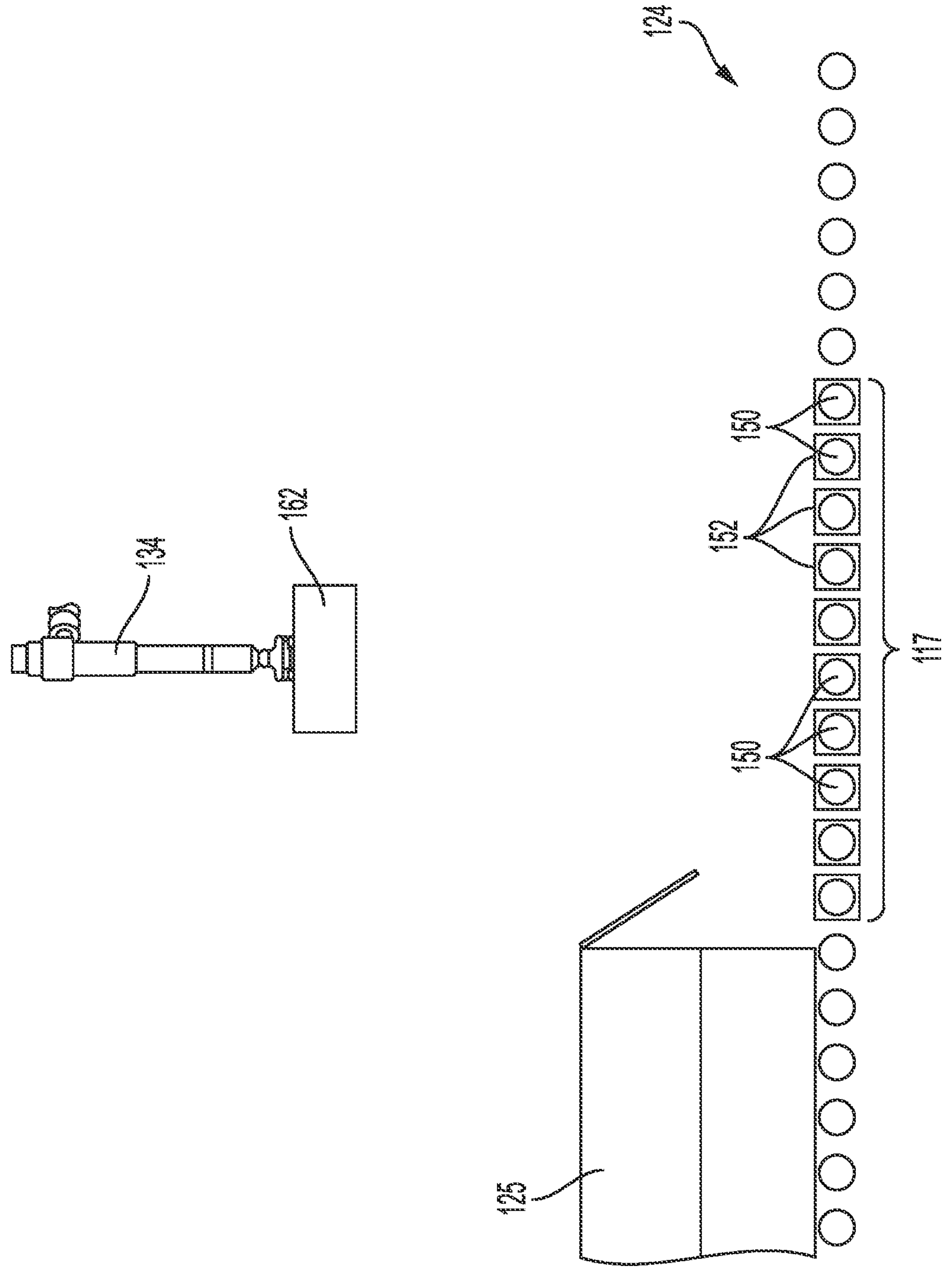
FIGS. 23A-23E show illustrative diagrammatic views of an end-effector of a programmable motion device placing an object into a container in a system in accordance with an aspect of the present invention.
Figure 23B:
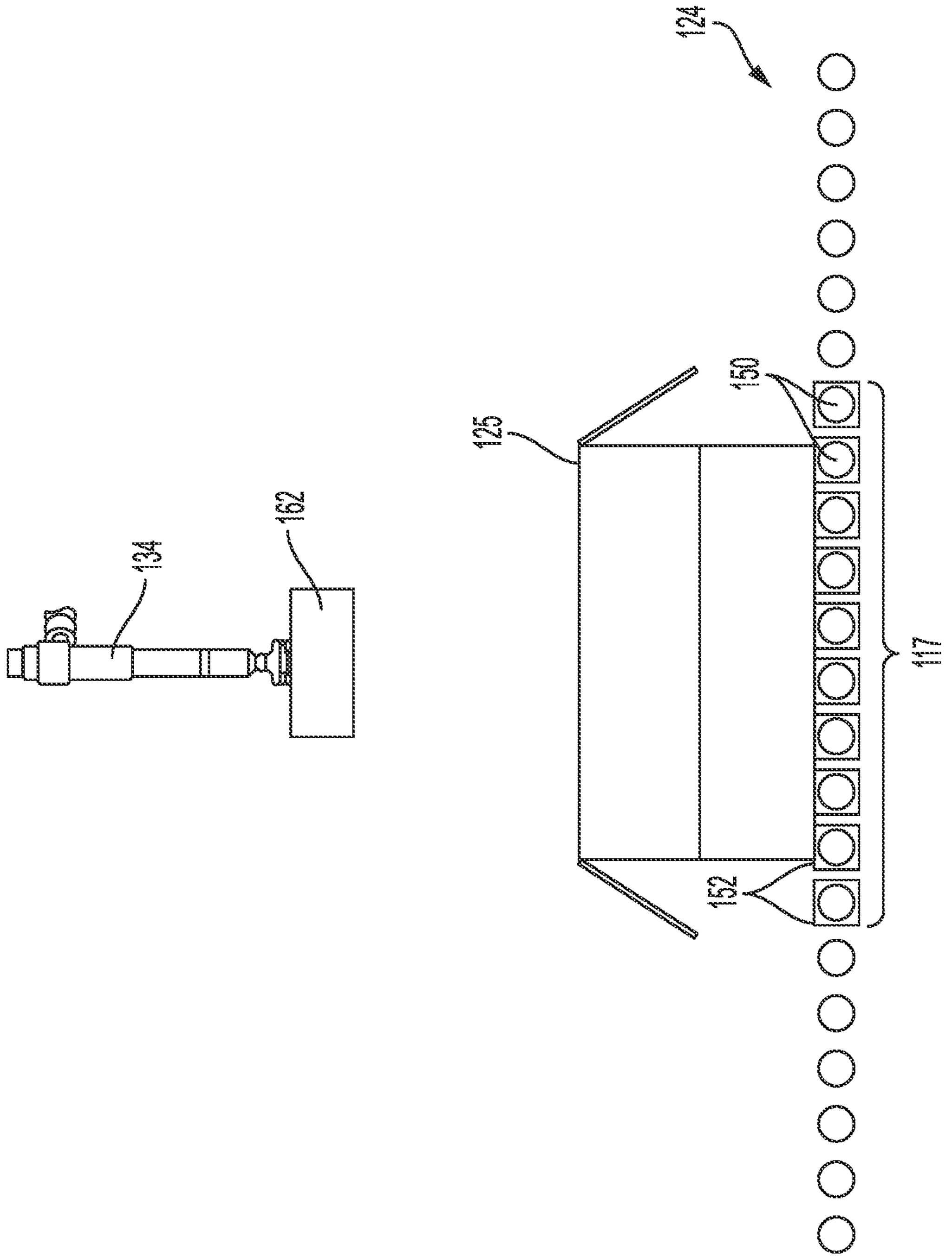

FIGS. 23A-23E show a particular object placement process in accordance with an aspect of the present invention that involves placing an object into a destination container (such as a shipping box) without dropping the object (no drop impulse force) and without pushing into the box (no compression force). In particular, FIG. 23A shows the end effector 134 holding the object 162 to be placed into the shipping box 125 on the weight-sensing portion 117 of an output conveyor 124 at a processing station. The output conveyor 124 includes traditional rollers as well as the weight sensing section 117 that includes rollers 150 mounted at either respective end on force torque sensors 152 as discussed above. The force torque sensors 152 provide weight information data regarding forces applied to the rollers 150. As shown in FIG. 23B, when a shipping box 125 is moved onto the weight sensing section 117, the box is thereby positioned below the end effector 134 and the object 162. The system may be able to determine not only that the shipping container 125 is positioned on the weight sensing portion 117, but may also determine the positional placement on the rollers 150 confirming whether it is centered and confirming the box's size in the conveyor direction. The detected weight of the box will also serve to confirm that the expected box to be presented at the station is in fact presented.

Figure 23C:
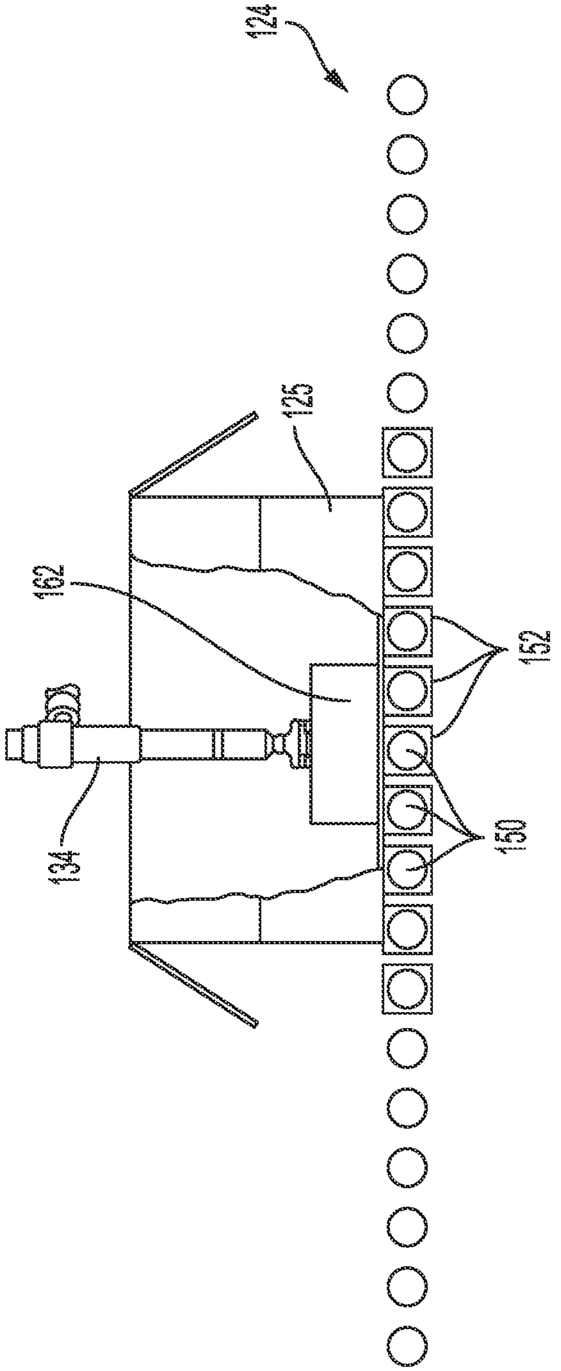
Figure 23D:
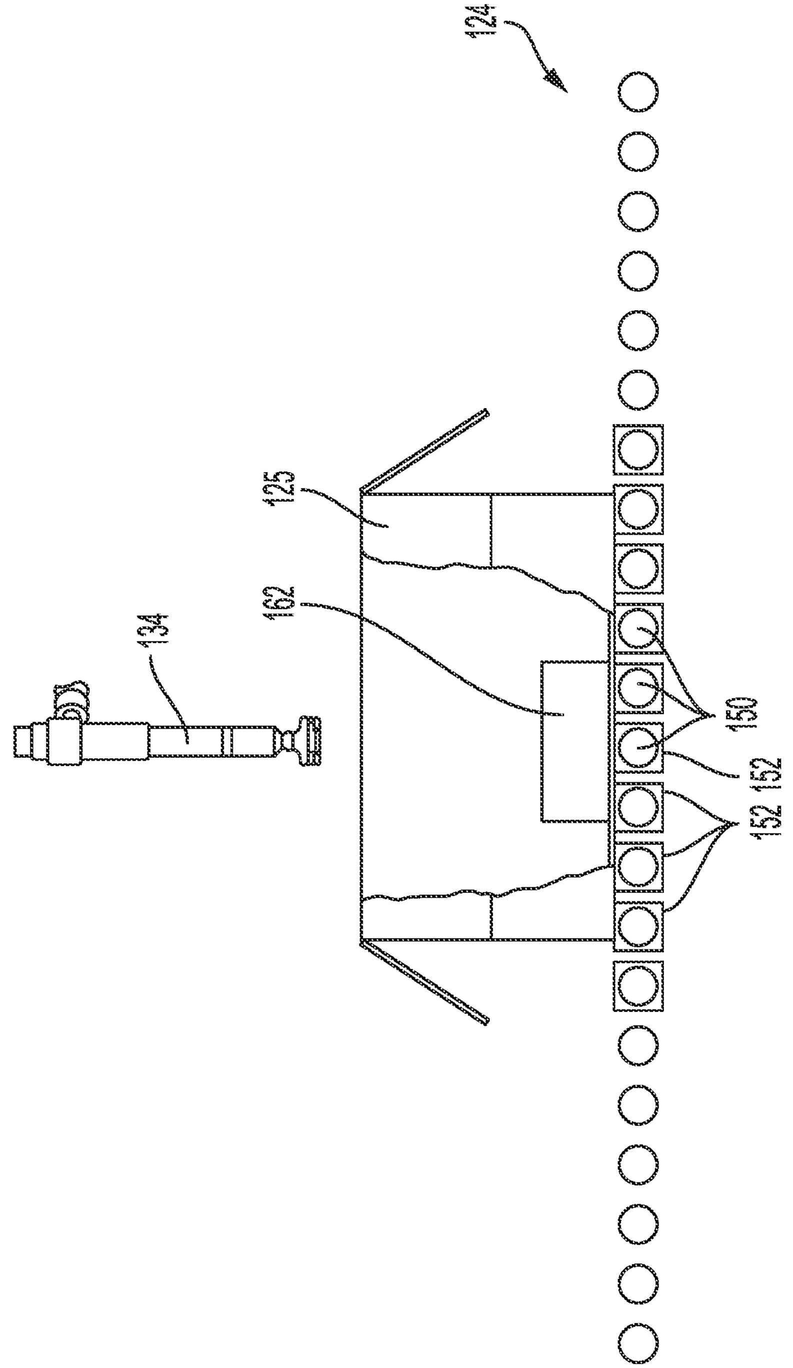
Figure 23E:
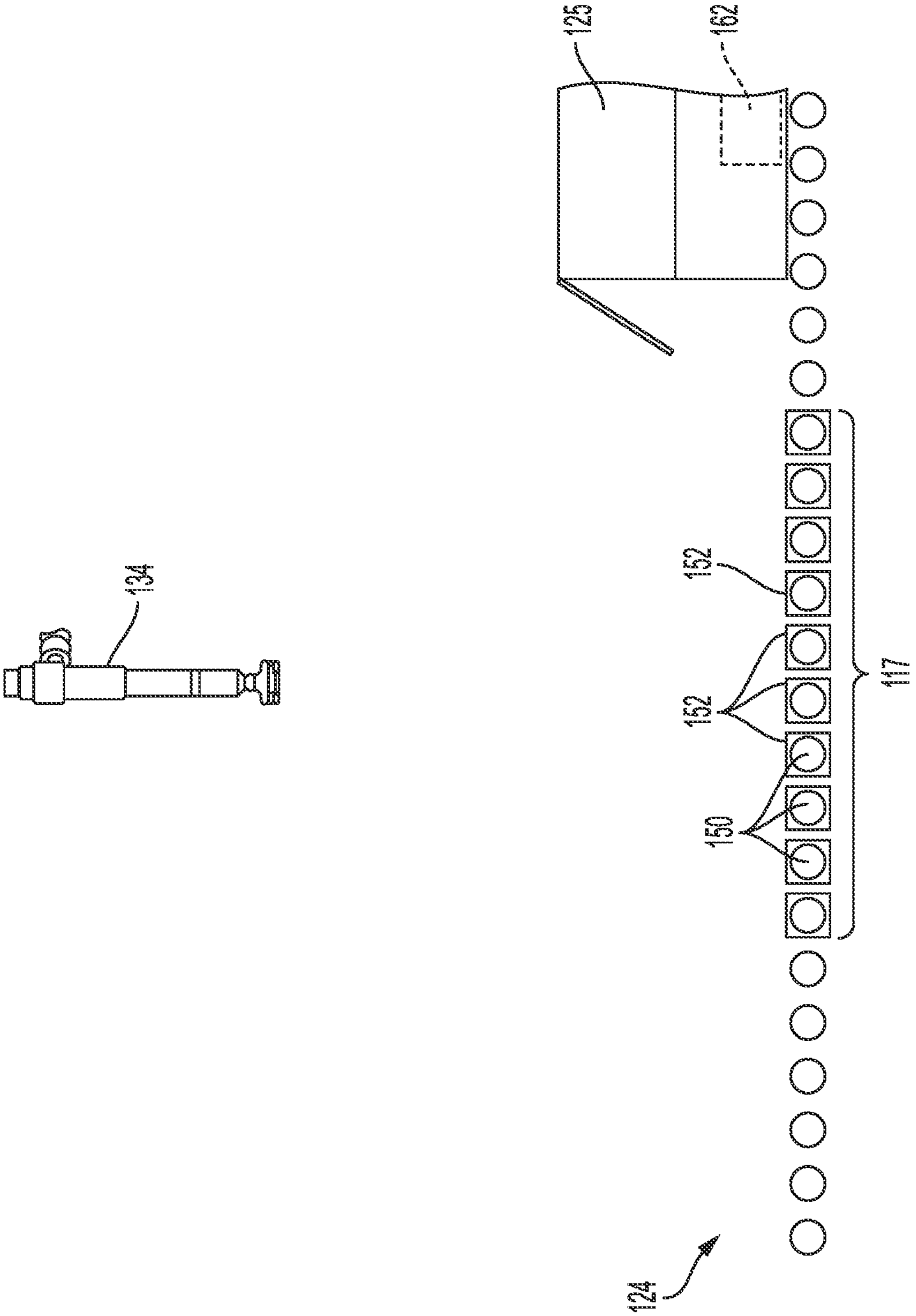

FIG. 23C shows the object 162 being lowered by the programmable motion device including the end effector 134 into the box 125. Note that the weight of the box 125 will increase by the weight of the object 162. FIG. 23D shows the end effector leaving the object 162 in the box 125, and FIG. 23E shows the box 125 moved away from the weight sensing conveyor section 117 of the processing station, whereupon any weight on the weight sensing conveyor section would be removed.

Figure 24:
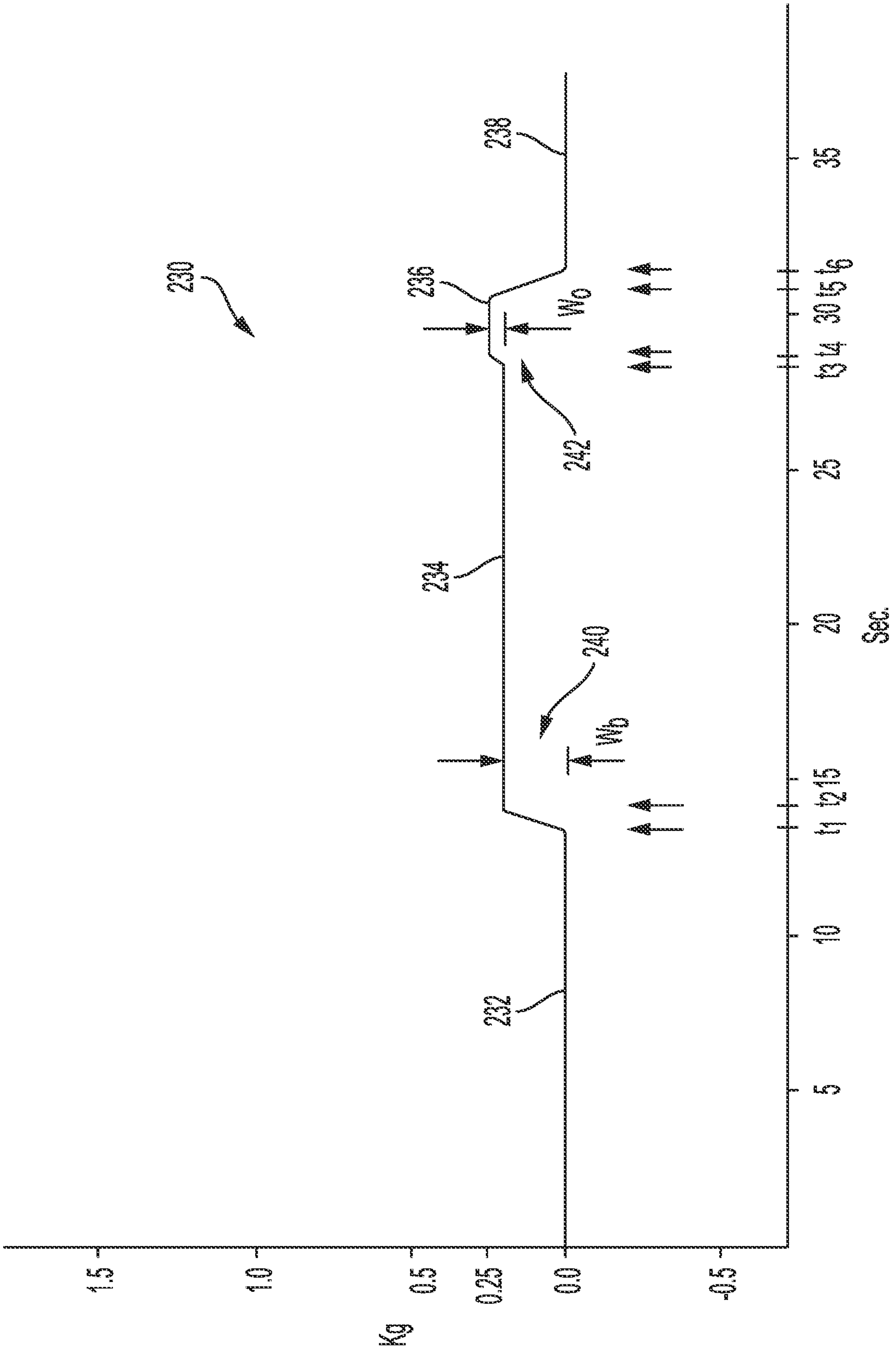
FIG. 24 shows an illustrative graphical representation of detected weight over time in a placement system in accordance with an aspect of the present invention.

FIG. 24 shows at 230 a graphical representation of the detected weight (in kg) over time (in seconds) on the weight sensing conveyor section. As shown, prior to the shipping box 125 being received by the weight sensing conveyor section 117, detected weight at the weight sensing conveyor section 117 (shown at 232) is zero kg. Between times t1 and t2 the box 125 is moved onto the weight sensing conveyor section 117, and the weight of the box 125 is detected (e.g., as about 200 g) until time t3 as shown at 234. Between the times t3 and t4, the object is placed into the box, and the combined weight of the box and the object is detected (e.g., as about 245 g) as shown at 236. Between the times t5 and t6, the box (with the object) is moved off the weight sensing conveyor section, and the detected weight is confirmed as having been returned to zero as shown at 238.

Figure 25A:
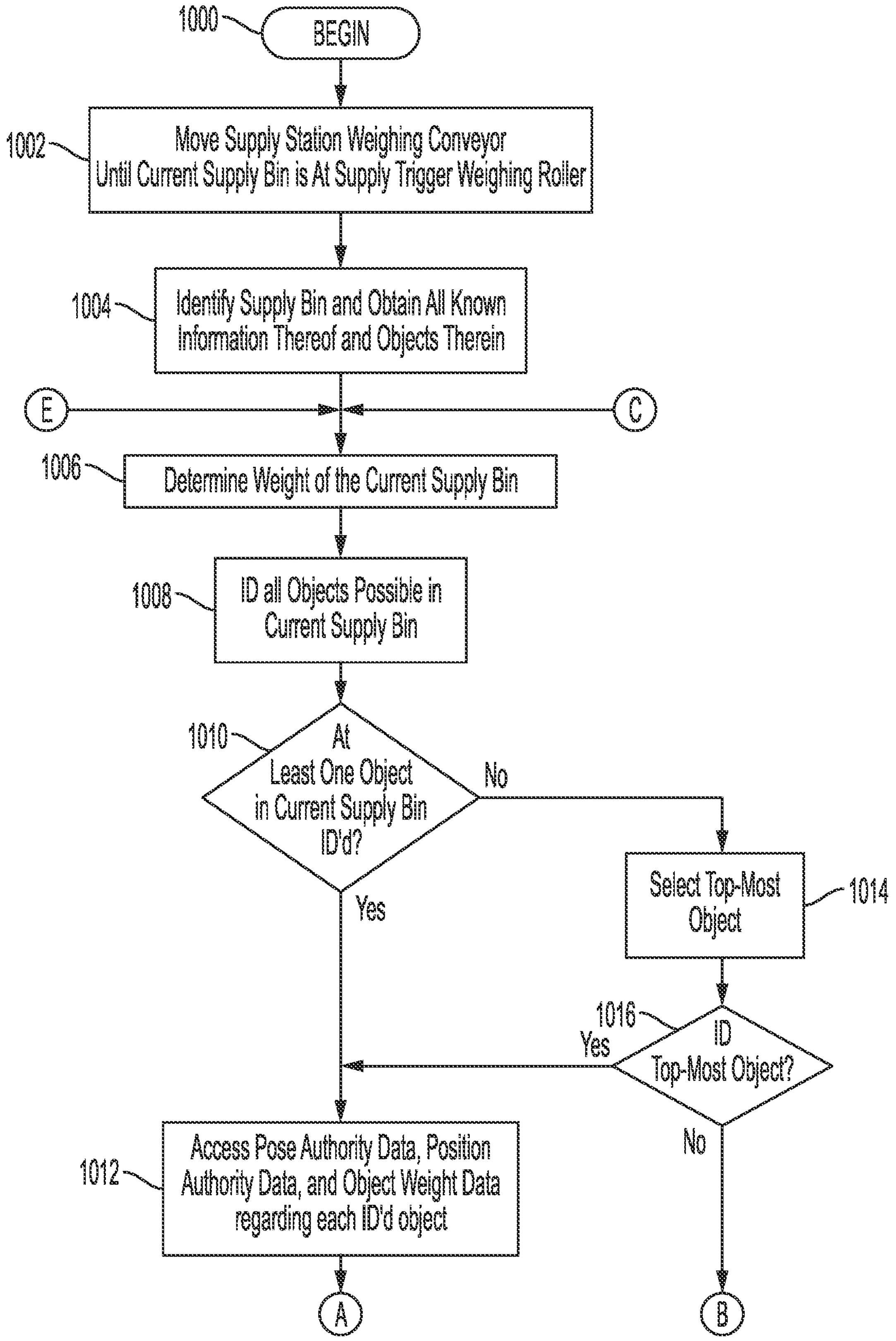
FIGS. 25A-25C show illustrative diagrammatic views of a process control system for use in a system in accordance with an aspect of the present invention.
Figure 25B:
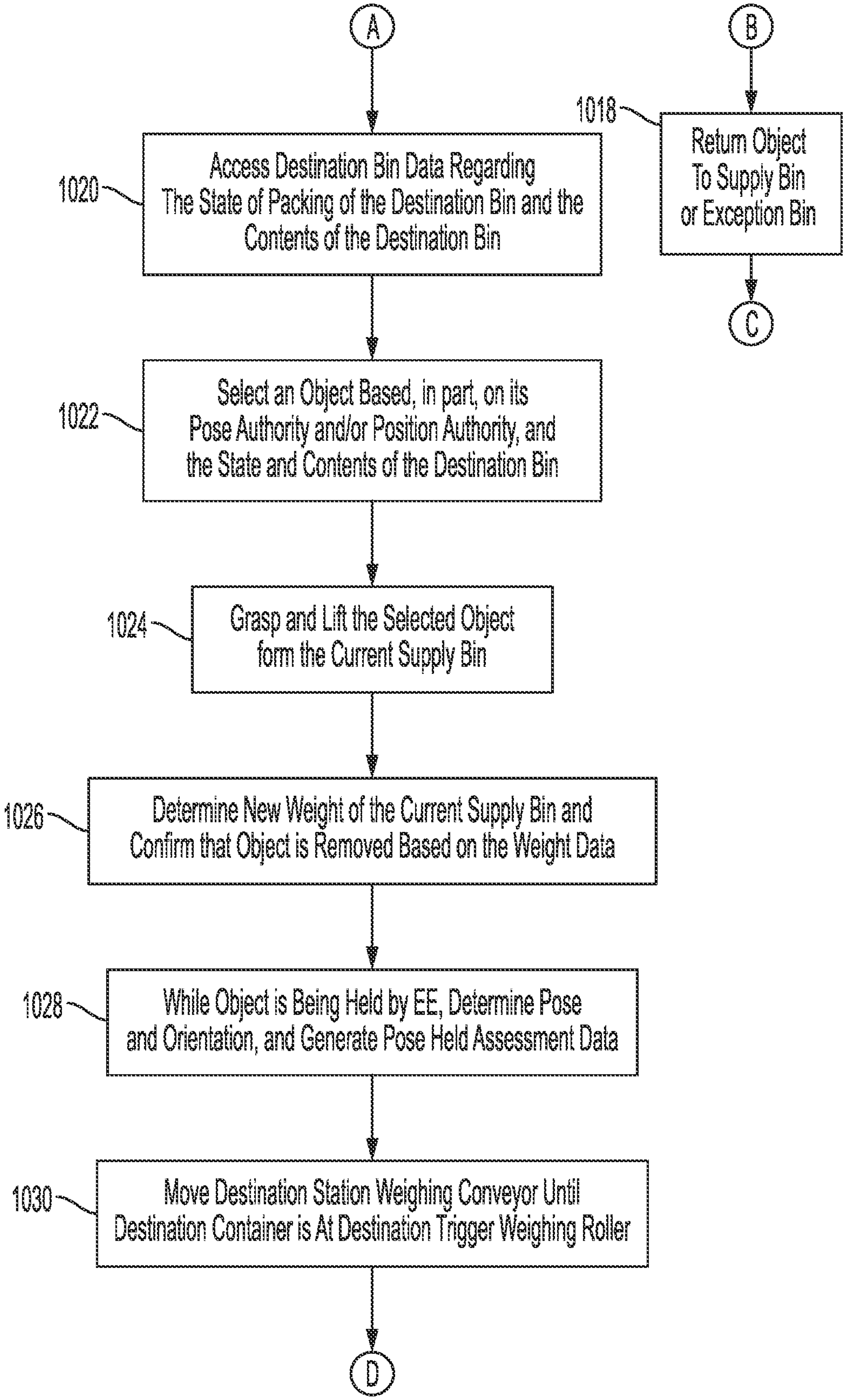
Figure 25C:
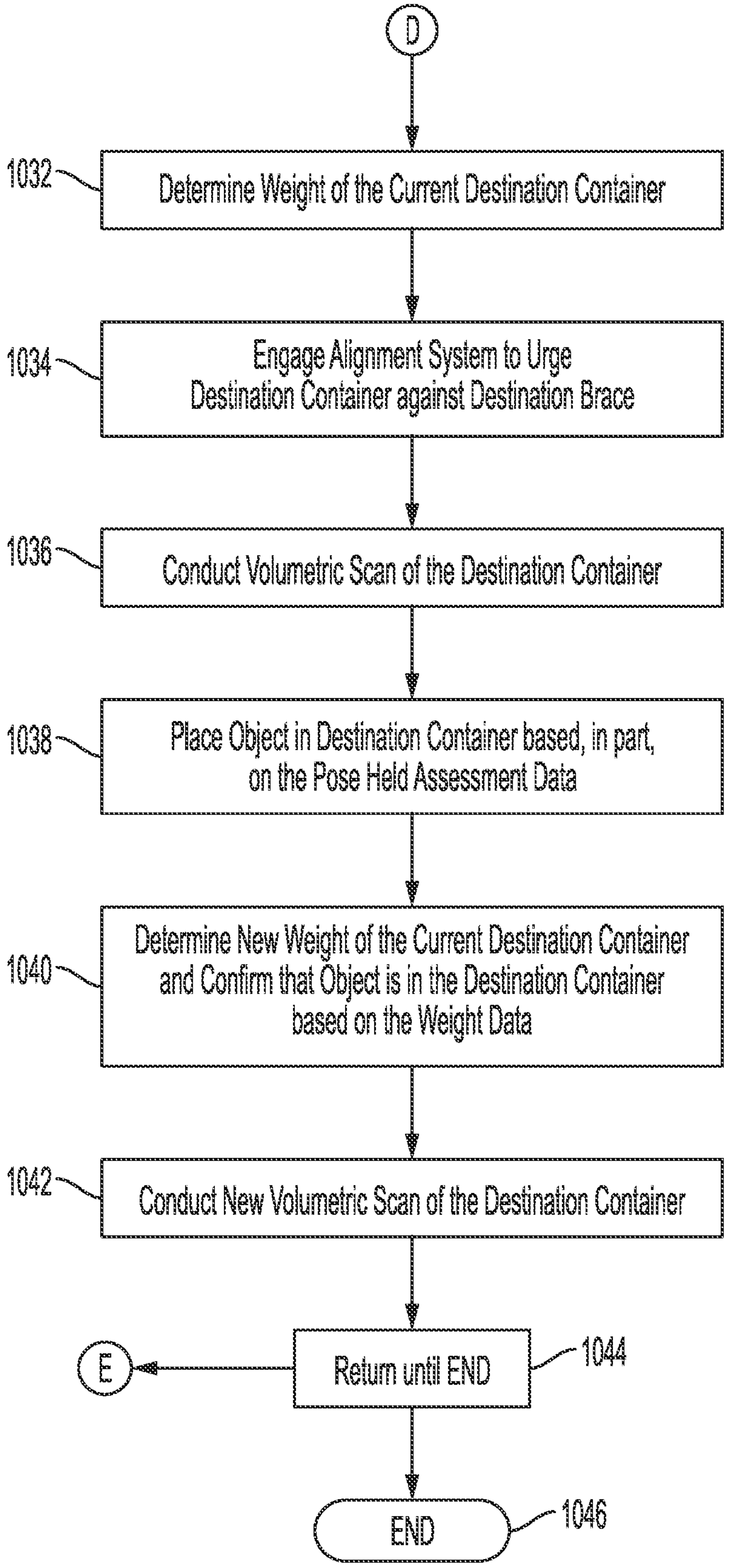

FIGS. 25A-25C show a process control system in accordance with an aspect of the invention that begins (step 1000) by moving a supply bin on the supply station conveyor until the current supply bin is at a supply trigger weighing roller (step 1002). The system the identifies the supply bin and obtains all known information about the supply bin (step 1004). Because the currently supply bin in on the section of weighing conveyors, the current weight of the current supply bin may be readily determined by the weighing conveyors (step 1006). The perception system then collects perception data regarding the current supply bin from above, and the processing system identifies as many objects as possible (that are visible) within the current supply bin. (step 1008).

The system then processes the perception data and determines whether at least one object in the current supply bin has been identified (step 1012). If so, the system then accesses pose authority data, position authority data, and object weight data regarding each identified object (step 1014). If no object is identified in the current supply bin (step 1010), then the system will select the top-most object (step 1014), and then present the selected top-most object to a perception system as discussed above (step 1016). If the held object is able to be identified, the system moves to step 1012 discussed above, and the system accesses pose authority data, position authority data, and object weight data regarding the held object. If the held object cannot be identified, it is returned to the supply bin or moved to an exception bin (step 1018).

With at least one object identified and pose authority date, position authority data and object weight data having been obtained (step 1012), the system then accesses destination bin data regarding the state of packing of the current destination bin as well as the contents of the current destination bin (step 1020). The system then selects a selected object based, in part, on each object's pose authority data and/or position authority data, as well as the state and contents of the current destination bin (step 1022). The system will then grasp and lift the selected object from the current supply bin (step 1024), and then determine a new weight of the current supply bin to confirm that the selected object (with the known weight) has been removed from the supply bin (step 1026) based on the weight data. While the object is being held by the end effector, the system may then use the perception units to determine pose and orientation data regarding the held object, and generate pose held assessment data (step 1028).

Either sooner or at this point, the destination station conveyor brings a current destination container to a weighing section of the conveyor, and continues to move until a destination trigger weighing roller is engaged (step 1030). Again, because the destination station conveyor includes a plurality of weighing conveyors, a weight of the destination container is then determined (step 1032). An alignment system is then engaged to ensure that the destination container is urged against a destination brace (step 1034). A destination perception system then conducts a volumetric scan of the destination container (step 1036), the object is then placed into the destination container based, in part, on the pose data (step 1038), and the system then conducts a weight measurement to confirm that the object is in the destination container (step 1040). The system then conducts a further volumetric scan of the destination container to confirm that the object is correctly placed on the destination container (step 1042). The system then returns until it ends (step 1044), at which point the process ends (step 1046).

Figure 26:
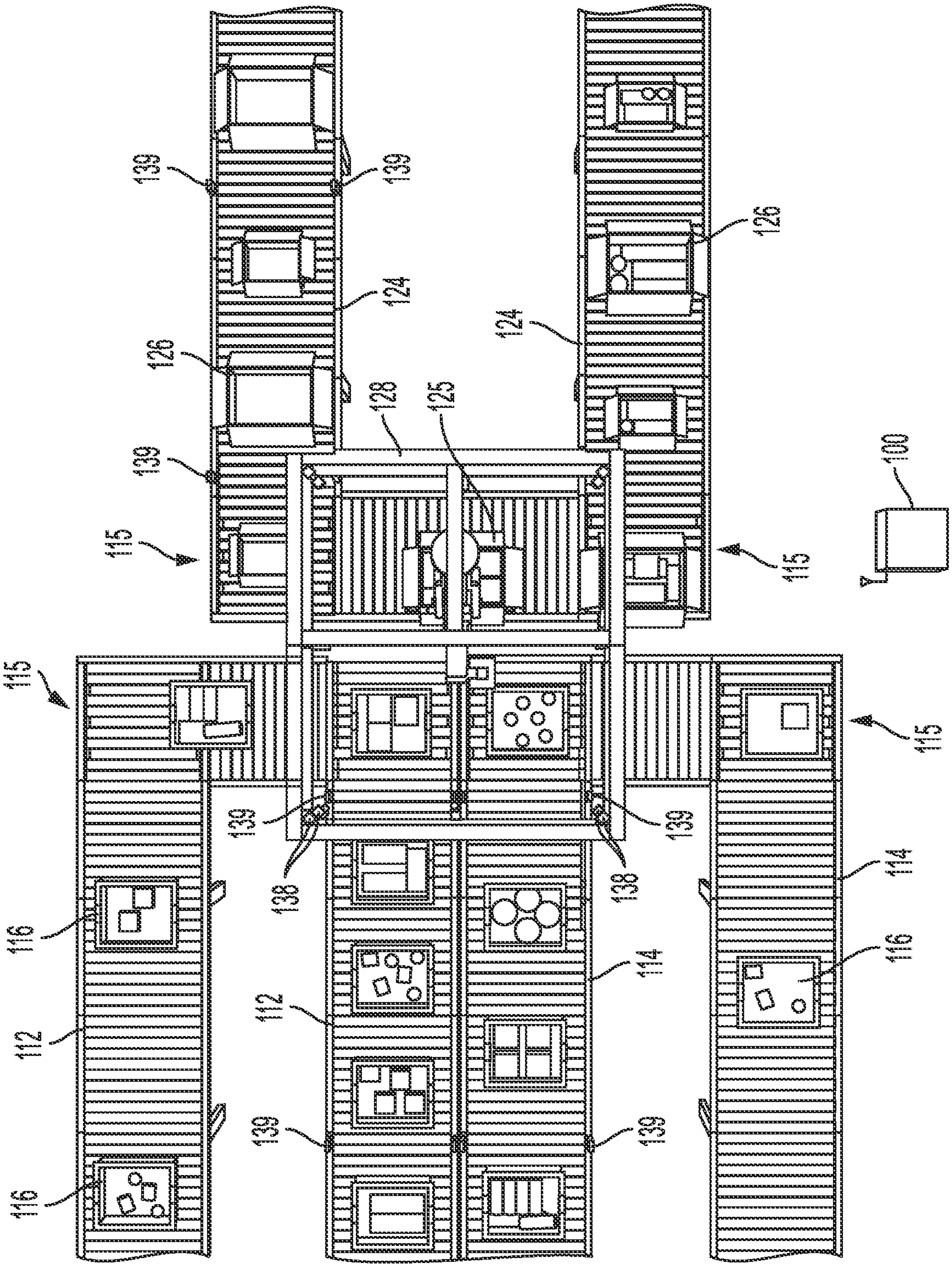
FIG. 26 shows an illustrative diagrammatic plan view of the single-SKU picking cell of the system of FIG. 6.
Figure 27:
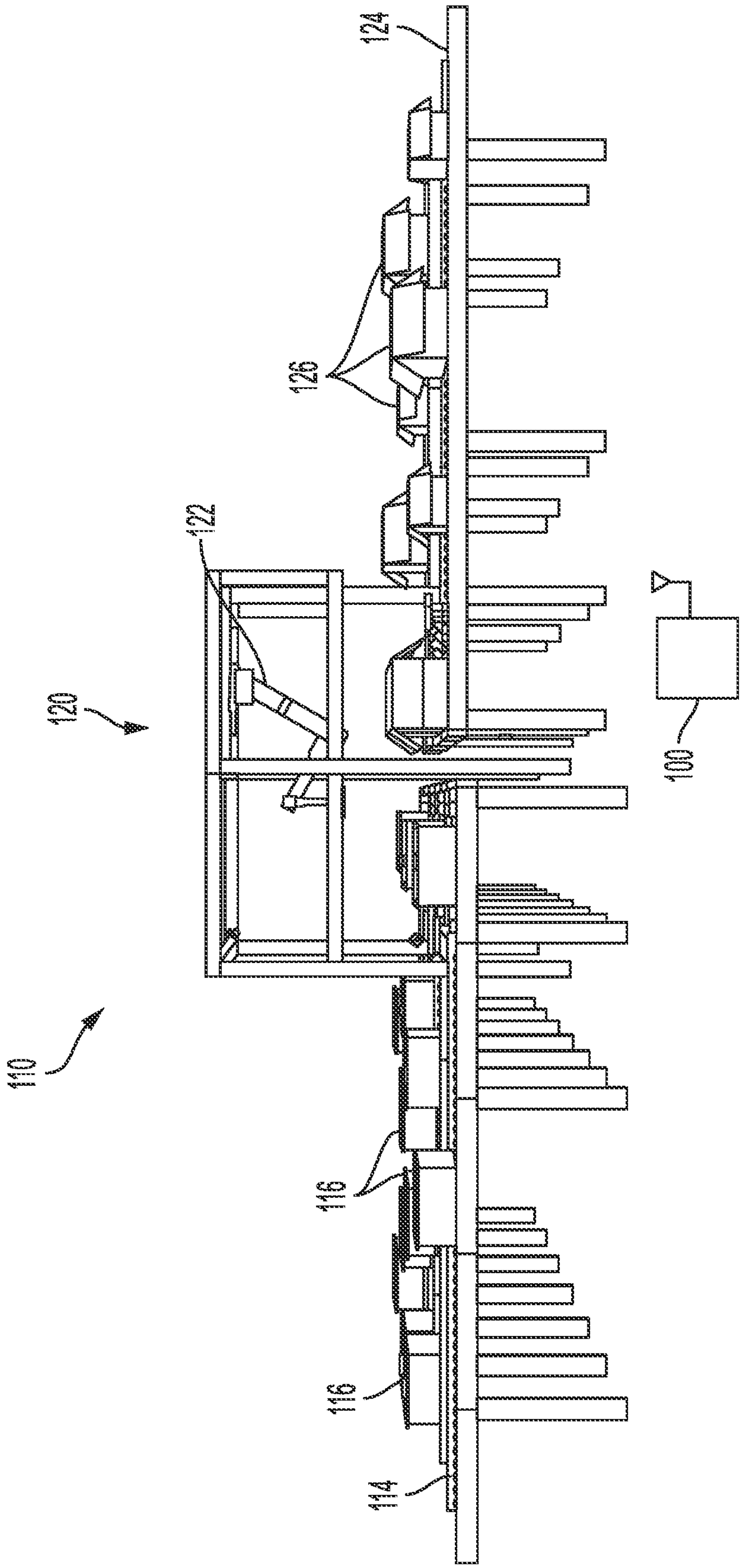
FIG. 27 shows an illustrative diagrammatic side view of the single-SKU picking cell of the system of FIG. 6.
Figure 28:
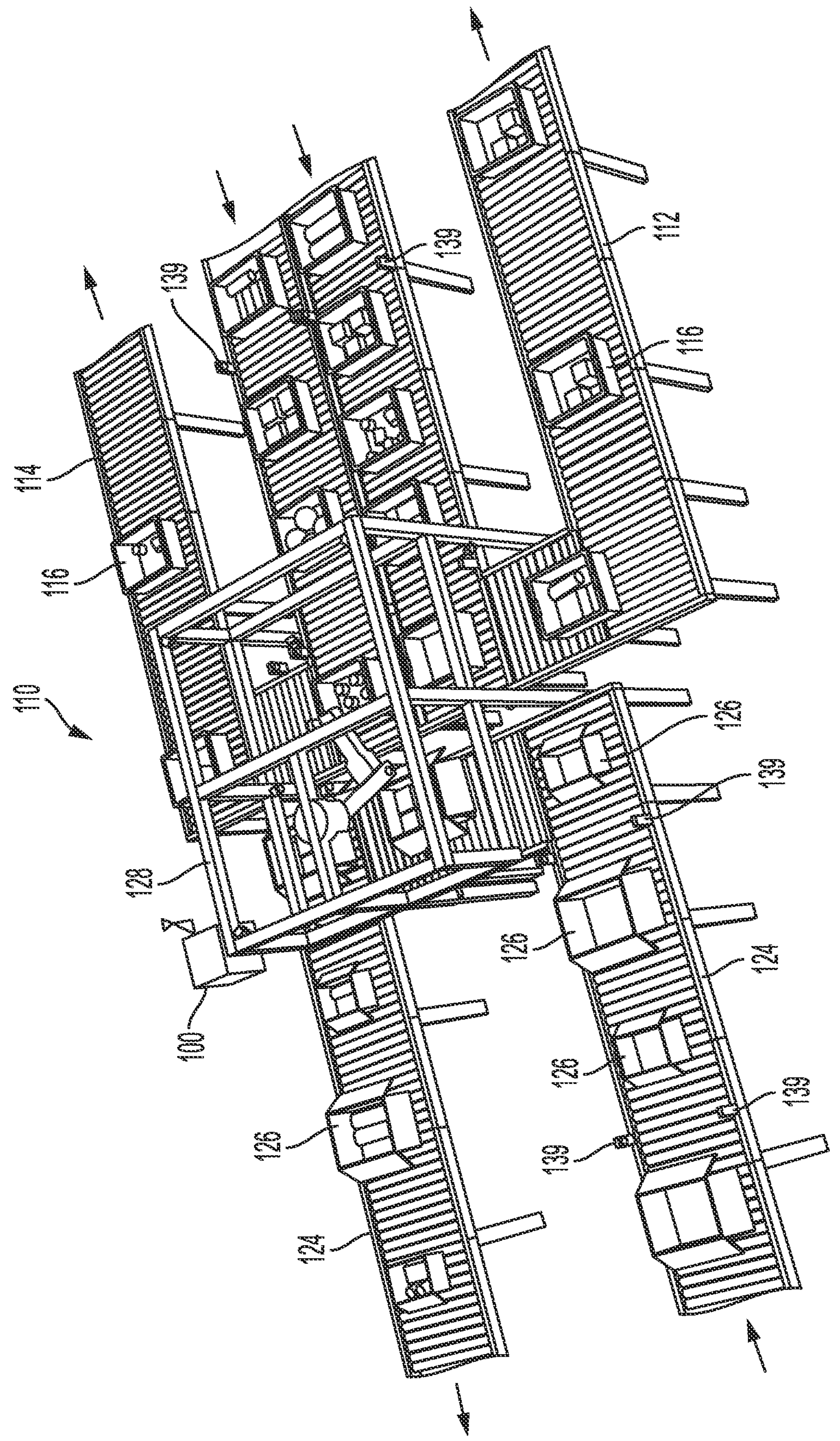
FIG. 28 shows an illustrative diagrammatic rear view of the single-SKU picking cell of the system of FIG. 6.

FIGS. 26-28 show the system 110 that includes a pair of in infeed conveyors 112, 114 on which single-SKU inventory containers 116 are delivered to a single-SKU packing cell system 120 that includes a programmable motion articulated arm 122. FIGS. 26 and 27 show top and side views respectively, and FIG. 28 shows a rear perspective view. The system 110 also includes a shipping container conveyor 164 that provides shipping containers 166 to the single-SKU packing cell system 120. In accordance with an aspect, the single-SKU packing cell system picks single units from the inventory totes and places them into or onto packaging appropriate for shipping. The robot-support structure straddles the two parallel inventory tote loops 112, 114 that feed the cell with inventory totes from a tote storage system such as an AS/RS. The system 110 includes weight sensing conveyors (as discussed above) under the articulated arm 122, as well as brace bars and brace rails as discussed above. Again, weight sensing conveyors as well as the brace bar and rail system, may be used with the shipping containers on the shipping conveyor.

The system provides systems designed to pack goods into shipping containers in accordance with various aspects. An aspect involves packing one or more units of a single stock keeping unit (SKU) into one or more shipping containers, and another aspect involves packing multiple SKUs into one or more shipping containers as discussed further below.

In accordance with further aspects, a system is provided that involves picking multiple kinds of SKUs. The system picks units of an order one at a time from trays delivering single units and packs them into shipping containers. Like the single-SKU system, the multi-SKU system interfaces with a package-making mechanism that feeds the container to the pick cell. Inventory units are picked from shuttle trays (depicted as yellow), which queue up on a zero-pressure conveyor. A scanner scans the contents of the shuttle trays, and another scans the shipping container as it is being packed. As with the single-SKU system, a scanner recovers position and orientation of the unit, for optimal placing in the container around other units.

Figure 29:
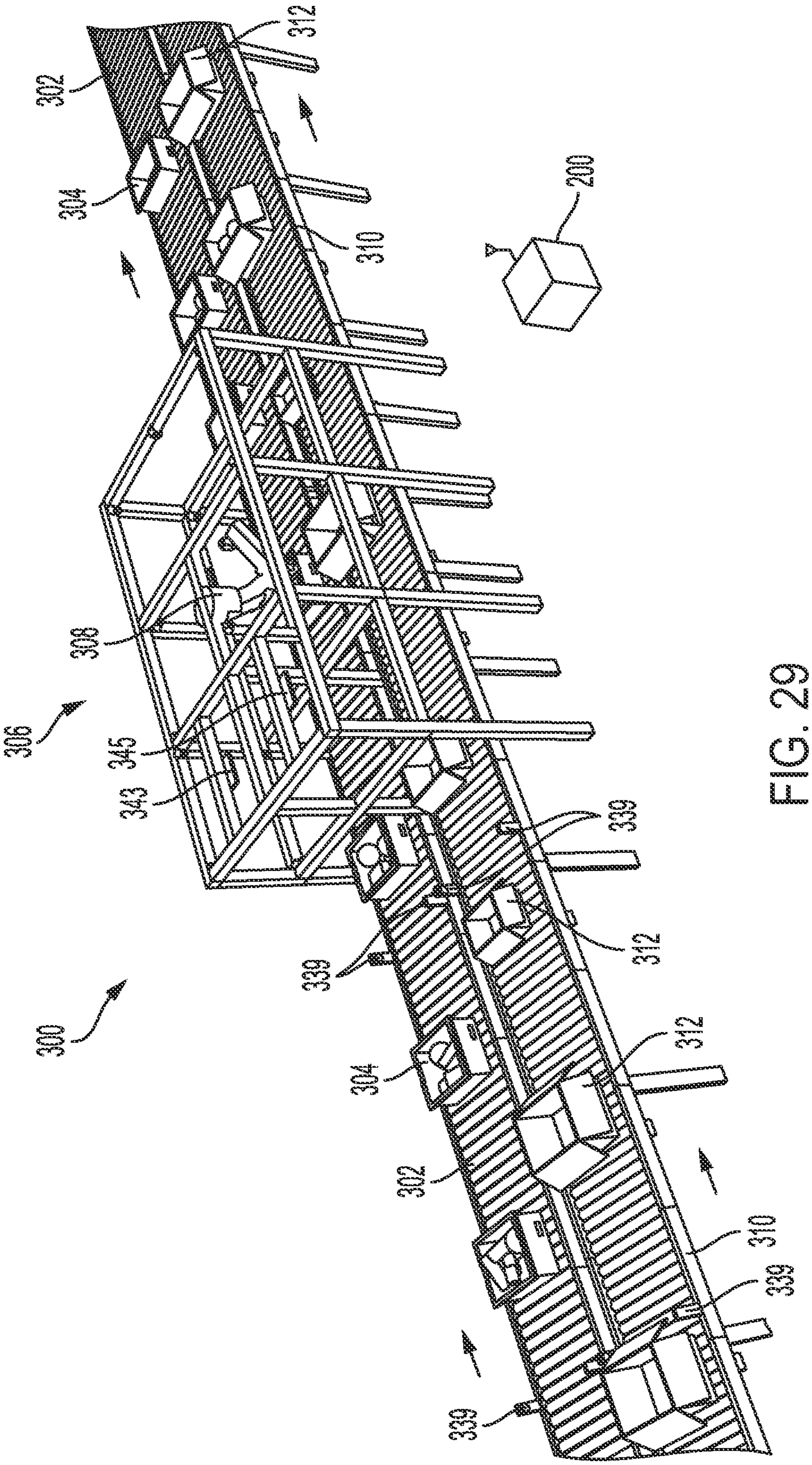
FIG. 29 shows an object processing system in accordance with an aspect of the present invention wherein input totes include multi-SKU objects.
Figure 30:
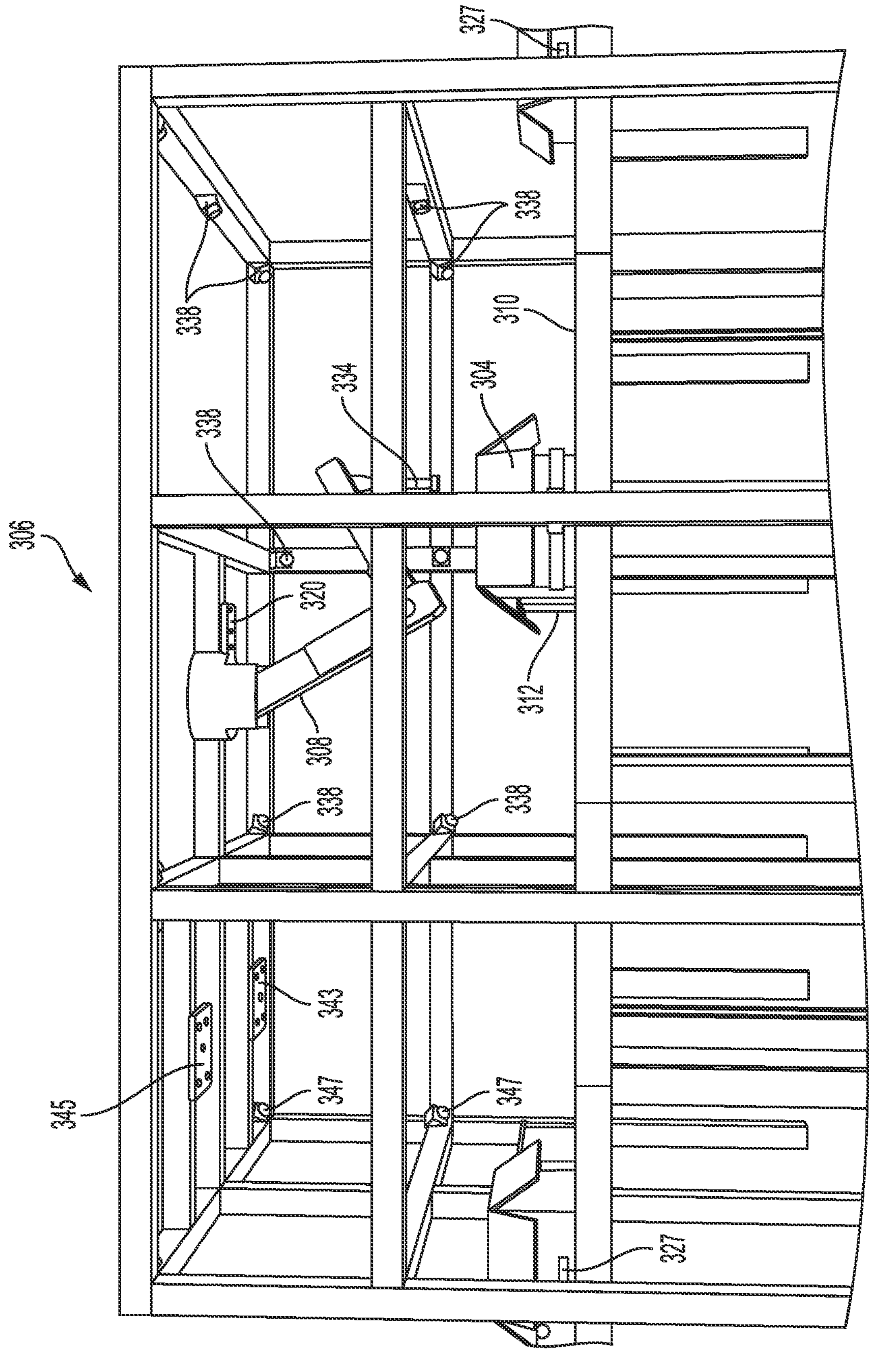
FIG. 30 shows an illustrative diagrammatic side view of the multi-SKU picking cell of FIG. 29.
Figure 31:
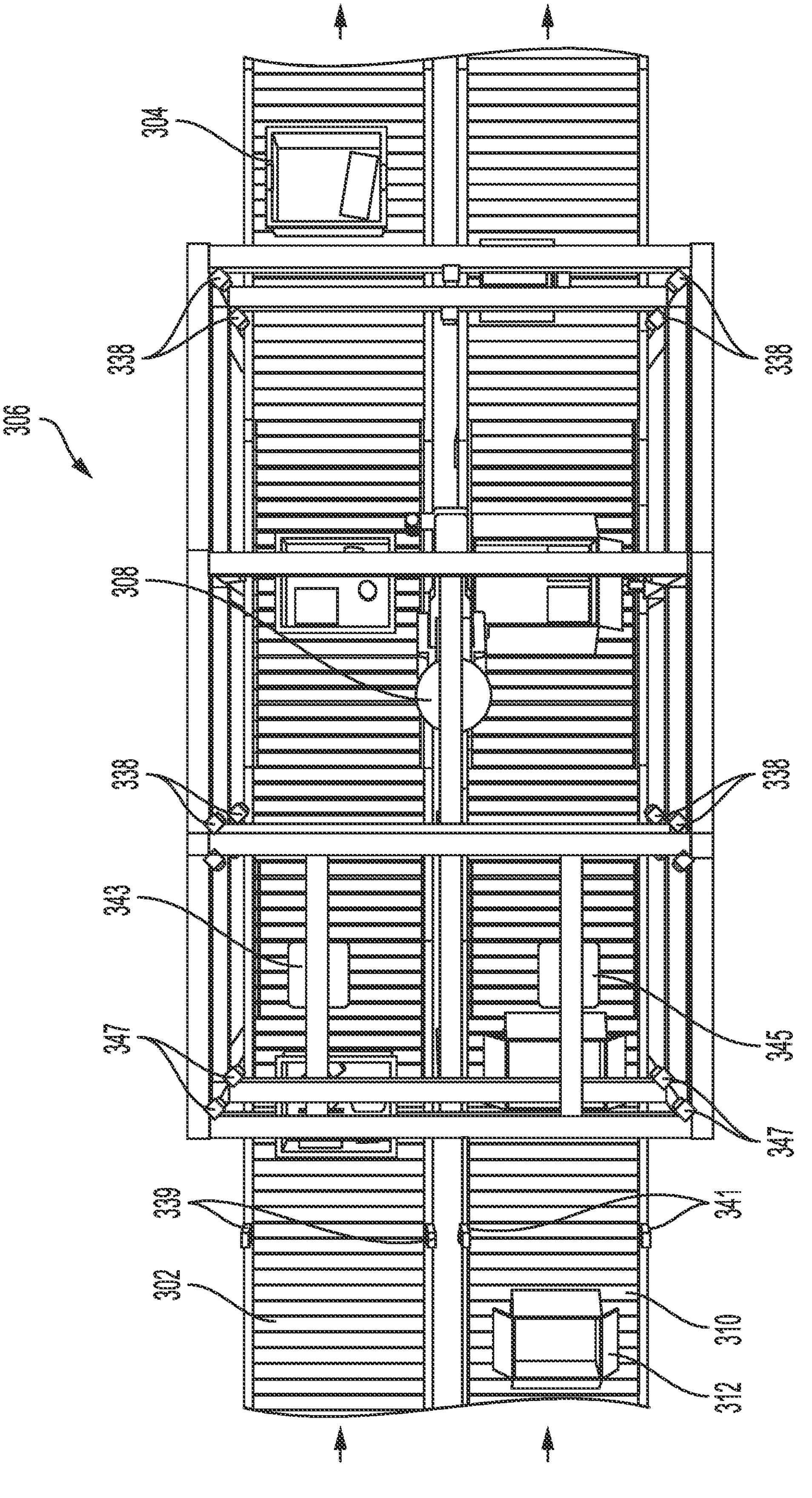
FIG. 31 shows an illustrative diagrammatic plan view of the multi-SKU picking cell of FIG. 29.
Figure 36:
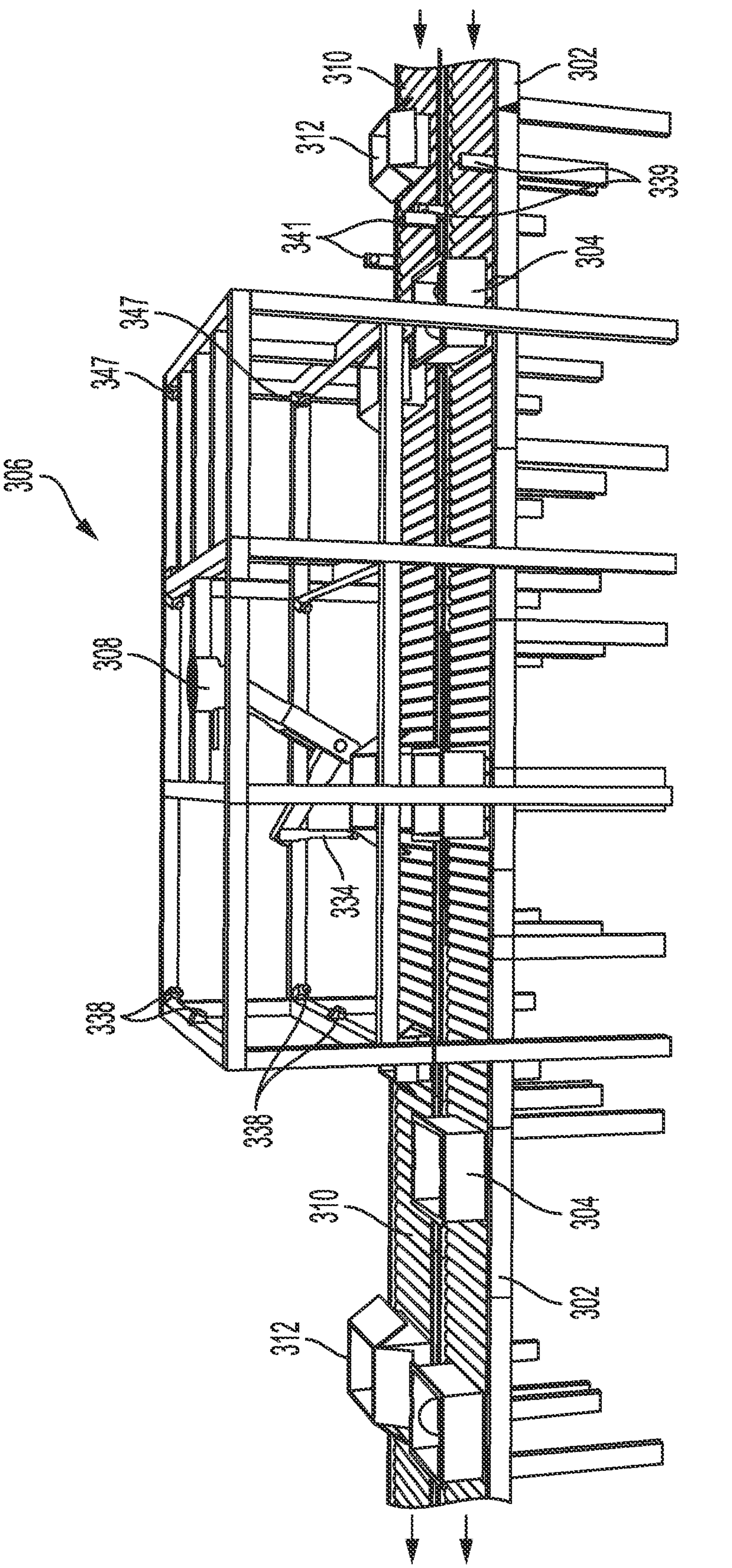
FIG. 36 shows an illustrative diagrammatic side view of the multi-SKU picking cell of FIG. 29.
Figure 37:
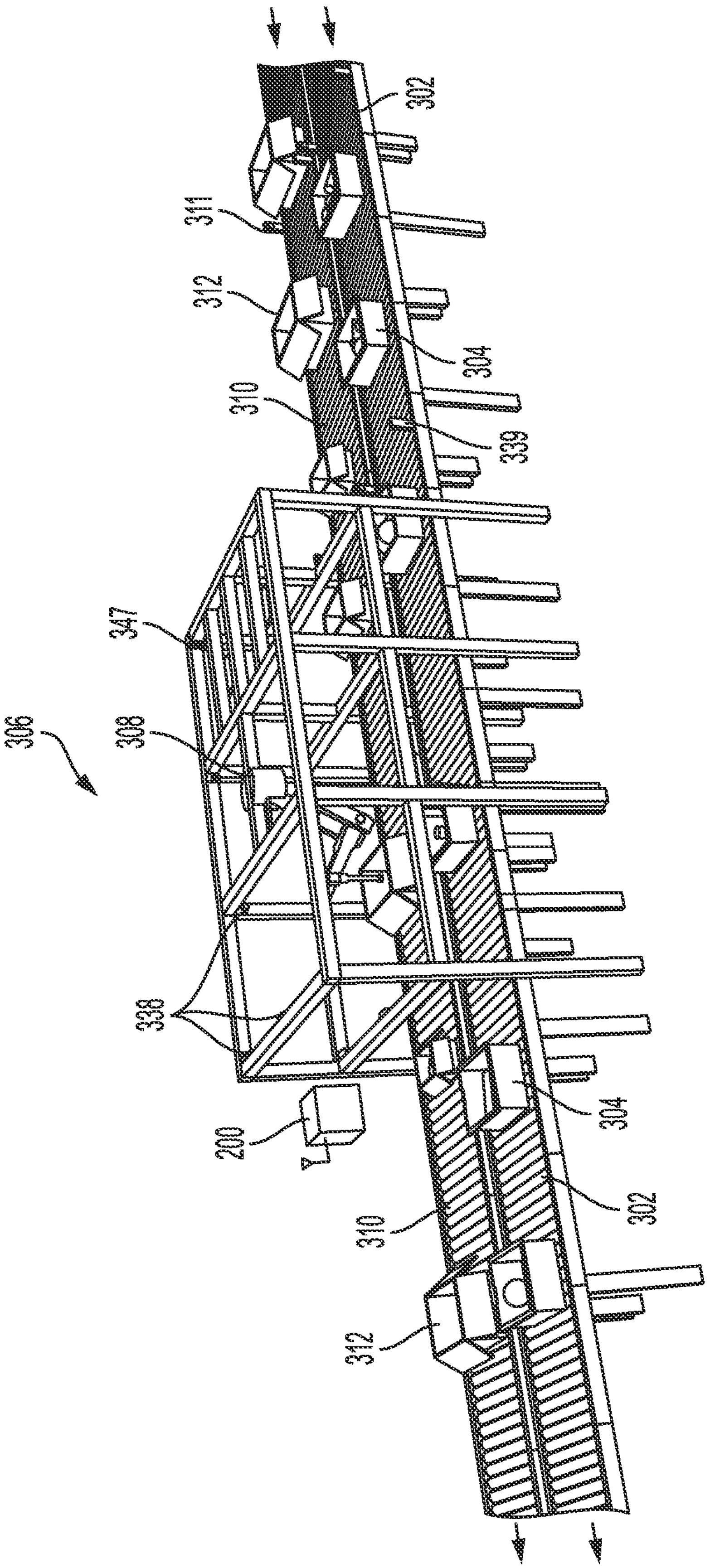
FIG. 37 shows an illustrative diagrammatic rear view of the multi-SKU picking cell of FIG. 29.

FIG. 29 for example, shows a system 300 that includes an infeed conveyor 302 on which multi-SKU inventory totes 304 are delivered to a multi-SKU packing cell system 300 that includes a programmable motion articulated arm 308. FIGS. 30 and 31 show side and top views respectively, and FIGS. 36 and 37 shows back side and rear perspective views of the system 300. The system 300 also includes a shipping container conveyor 310 that provides shipping containers 312 to the single-SKU packing cell system 306. In accordance with an aspect, the single-SKU packing cell system picks single units from the inventory totes and places them into or onto packaging appropriate for shipping. The robot-support structure straddles the two parallel infeed and shipping container conveyors that feed the cell with inventory totes from a tote storage system such as an AS/RS as well as shipping containers.

The system 306 includes a weight sensing conveyor (as discussed above with reference to FIGS. 9, 10, and 23A-23E) under the articulated arm 308, as well as brace bars and brace rails as discussed above with reference to FIGS. 16A-16D. Again, weight sensing conveyors as well as the brace bar and rail system, may be used with the shipping containers on the shipping conveyor. Also, each of the multi-SKU infeed containers (e.g., bin or totes) may include indicia identifying the bin or tote, and perception units may be positioned along the conveyors that detect the indicia, thereby knowing the identity and location of each multi-SKU bin or tote.

The system of various aspects includes a perception system (e.g., 320) that is mounted above a tote of objects to be processed next to the base of the articulated arm 308, looking down into a tote 304 as shown in FIG. 30. The perception system 320, for example, may include (on the underside thereof), a camera, a depth sensor and lights. Again, a combination of 2D and 3D (depth) data is acquired. The depth sensor may provide depth information that may be used together with the camera image data to determine depth information regarding the various objects in view. The lights may be used to remove shadows and to facilitate the identification of edges of objects, and may be all on during use, or may be illuminated in accordance with a desired sequence to assist in object identification. The system uses this imagery and a variety of algorithms to generate a set of candidate grasp locations for the objects in the bin as discussed in more detail below.

Figure 32A:
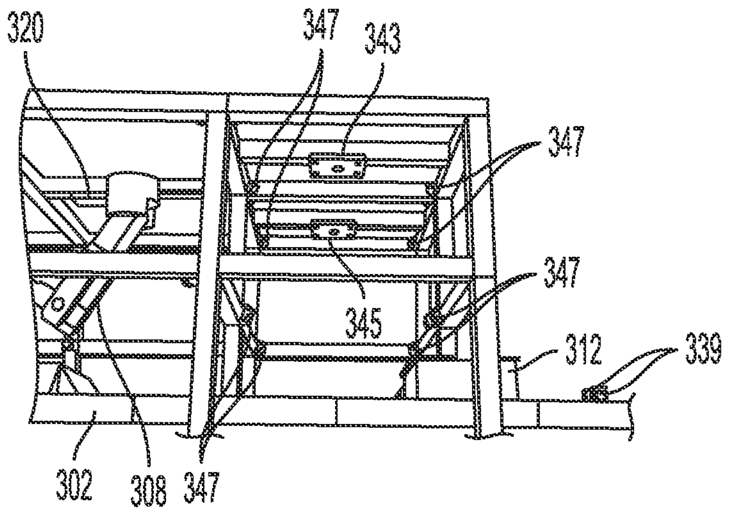
FIG. 32A-32C show illustrative diagrammatic views of an in-feed analysis system in a multi-SKU picking cell of FIG. 28.
Figure 32B:
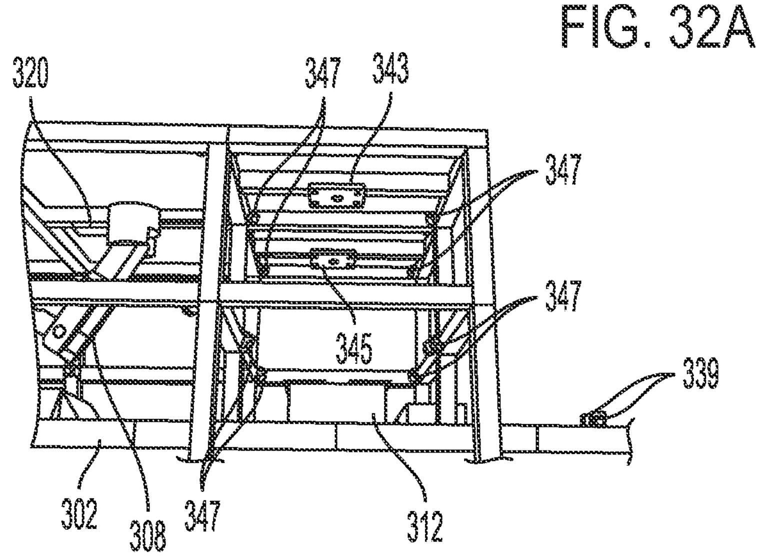
Figure 32C:
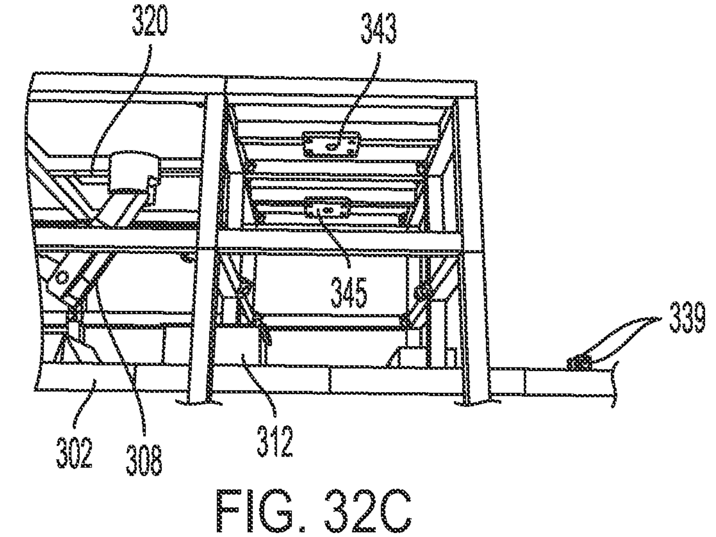

FIGS. 32A-32C show an in-feed container moving along the in-feed conveyor 302 under perception units 347 as well as depth and edge detection system 343. The perception unis 347 and system 343 determine or confirm the contents of each in-feed container using volumetric and depth perception as the in-feed container moves from the input side (FIG. 32A), under the perception units 347 and system 343 (FIG. 32B) and away from the perception units 347 and system 343 (FIG. 32C). By using such perception units and system, edges, volumes, and densities may be determined of the multi-SKU contents of the in-feed containers.

Figure 33A:
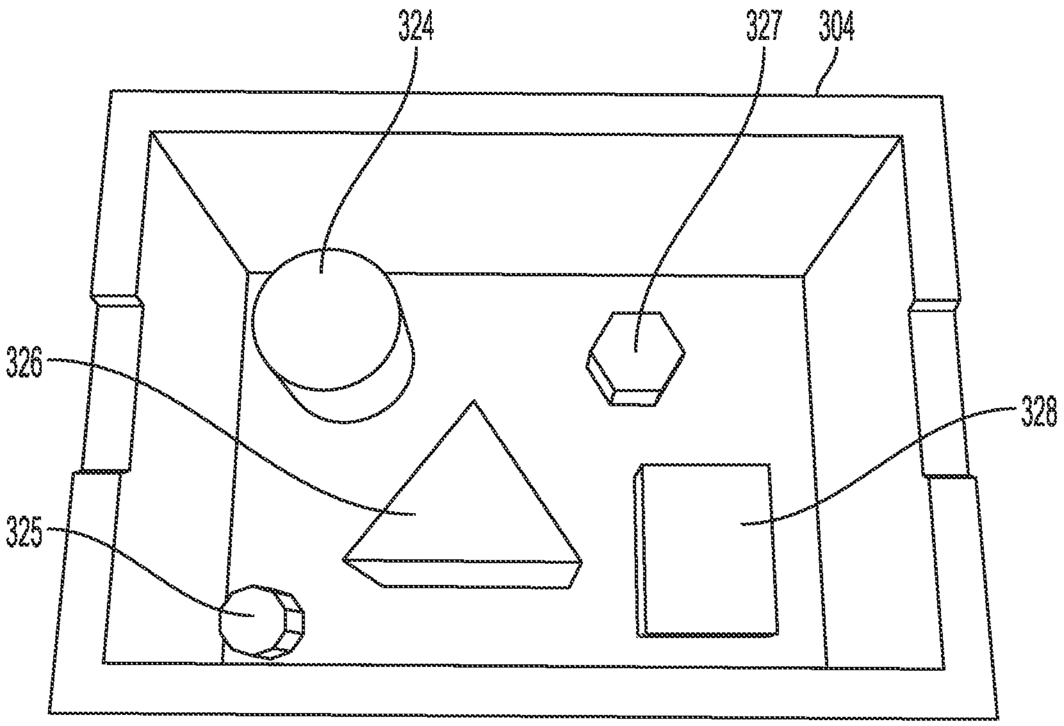
FIGS. 33A-33C show illustrative diagrammatic views of a view of a multi-SKU bin in accordance with an aspect of the present invention, showing a camera view (FIG. 33A), a volumetric scan of the bin (FIG. 33B), and a volumetric scan of the bin after picking (FIG. 33C)
Figure 33B:
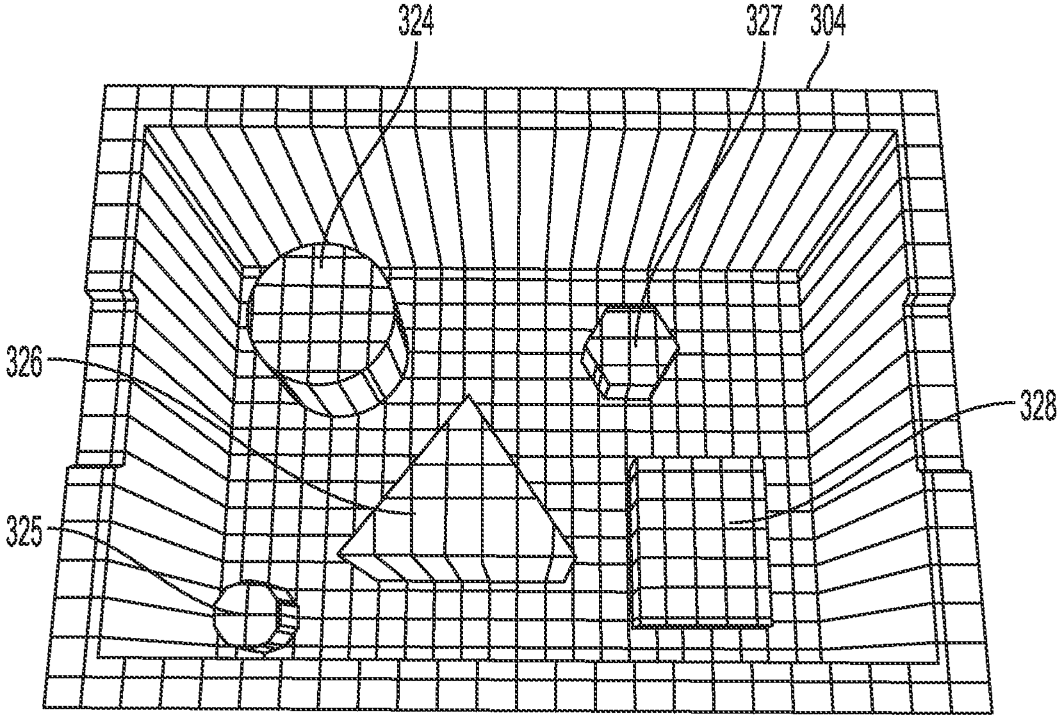
Figure 33C:
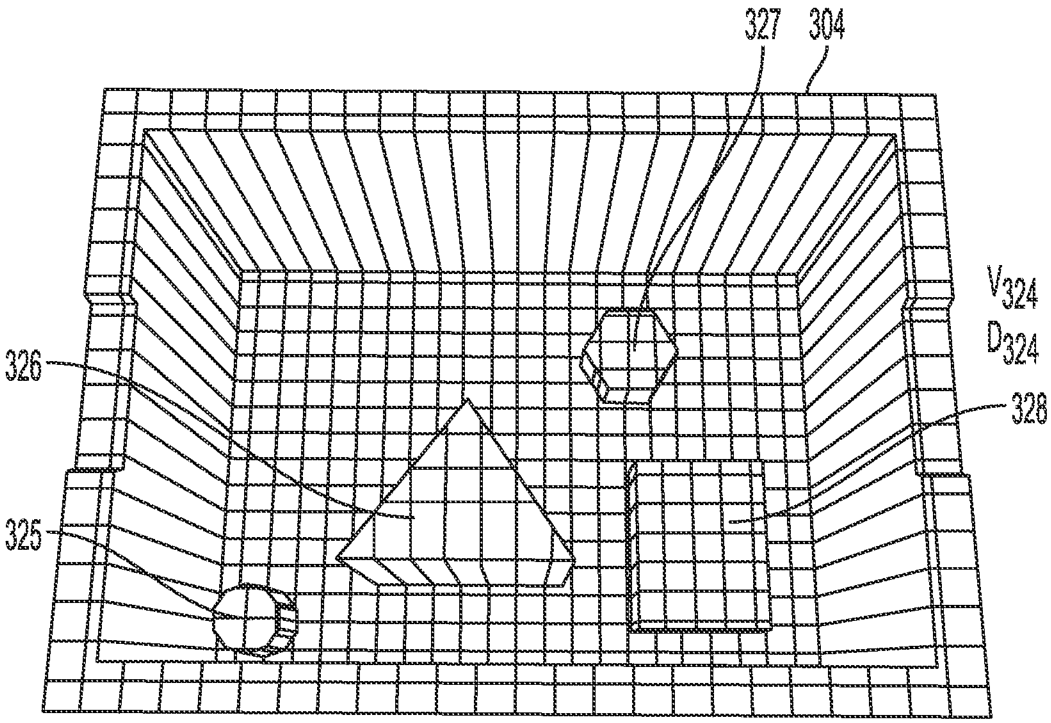

FIG. 33A shows a view of the tote 304 from the perception unit 320. The image view shows the tote 304 (e.g., on the conveyor), and the tote 304 contains objects 324, 325, 326, 327, 328. In the system of FIGS. 33A-33C, the objects in each infeed bin are non-homogenous (multiple SKUs). The system will identify candidate grasp locations on one or more objects, and may not try to yet identify a grasp location for the object that is partially obscured by other objects. Candidate grasp locations may be indicated using a 3D model of the robot end effector placed in the location where the actual end effector would go to use as a grasp location. Grasp locations may be considered good, for example, if they are close to the center of mass of the object to provide greater stability during grasp and transport, and/or if they avoid places on an object such as caps, seams etc. where a good vacuum seal might not be available.

The perception system 320 includes among the perception units, scanning and receiving units as well as edge detection units for capturing a variety of characteristics of a selected object of the whole bin. Again, FIG. 33A shows a view from the capture system, which in accordance with an embodiment, may include a set of dissimilar objects 324, 325, 326, 327, 328. The difference in volume $V_{324}$ or density $D_{324}$ as scanned is shown in FIG. 33B and compared with recorded data regarding the item that is identified by the identifying indicia as provided by the detection system of the SKU induction system or the recorded object data. In particular, the scanned volume is compared with a volume of the identified SKU multiplied by the number of objects known to be in the bin. Following picking, the volume is scanned again (FIG. 33C) to confirm the volume of the picked object.

In accordance with further aspects, the scanning and receiving units may also be employed to determine a density of the collection of objects in the bin, which is compared with a known density of the identified SKU multiplied by the known number of objects in the bin from knowing the object's mass and volume. The volumetric data may be obtained for example, using any of light detection and ranging (LIDAR) scanners, pulsed time of flight cameras, continuous wave time of flight cameras, structured light cameras, or passive stereo cameras.

Figure 34A:
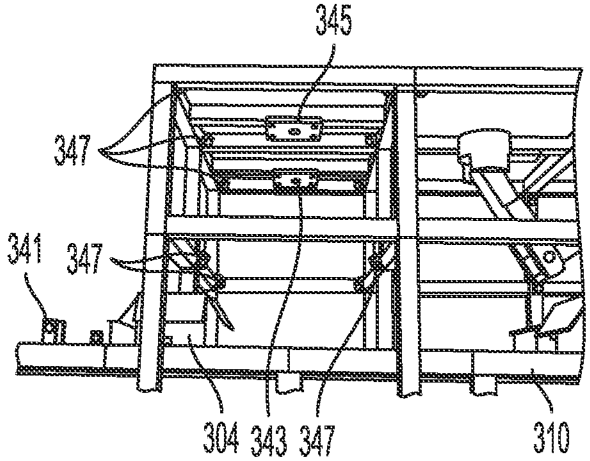
FIGS. 34A-34C show illustrative diagrammatic views of perception systems in a container-content confirmation system in a system in accordance with an aspect of the present invention.
Figure 34B:
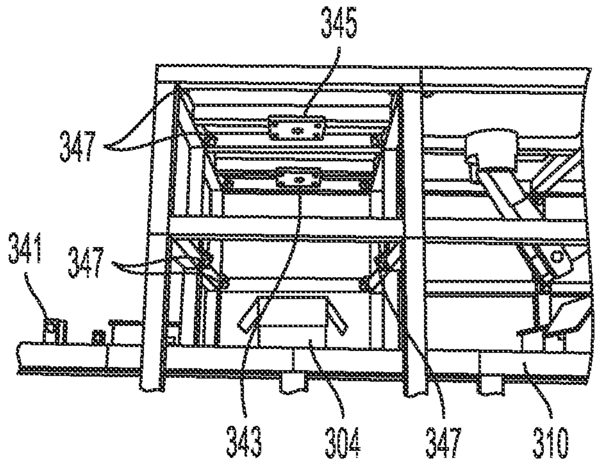
Figure 34C:
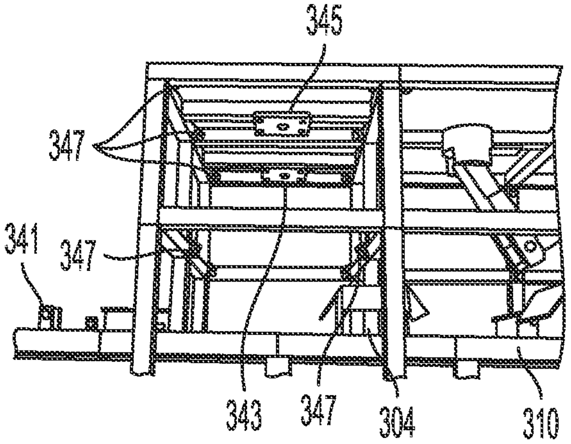

FIGS. 34A-34C show a shipping container moving along the shipping conveyor 310 under perception units 347 as well as depth and edge detection system 345. The perception unis 347 and system 345 determine or confirm the contents of each shipping container (e.g., if already partially filled) using volumetric and depth perception as the shipping container moves from the input side (FIG. 34A), under the perception units 347 and system 345 (FIG. 34B) and away from the perception units 347 and system 345 (FIG. 34C).

By using such perception units and system, edges, volumes, and densities may be determined of the multi-SKU contents of the shipping containers.

In accordance with certain aspects, the system may additionally employ edge detection sensors that are employed (again together with the processing system 350), to detect edges of any objects in a bin, for example using data regarding any of intensity, shadow detection, or echo detection etc. The system may be employed for example, to determine any of size, shape and/or contours to aid in confirming a number of objects in the bin. In certain aspects, the system may identify a specific object in the bin and confirm its shape and size through such edge detection. The above system therefore, may be used to confirm a number of objects packed into a container, and in certain aspects, to originally confirm a number of objects in a shipping container.

Again, the operations of the system described above are coordinated with a central control system 200 that again communicates (e.g., wirelessly) with the articulated arm 308, the perception systems 320, as well as in-feed conveyor 302, and shipping container conveyor 310. This system determines from symbol strings the UPC associated with a vendor bin, as well as the outbound destination for each object. The central control system 400 is comprised of one or more workstations or central processing units (CPUs). For example, the correspondence between UPCs or mailing labels, and outbound destinations is maintained by a central control system in a database called a manifest. The central control system maintains the manifest by communicating with a warehouse management system (WMS). The manifest provides the outbound destination for each in-bound object. Scanners are placed above each inventory tote picking location to look for grasp points. The cell coordinates via WMS/WCS with a shipping container dispensing mechanism—such as an automated box-making system or cardboard-slip dispensing machine—that feeds shipping containers to the pick cell. Conveyors feed the shipping container to the cell.

Figure 35A:
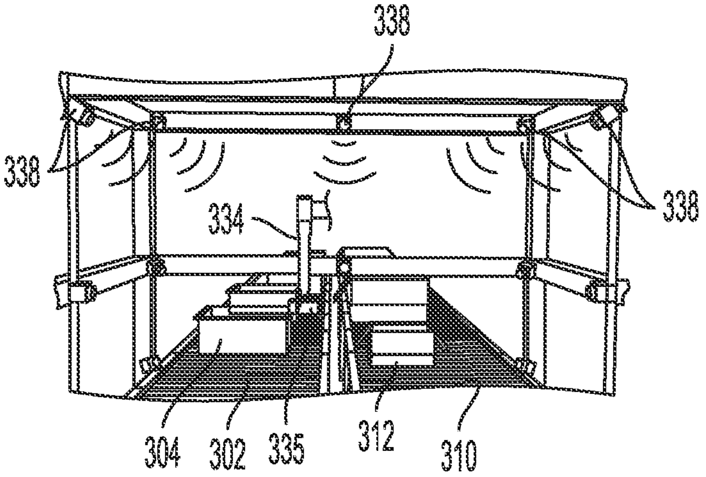
FIGS. 35A-35C show illustrative diagrammatic views of a grasp evaluation detection system for use in a multi-SKU processing system in accordance with an aspect of the present invention.
Figure 35B:
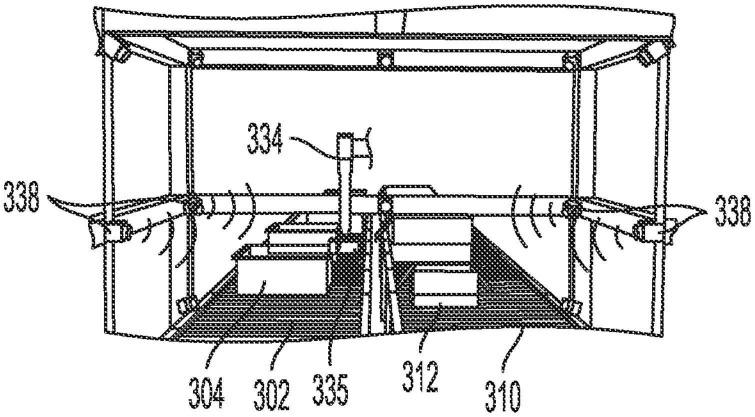
Figure 35C:
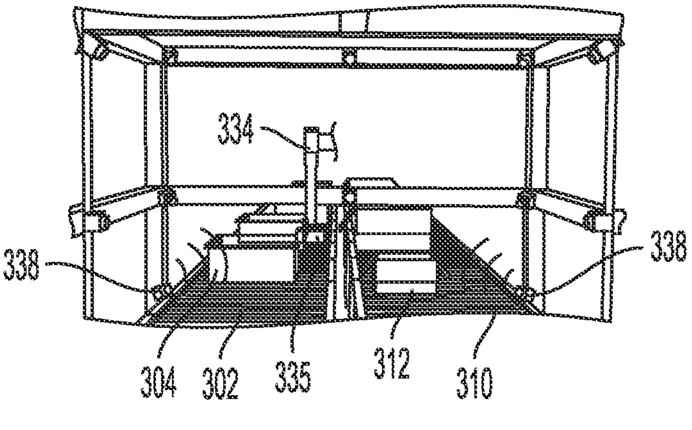

FIGS. 35A-35C show the grasp evaluation detection units 338 in the packing cell 306 (with certain elements removed for clarity). The detection units 338 include upper detection units that are directed downward toward an object 335 being held by the end effector 334 as shown in FIG. 35A. The detection units 338 also include middle detection units that are directed generally horizontally toward an object 335 being held by the end effector 334 as shown in FIG. 35B, and lower detection units that are directed upward toward an object 335 being held by the end effector 334 as shown in FIG. 35C.

Again, and as discussed above, in order that the system compensate for how the unit is held by the robot for placing, a scanner, not shown, scans the geometry of the unit while it is being held by the robot, so as to appropriately place the unit into the shipping container. A third scanner above the shipping container (place area) scans the shipping container post-place to provide feedback on placement quality and initiate a re-placement if necessary.

Inventory totes queue up on the inbound inventory conveyor and stop at a right-angle belt-transfer within reach of the robot. The cell is then fed a sequence of appropriately sized empty shipping containers by belt conveyor and done so in an order matching the order of arrival of SKUs. As the item is being lifted out of the inventory tote, it is scanned, and the pose and orientation of the unit are determined to enable placement. The unit is placed onto and within the extents of the shipping container, by compensating for the known position and orientation of the unit relative to the gripper.

A scanner above the cardboard sheet monitors for instances where the resulting unit placement is unsuitable for packing—i.e., lies outside of shipping container—in which cases the unit will be re-grasped and re-placed, or directed to quality assurance (QA) stations. A barcode on the shipping container is scanned, or the shipping container is marked with a barcode to associate the unit and shipping container with the corresponding order. During the placement of the unit from one inventory tote, the contents of the second inventory tote are scanned to prepare for the next pick. The belt-transfer conveys the cardboard sheet with a single inventory unit onto a conveyor belt, which feeds the final packaging machines, such as shrink-wrapping and box or box-closing machines. If no more single picks from the inventory tote are needed, then the tote is transferred to the outbound conveyor. Otherwise, the inventory tote is held, and another pick is made. The process repeats as picking starts on the second inventory tote.

In addition to the physical elements, prior to units arriving at the station, items are requested in an order most suitable for packing. An order to be shipped is initiated by querying a pack planner from the warehouse's WMS. The WMS provides a list of all the SKUs in an order, with their dimensions and weights. The Pack Planner identifies a compatible SKU sequence for packing, which may include the option of requiring a multi-box order for large unit-quantity orders; or, the option of suggesting that it be packed manually.

The concept of operations for the multi-SKU system is as follows. Items corresponding to an order arrive at the cell in shuttle trays and in the sequence specified by the pack planner. When a new order is started, a shipping container of size determined a priori by the pack planner is delivered to the cell by belt conveyors. As units are picked out of the shuttle trays, they are scanned by the unit pose scanner, where their pose and orientation relative to the gripper are determined. Compensating for the known unit pose relative to the gripper, the unit is placed onto or into the shipping container in a position and orientation determined by the pick plan. After the unit is placed, the pick plan is re-computed based on the actual position of the unit on or in the shipping container. The pack plan positioning is then adjusted to compensate for the actual placement. Picking and placing repeats, interspersed with pack plan re-computation until all units are picked and placed into the shipping container.

Once all units have been placed, the filled shipping container is transferred by belt conveyor to feed the final packaging machines, such as shrink-wrap and boxing or box-closing machines. If at some point, the actual placements no longer admit planned placements, but are otherwise acceptable for shrink-wrapping, then the partially filled shipping container is transferred by belt conveyor, which then feeds the final packaging machines, such as shrink-wrap and boxing or box-closing machines. Any remaining units not packed, would be routed back to the Mini-shuttle to be shipped later in another box. If an item could not be packed because the measured SKU size is larger than what was expected, then the units are flagged for QA. If at some point, a unit placement results in an item not lying with the cardboard extents, the item is then re-grasped and re-placed.

FIGS. 36 and 37 show back side and rear perspective views of the system 300 that includes the infeed conveyor 302 on which multi-SKU inventory totes 304 are delivered to the multi-SKU packing cell system 306 that includes the programmable motion articulated arm 308. The system 300 also includes the shipping container conveyor 310 that provides shipping containers 312 to the multi-SKU packing cell system 306. In accordance with an aspect, the single-SKU packing cell system picks single units from the inventory totes and places them into or onto packaging appropriate for shipping. The robot-support structure straddles the two parallel conveyors 302, 310 that feed the cell with shipping containers as well as inventory totes from a tote storage system such as an AS/RS under the control of one or more processing systems 200.

The system 300 includes the weight sensing conveyors as discussed above with reference to FIGS. 9, 10 and 23A-23E under the articulated arm 308, as well as brace bars and brace rails as discussed above with reference to FIGS. 16A-16D. Again, weight sensing conveyors as well as the brace bar and rail system, may be used with both the input containers on the in-feed conveyors and the shipping containers on the shipping conveyor. The system may include a plurality of systems 306 that are positioned along a pair of in-feed conveyors and shipping container conveyors.

The scanning and receiving units may also be employed to determine a density of the collection of objects in the bin, which is compared with a known density of the identified SKU multiplied by the known number of objects in the bin from knowing the object's mass and volume. The volumetric data may be obtained for example, using any of light detection and ranging (LIDAR) scanners, pulsed time of flight cameras, continuous wave time of flight cameras, structured light cameras, or passive stereo cameras.

In accordance with further aspects, the system may additionally employ edge detection sensors that are employed (again together with the processing system 100, 200), to detect edges of any objects in a bin, for example using data regarding any of intensity, shadow detection, or echo detection etc. The system may be employed for example, to determine any of size, shape and/or contours to aid in confirming a number of objects in the bin. In certain aspects, the system may identify a specific object in the bin and confirm its shape and size through such edge detection. The above system therefore, may be used to confirm a number of objects in a bin, and in certain aspects, to originally estimate a number of (single SKU) objects in a bin, and/or confirm the recorded data for any particular SKU.

Figure 38:
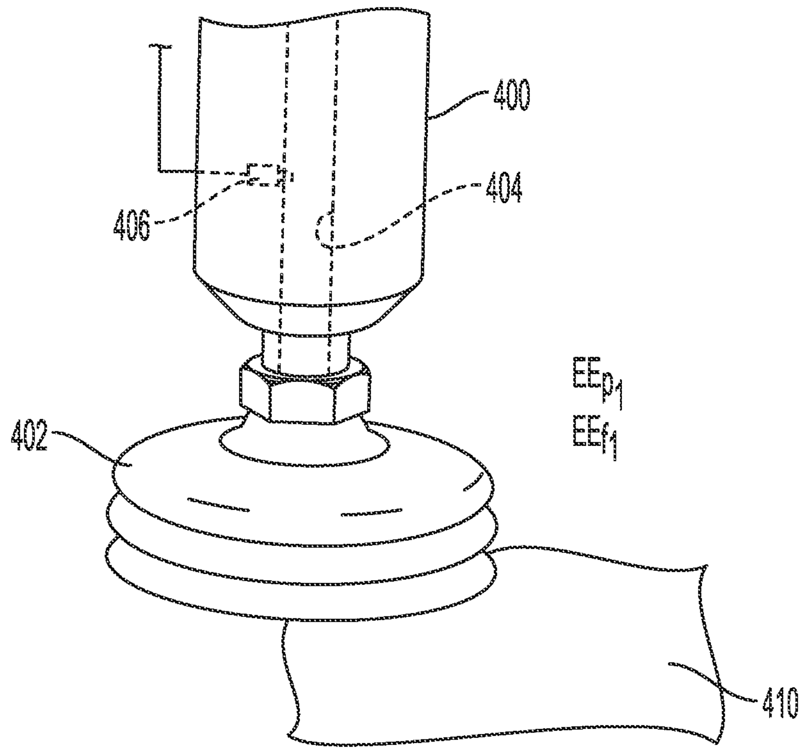
FIG. 38 shows an illustrative diagrammatic view of an end-effector vacuum opening partially blocked by debris in an object processing system.

During use, the system end effector of the any of the above systems may include any of a pressure or air flow sensor within the end effector, and the pressure and/or flow may be recorded when no object is being held and the vacuum is on, as well as when a known object is being held by the vacuum. With this baseline information, the system may determine that the end effector needs to be cleaned, for example, of debris that may have collected at the opening of a vacuum cup of the end effector. FIG. 38 for example, shows an end effector 400 with a vacuum cup 402 that is in communication with a vacuum source via an internal channel 404. A sensor 406 is provided within the channel 404 for measuring any of pressure or air-flow within the channel.

Figure 39:
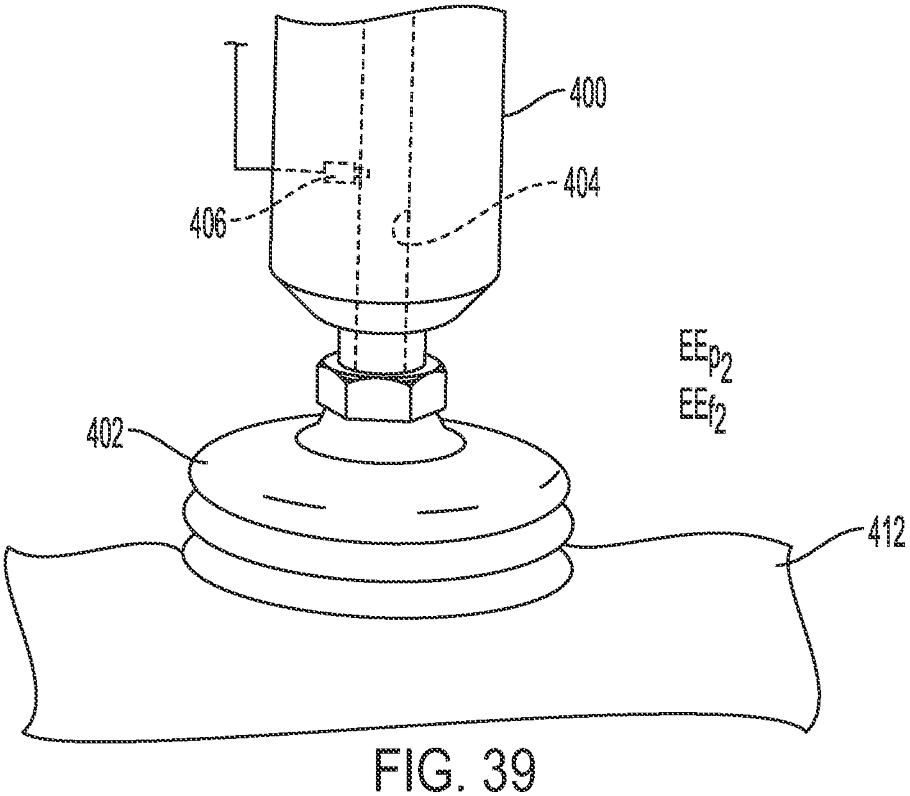
FIG. 39 shows an illustrative diagrammatic view of an end-effector vacuum opening fully blocked by debris in an object processing system.

When debris 410 is partially blocking the vacuum cup opening (as shown in FIG. 38), or debris 412 is fully blocking the vacuum cup opening (as shown in FIG. 39), the system should detect a non-normal air flow or pressure reading during normal operation (e.g., between grasps or when grasping a known object). For example, if the system has recorded rest values for each of pressure and air-flow when the vacuum is on and no object is being grasped, then a different set of at-rest readings may indicate that the end effector opening needs to be cleaned. Similarly, if the system has a recorded set of known-object grasping values for each of pressure and air-flow when the vacuum is on and the object is being grasped, then a different set of readings while grasping the same or similar object may indicate that the end effector opening needs to be cleaned. In accordance with further aspects, debris may enter the vacuum cup against an internal screen (again, causing partial or full blockage of the vacuum).

Figure 40:
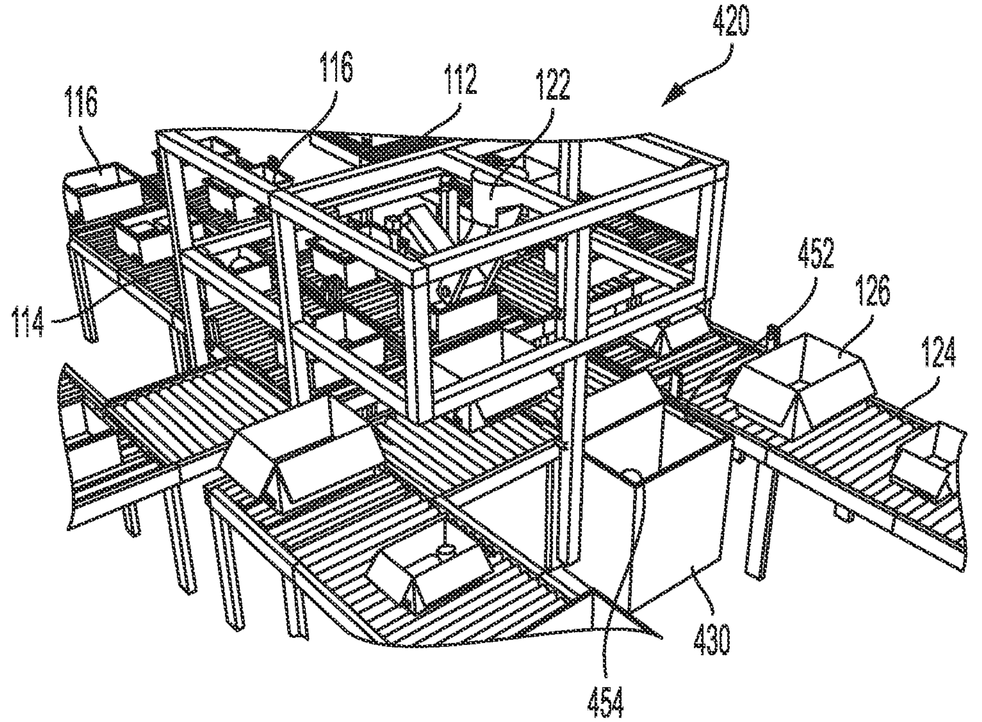
FIG. 40 shows an illustrative diagrammatic view of a single-SKU object processing cell that includes a trash bin as part of the object processing system in a system in accordance with an aspect of the present invention.
Figure 41:
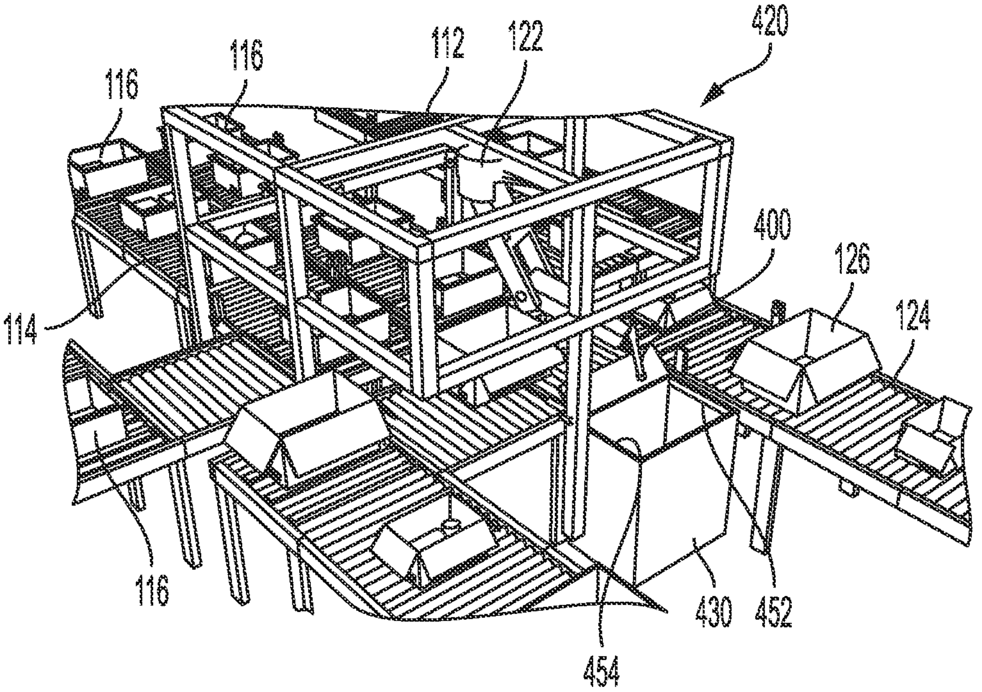
FIG. 41 shows an illustrative diagrammatic view of the system of FIG. 40 with the end-effector employed to deposit debris into the trash bin in a system in accordance with an aspect of the present invention.

FIG. 40 shows a system as discussed above with reference to FIGS. 6-28 that includes a single SKU packing station 420 that receives in-feed containers 116 on in-feed conveyors 112, 114, an articulated arm 122, and shipping containers 126 on a shipping container conveyor 124 as discussed above. The cell station 420 also includes a trash bin 430 into which the articulated arm may deposit (e.g., drop or blow) debris from a vacuum cup of the end effector 400. FIG. 41 shows the end effector 400 of the articulated arm 122 positioned over the trash bin 430. The trash bin 430 may include emitters 452 and detectors 454 along opposing top edges to detect whether any debris has fallen or been blown into the trash bin 430.

Figure 42:
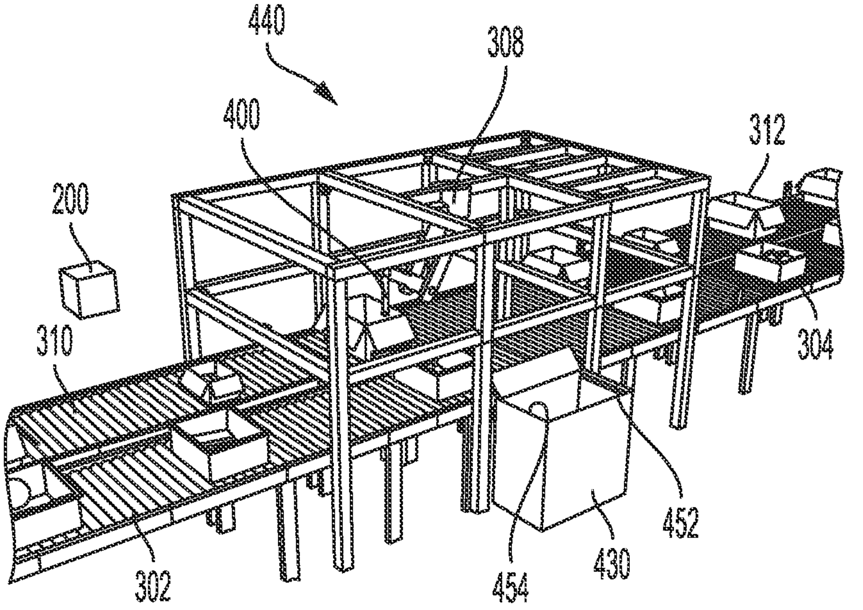
FIG. 42 shows an illustrative diagrammatic view of a multi-SKU object processing cell that includes a trash bin as part of the object processing system in a system in accordance with an aspect of the present invention.
Figure 43:
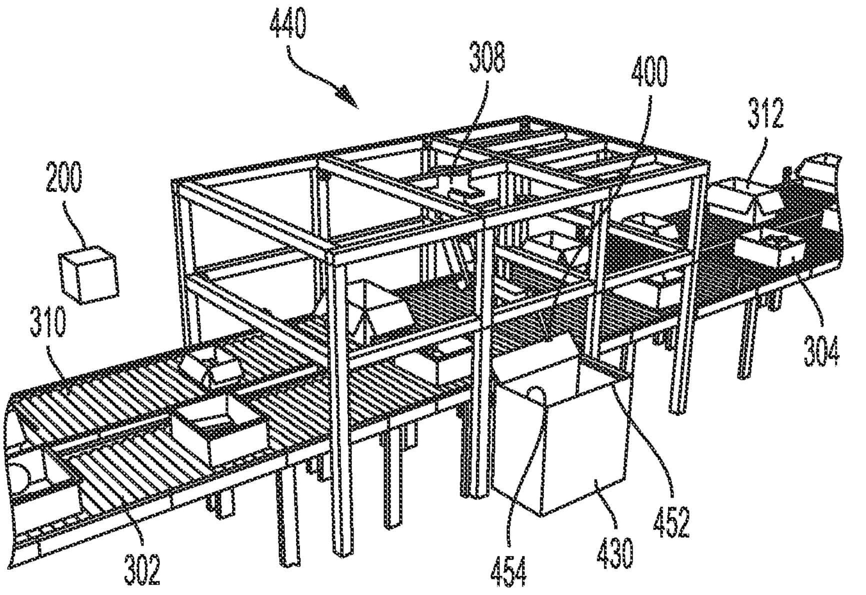
FIG. 43 shows an illustrative diagrammatic view of the system of FIG. 42 with the end-effector employed to deposit debris into the trash bin in a system in accordance with an aspect of the present invention.

Similarly, FIG. 42 shows a system as discussed above with reference to FIGS. 29-37 that includes a multi-SKU packing station 440 that receives in-feed containers 304 on an in-feed conveyor 302, an articulated arm 308, and shipping containers 312 on a shipping container conveyor 310 as discussed above. The cell station 440 also includes a trash bin 430 into which the articulated arm may deposit (e.g., drop or blow) debris from a vacuum cup of the end effector 400. FIG. 43 shows the end effector 400 of the articulated arm 308 positioned over the trash bin 450. Again, the trash bin 430 may include emitters 452 and detectors 454 along opposing top edges to detect whether any debris has fallen or been blown into the trash bin 430.

Figure 44:
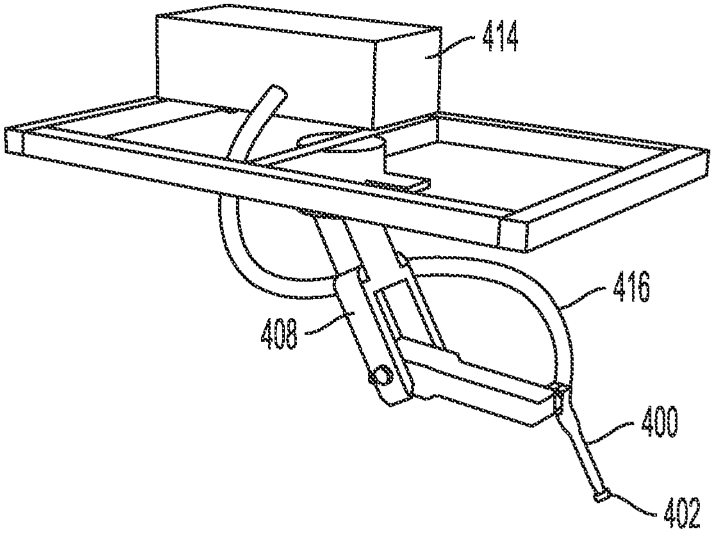
FIG. 44 shows an illustrative diagrammatic view of a vacuum source for use in a debris removal system in a system in accordance with an aspect of the present invention.
Figure 45:
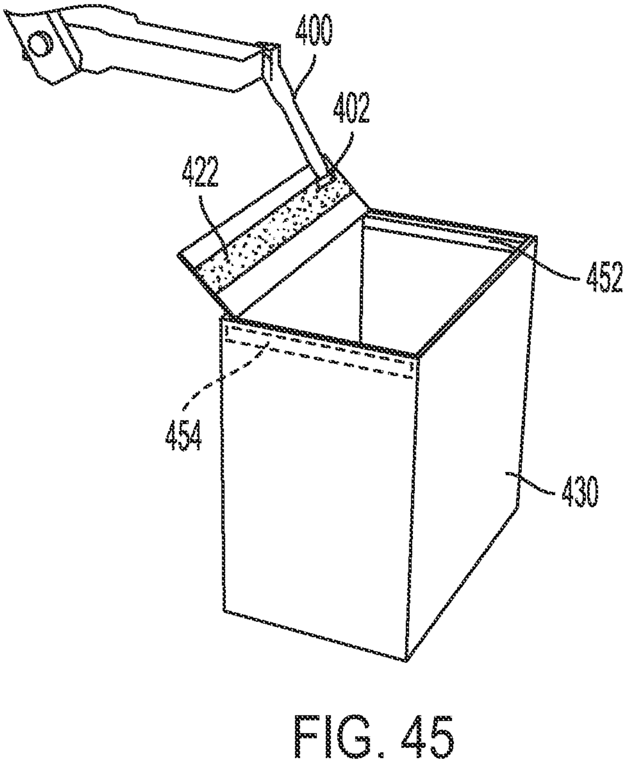
FIG. 45 shows an illustrative diagrammatic view of a debris removal brush pad for use in a debris removal system in a system in accordance with an aspect of the present invention.

Any debris may be dropped by turning off the vacuum while the vacuum cup 402 of the end effector 400 is positioned over the trash bin (e.g., 430). With further reference to FIG. 44, a vacuum source 414 that is coupled via a vacuum hose 416 to the vacuum cup 402 (in the above disclosed examples) may be reversed (or switched) to cause a blast of positive air pressure to be delivered to the vacuum cup, blowing any debris from the vacuum cup into the trash bin. When any debris enters the bin 430, a responsive signal from the emitter/detector arrays 452, 454 is sent to the control system. FIG. 45 shows a trash bin in accordance with a further aspect that includes a brush pad 422 along which the vacuum cup 402 of the end effector 400 may be dragged away from the trash bin 430 to further facilitate removal of debris from the vacuum cup. Use of the brush pad 422 is preferably combined with providing the positive air pressure to inhibit collection of debris at the brush pad 422.

Figure 46:
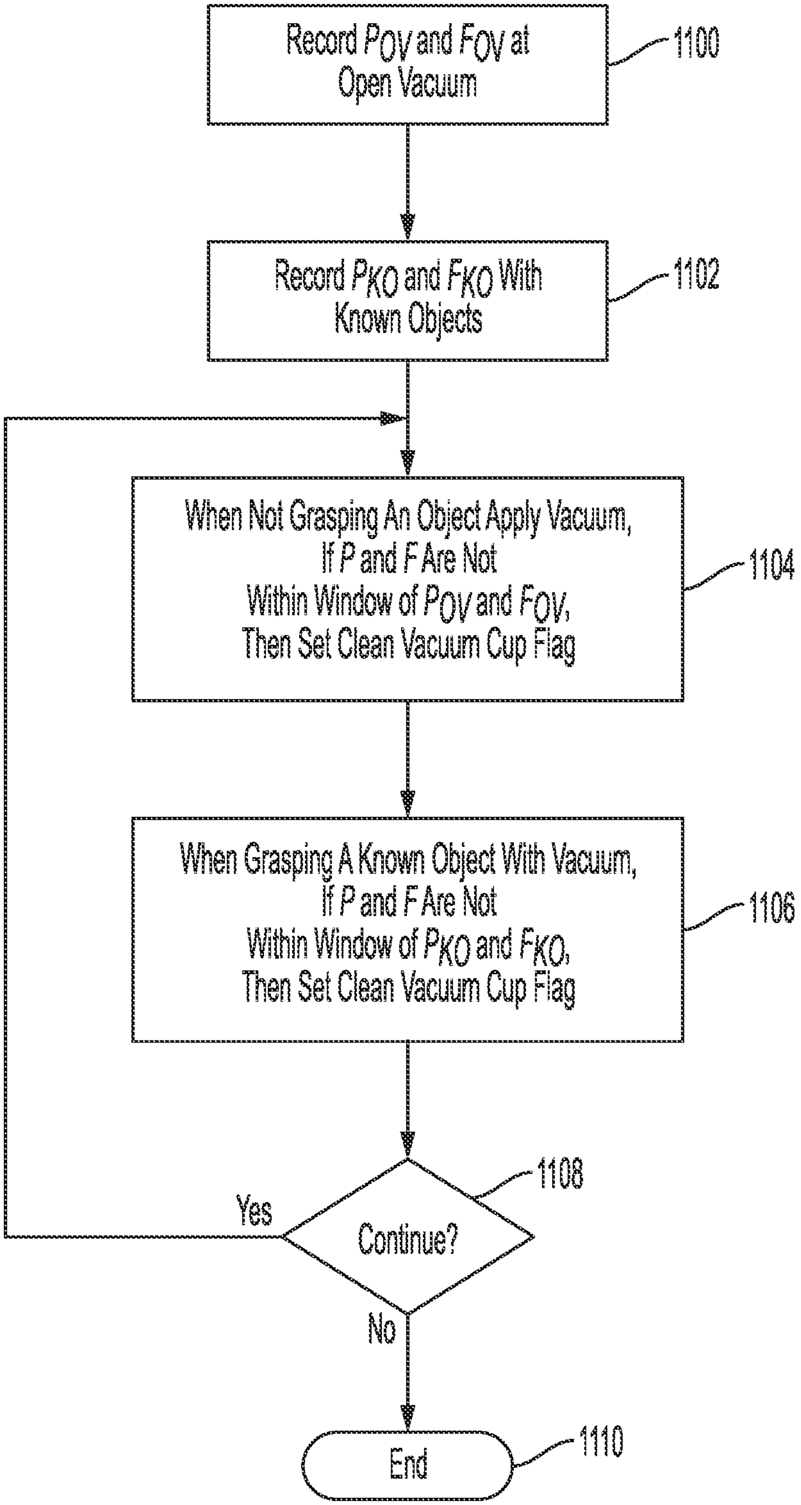
FIG. 46 shows an illustrative diagrammatic view of a process flow in a debris detection system for use in a system in accordance with an aspect of the present invention.

The process control system may determine during use that a vacuum cup of an end effector needs to be cleaned, of, for example, debris that may be attacked to the vacuum cup by the vacuum, by adhesive on the debris, or by static charge. In particular, and with reference to FIG. 46, upon start up (or when the system knows that the vacuum cup is clean or any debris), the system may record (step 1100) the pressure and air flow at the end effector with the vacuum on and no object being grasped ($P_{OV}$, $F_{OV}$). The system may then record (step 1102) the pressure and air flow at the end effector while the end effector is grasping each of a plurality of different objects ($P_{KO1}$, $F_{RO1}$, $P_{RO2}$, $F_{RO2}$, $P_{RO3}$, $F_{RO3}$, $P_{KO4}$, $F_{KO4}$ etc.). Each of the different objects may be objects that are commonly encountered, such as a box weighing less than 1 lb, a box weighing 2 to 2.5 lbs, a box weighing 10 to 12 lbs, and a box weighing 20 to 22 lbs. These values are recorded, and later compared with measured values during use.

For example, when the system is not currently grasping an object, a vacuum is applied and the pressure and air flow are detected (step 1104). If either the detected pressure or air flow is not within a range (e.g., +5%) of the recorded open vacuum values ($P_{OV}$, $F_{OV}$), then the system will set a Clean Vacuum Cup flag. Similarly, during use, when the system is currently grasping by vacuum a commonly encountered know object, the pressure and air flow are detected (step 1106). If either the detected pressure or air flow is not within a range (e.g., +5%) of the recorded known object values ($P_{KO}$, $F_{KO}$) for that object, then the system will set a Clean Vacuum Cup flag. The process continues (step 1108) during use and operation of the articulated arm until the program ends (step 1110).

Figure 47A:
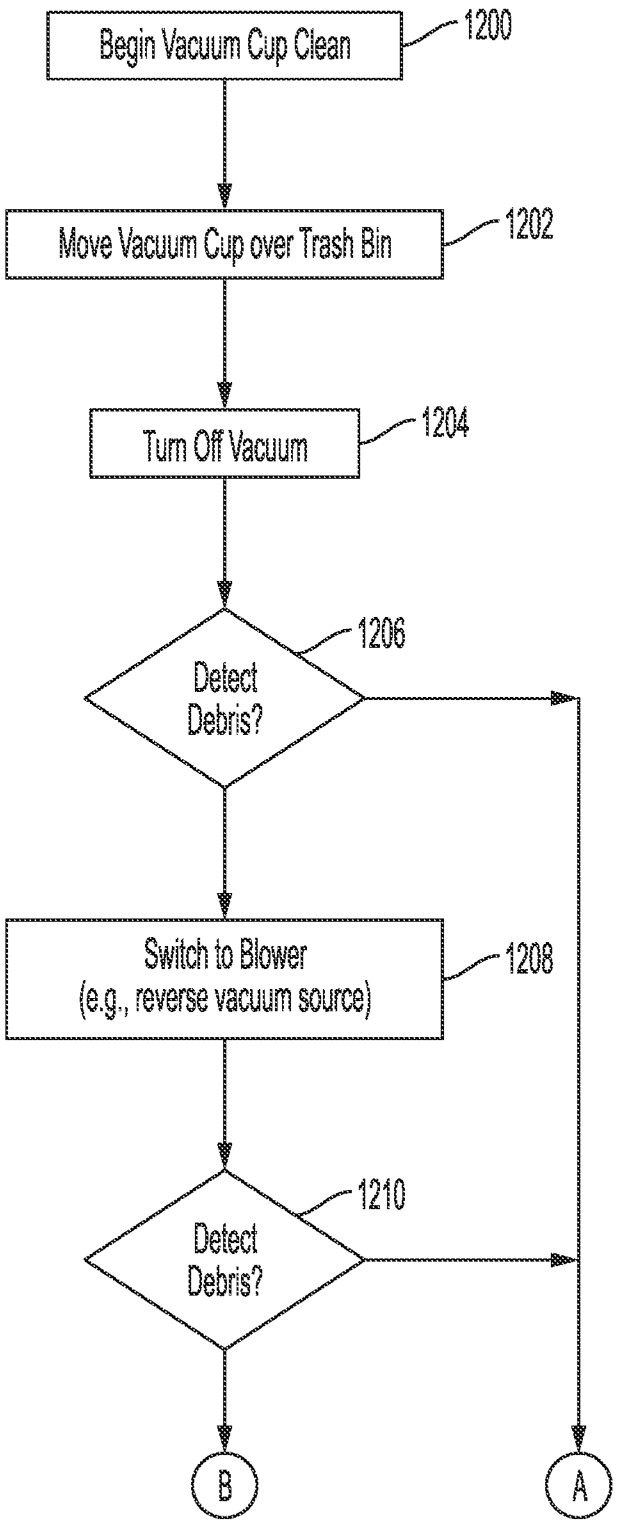
FIG. 47A-47C show illustrative diagrammatic views of a process flow in a debris removal system for use in a system in accordance with an aspect of the present invention. The drawings are shown for illustrative purposes only.
Figure 47B:
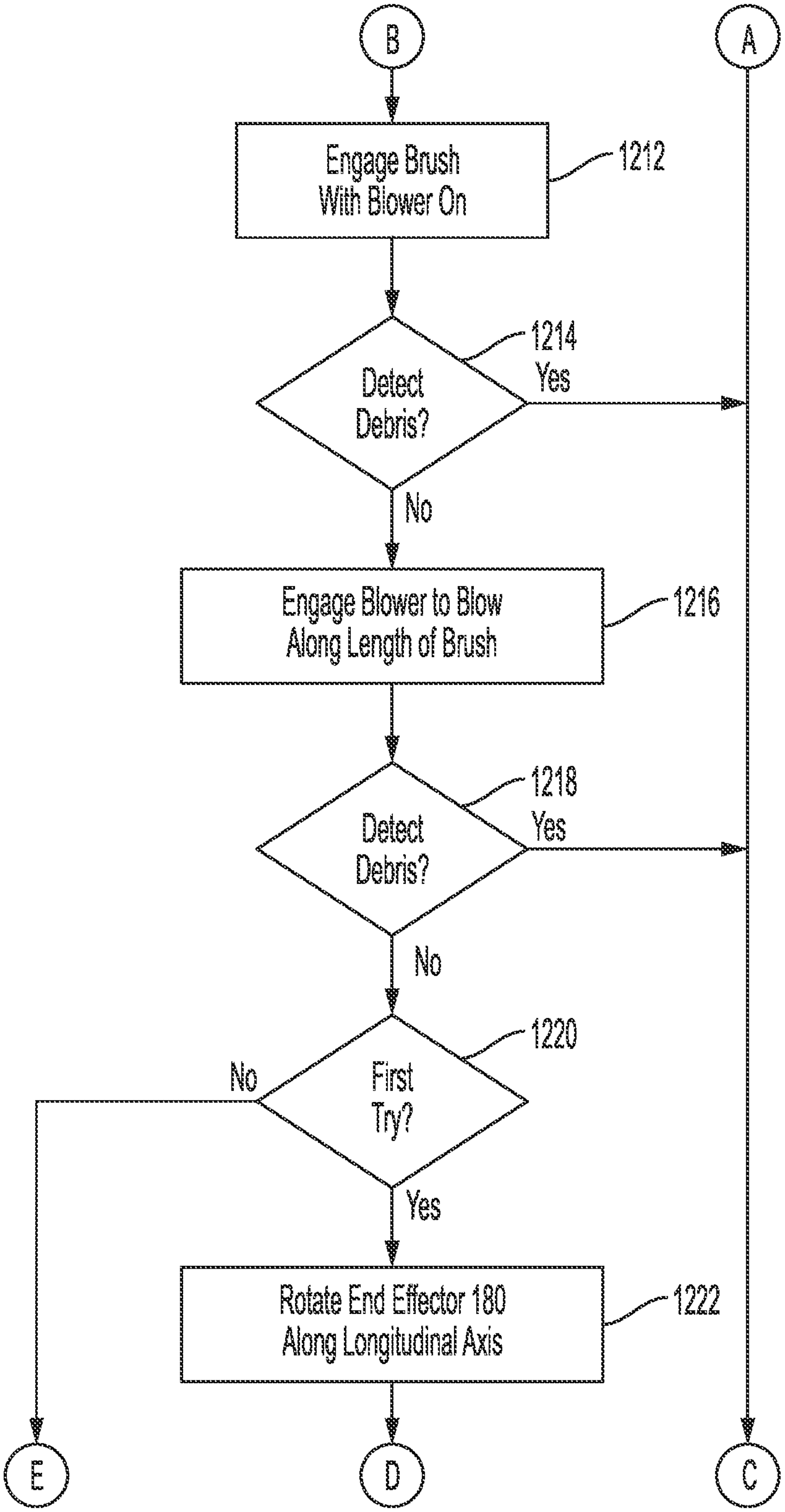

When the Clean Vacuum Cup flag has been set, then between the processing of objects, the system may begin a vacuum cup clean routine (step 1200) by first moving the vacuum cup of the end effector over a trash bin (step 1202) as shown in FIG. 47A. The system may then turn the vacuum off (step 1204), and detect whether (step 1206) any debris falls into the trash bin. If so, the system ends. If not, the system may then switch to a forced air (blower) by either switching to a blower source or reversing the vacuum system 414 (step 1208) to provide force positive pressure air through the hose 416 to the vacuum cup 402. The system may then detect whether (step 1210) any debris falls into the trash bin. If so, the system ends. If not, the system may then drag the vacuum cup (optionally with the blower engaged) along the brush pad 422 moving away from the trash bin (step 1212) as shown in FIG. 47B. The system may then detect whether (step 1214) any debris falls into the trash bin. If so, the system ends. If not, the system may then engage the blower to blow along a length of the brush pad (step 1216) to dislodge any debris that may have collected on the brush pad 422. The system may then detect whether (step 1218) any debris falls into the trash bin. If so, the system ends. If not, the system may then determine whether this is the first pass cleaning attempt for this occurrence (step 1220), if not, the system set a service flag indicating that the end effector and vacuum cup needs to be serviced (step 1228).

Figure 47C:
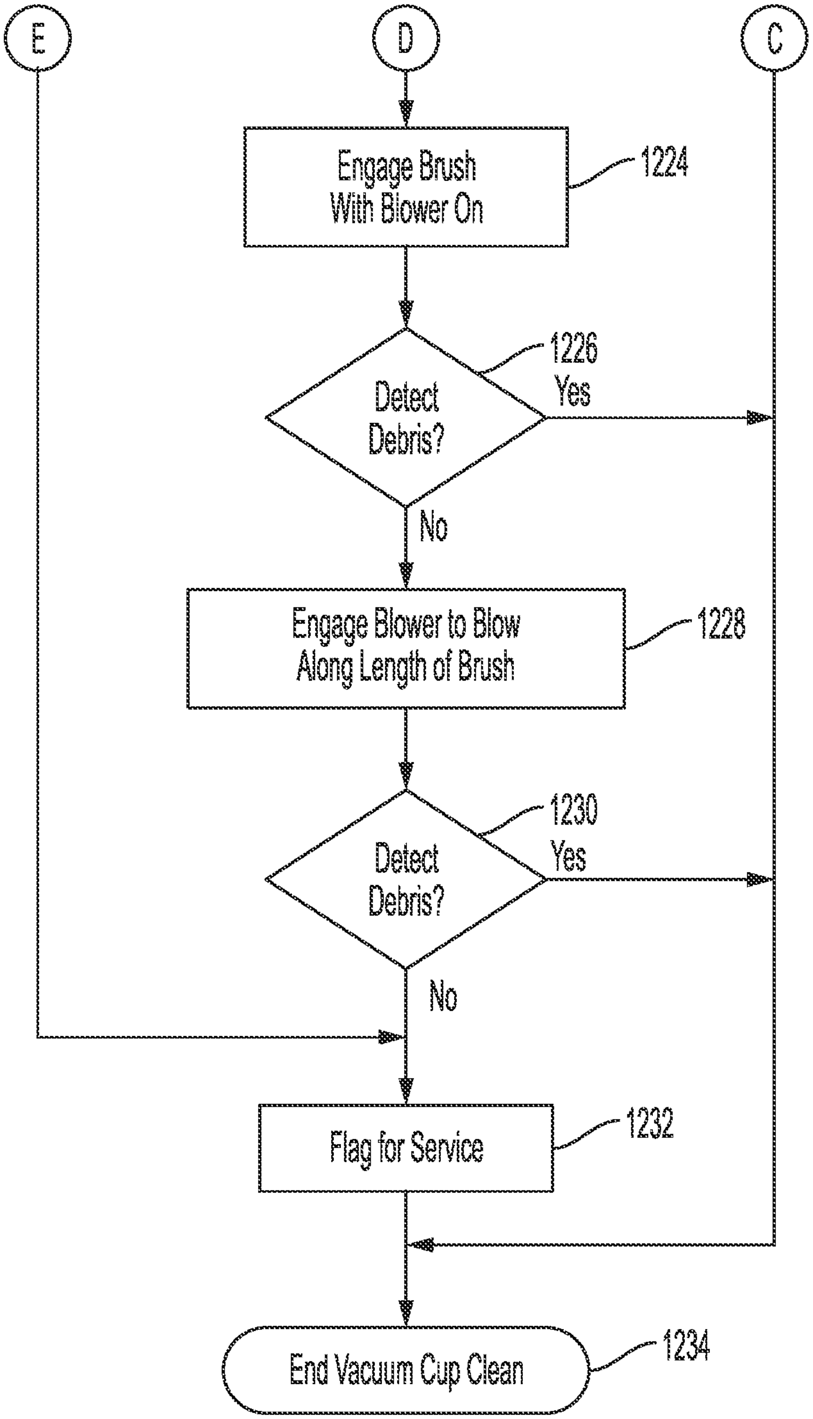

If the system determines that this is the first pass cleaning attempt for this occurrence (step 1220), then the system may rotate the end effector 180 degrees along the longitudinal length of the end effector (step 1222), effectively turning the end effector over so that the side previously opposite the brush pad is now facing the brush pad. The system may then t drag the now flipped over vacuum cup (optionally with the blower engaged) along the brush pad 422 moving away from the trash bin (step 1224) as shown in FIG. 47C. The system may then detect whether (step 1226) any debris falls into the trash bin. If so, the system ends. If not, the system may then engage the blower to blow along a length of the brush pad (step 1228) to dislodge any debris that may have collected on the brush pad 422. The system may then detect whether (step 1230) any debris falls into the trash bin. If so, the system ends. If not, the system may then set a flag indicating that the end effector of the system needs servicing (step 1232), and the vacuum cup cleaning routine ends (step 1234). These processes and systems may be used with each of the disclosed single-SKU and multi-SKU systems discussed above.

Again, the operations of the systems described above are coordinated with a central control system 100, 200 that communicates (e.g., wirelessly) with the articulated arm, the perception systems, the conveyors, the alignment systems and the trash removal. This system determines from symbol strings the UPC associated with a vendor bin, as well as the outbound destination for each object. The central control system 100, 200 is comprised of one or more workstations or central processing units (CPUs). For example, the correspondence between UPCs or mailing labels, and outbound destinations is maintained by a central control system in a database called a manifest. The central control system maintains the manifest by communicating with a warehouse management system (WMS). The manifest provides the outbound destination for each in-bound object. Scanners are placed above each inventory tote picking location to look for grasp points. The cell coordinates via WMS/WCS with a shipping container dispensing mechanism—such as an automated box-making system or cardboard-slip dispensing machine—that feeds shipping containers to the pick cell. Conveyors feed the shipping container to the cell.

Again, and as discussed above, in order that the system compensate for how the unit is held by the robot for placing, a scanner, not shown, scans the geometry of the unit while it is being held by the robot, so as to appropriately place the unit into the shipping container. A third scanner above the shipping container (place area) scans the shipping container post-place to provide feedback on placement quality and initiate a re-placement if necessary.

Those skilled in the art will appreciate that numerous modifications and variations may be made to the above disclosed embodiments without departing from the spirit and scope of the present invention.

What is claimed is:

1. An automated packing system for placing a plurality of objects into a shipping container, said automated packing system comprising:

a programmable motion device that includes an end effector coupled to an articulated arm;

a supply bin conveyor that delivers a supply bin to a first location proximate the articulated arm, the supply bin containing at least one object of the plurality of objects;

a shipping container conveyor that delivers a shipping container to a second location proximate the articulated arm, the shipping container being a destination for the at least one object;

a container alignment system that includes a movable brace bar and a brace rail, wherein the movable brace bar urges the shipping container into a known position against the brace rail at the second location proximate the articulated arm; and a grasp detection system for identifying characteristics of the object after it is grasped by the end effector;

wherein the end effector places the selected object into the shipping container in a selected orientation using the characteristics of the object while the shipping container is maintained in the known position between the movable brace bar and the brace rail.

2. The automated packing system as claimed in claim 1, wherein the characteristics include an amount of swinging motion the object exhibits as it is grasped by the end effector.

3. The automated packing system as claimed in claim 2, wherein the end effector includes a compliant vacuum cup, and the amount of swinging motion is thresholded from movement of the compliant vacuum cup.

4. The automated packing system as claimed in claim 1, wherein the characteristics include a pose and orientation relative to the end effector.

5. The automated packing system as claimed in claim 1, wherein the characteristics include a volumetric assessment of the object.

6. The automated packing system as claimed in claim 1, wherein the shipping container is a cardboard box.

7. The automated packing system as claimed in claim 1, wherein the shipping container is a shipping tray.

8. The automated packing system as claimed in claim 1, wherein the plurality of objects are homogenous.

9. An automated packing system for placing a plurality of objects into a shipping container, said automated packing system comprising:

a programmable motion device that includes an end effector coupled to an articulated arm;

a shipping container conveyor that delivers a shipping container to a location proximate the articulated arm;

a container alignment system that includes a movable brace bar and a brace rail for aligning the shipping container at the location proximate the articulated arm, wherein the movable brace bar urges the shipping container in a direction that is substantially transverse to a direction of movement of the shipping container conveyor against the brace rail in a known position; and an object selection system for selecting a selected object from among a plurality of objects to be placed into the shipping container; and a perception system for identifying characteristics of the object after it is grasped by the end effector;

wherein the end effector of the articulated arm grasps and acquires the selected object from the plurality of objects, and wherein the end effector places the selected object into the shipping container in a selected orientation and pose responsive to the characteristics while the shipping container is maintained in the known position between the movable brace bar and the brace rail.

10. The automated packing system as claimed in claim 9, wherein the characteristics include an amount of swinging motion the object exhibits as it is grasped by the end effector.

11. The automated packing system as claimed in claim 10, wherein the end effector includes a compliant vacuum cup, and the amount of swinging motion is thresholded from movement of the compliant vacuum cup.

12. The automated packing system as claimed in claim 9, wherein the characteristics include a pose and orientation relative to the end effector.

13. The automated packing system as claimed in claim 9, wherein the characteristics include a volumetric assessment of the object.

14. The automated packing system as claimed in claim 9, wherein the shipping container is a cardboard box.

15. The automated packing system as claimed in claim 9, wherein the shipping container is a shipping tray.

16. An automated method of placing a plurality of objects into a shipping container, said method comprising:

delivering a supply bin on a supply bin conveyor to a first location proximate an articulated arm having an end effector;

detecting objects within the supply bin;

delivering a shipping container on a shipping container conveyor to a second location proximate the articulated arm;

aligning the shipping container at the second location proximate the articulated arm using a container alignment system that includes a movable brace bar and a brace rail, wherein the movable brace bar urges the shipping container into a known position against the brace rail at the second location proximate the articulated arm;

selecting a selected object from the plurality of objects to be placed into the shipping container;

grasping and acquiring the selected object from the plurality of objects within the supply bin using the end effector of the articulated arm;

detecting characteristics of the selected object as it is grasped by the end effector; and placing the selected object into the shipping container in a selected orientation with the end effector using the detected characteristics while the shipping container is maintained in the known position between the movable brace bar and the brace rail.

17. The method as claimed in claim 16, wherein the characteristics include an amount of swinging motion the object exhibits as it is grasped by the end effector.

18. The method as claimed in claim 17, wherein the end effector includes a compliant vacuum cup, and the amount of swinging motion is thresholded from movement of the compliant vacuum cup.

19. The method as claimed in claim 16, wherein the characteristics include pose authority data regarding whether the selected object is deformable and likely to change shape when placed in the shipping container.

20. The method as claimed in claim 16, wherein the characteristics include pose authority data regarding whether the selected object is likely to move after being placed in the shipping container.

* * * * *